United States Patent [19]
Thompson

[11] Patent Number: 6,139,437
[45] Date of Patent: Oct. 31, 2000

[54] EQUAL ANGLE GUIDE MECHANISM FOR DOUBLE UNIVERSAL JOINTS

[76] Inventor: Keith R. Thompson, 48 Hillcrest Dr., Victor, N.Y. 14564

[21] Appl. No.: 09/090,617

[22] Filed: Jun. 4, 1998

[51] Int. Cl.[7] ........................................ F16D 3/50
[52] U.S. Cl. ........................ 464/117; 464/56; 464/905
[58] Field of Search ................................. 464/109, 113, 464/114, 117, 118, 905, 904, 149, 55, 56; 474/148; 476/68, 69; 74/420

[56] References Cited

U.S. PATENT DOCUMENTS

| | | |
|---|---|---|
| 1,389,970 | 9/1921 | Noel . |
| 3,088,296 | 5/1963 | Barker et al. ........................... 464/117 |
| 3,456,458 | 7/1969 | Dixon . |
| 3,597,989 | 8/1971 | Benson . |
| 3,747,368 | 7/1973 | Morin . |
| 4,103,513 | 8/1978 | Grosser .................................. 464/109 |
| 4,236,420 | 12/1980 | Geisthoff . |
| 4,257,243 | 3/1981 | Herchenbach . |
| 4,352,276 | 10/1982 | Smith . |
| 5,425,676 | 6/1995 | Cornay ................................ 464/117 X |

OTHER PUBLICATIONS

"On The Necessary and Sufficient Conditions For Homokinetic Transmission in Chains of Cardan Joints" Johnson & Willems Journal of Mechnical Design Jun. 1993, vol. 115/ pp. 255–261.

*Primary Examiner*—Lynne H. Browne
*Assistant Examiner*—Greg Binda
*Attorney, Agent, or Firm*—Eugene Stephens & Associates

[57] ABSTRACT

Two shafts in a double universal joint system are linked so that swivel of one shaft about a first pivot point in one universal joint results in a corresponding amount of swivel in the other shaft about a second pivot point in the other universal joint. Two mechanical paths couple swivel of the shafts. The two paths work in concert to couple swivel of the one shaft about a first axis to equal swivel of the other shaft about a corresponding axis, and the same two paths work in contrast to couple the swivel of the one shaft about a second axis to equal swivel of the other shaft about a second corresponding axis. This mechanism can be used to assure constant velocity operation of a double Cardan universal joint directly, or this mechanism can be used as an external harness to control the positioning of a double universal joint. When the mechanism is used as an external harness, it can be used to restrict a double Cardan universal joint to a constant velocity configuration, or it can be used to control any other double universal joint wherein benefit can be derived by equal angle coplanar operation. In some configurations very wide angle operation in any direction is provided, and in other configurations misaligned parallel axis operation is provided.

28 Claims, 28 Drawing Sheets

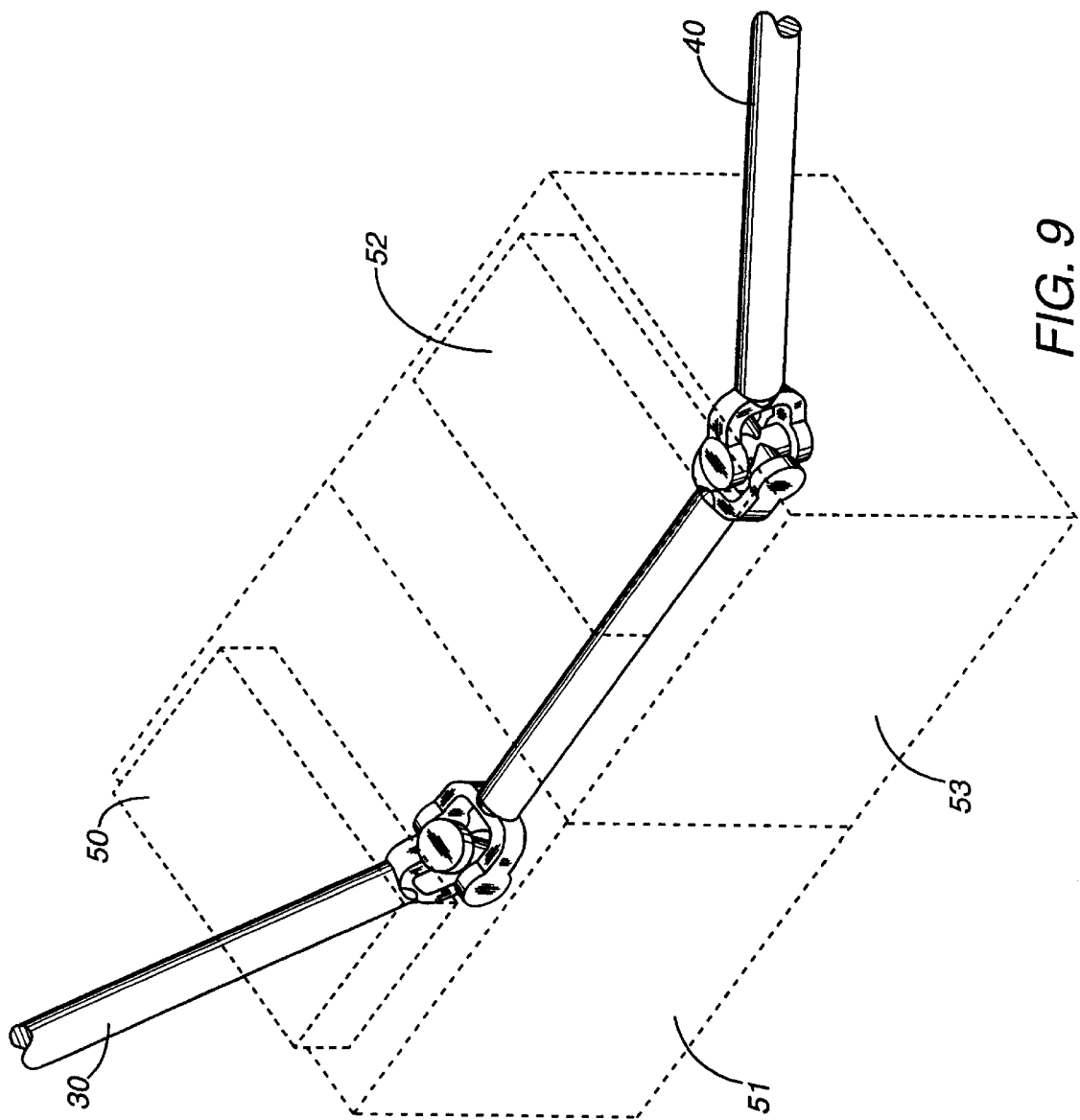

EQUAL ANGLE GUIDE MECHANISM FOR DOUBLE UNIVERSAL JOINTS

TECHNICAL FIELD

This invention relates generally to double universal joints. More particularly, it relates to a mechanism for dynamically keeping a double universal joint in a desired configuration as the alignment between the driving shaft and driven shaft changes.

BACKGROUND OF THE INVENTION

Universal joints are used to transmit rotational motion between angularly misaligned shafts. A common universal joint used in these circumstances is the Cardan joint. There are, however, many applications where a Cardan joint is not well suited, because of a requirement of very wide angle operation, a requirement for constant velocity operation, or both. One common solution to this is to use a double Cardan universal joint, so phased and aligned as to provide constant velocity operation over a wider angle.

One configuration that yields constant velocity operation in angularly displaced shafts is when the center yoke divides the angle between the driving and driven shafts, and the axes of rotation of the driving and driven shafts are maintained in a coplanar configuration. See, for example, "On the Necessary and Sufficient Conditions for Homokinetic Transmission in Chains of Cardan Joints", by D. A. Johnson and P. Y. Willems, ASME Journal of Mechanical Design, June 1993, Vol. 115, pp. 255–261, which is herein incorporated by reference. It is this configuration which most of the prior art utilizes.

In some configurations in the prior art, extensions of the end yokes mesh in the center of the double Cardan joint to provide constant velocity alignment. This meshing is accomplished in a variety of ways. One approach uses a ball on the end of one end yoke extension and a cylindrical socket on the end of the other end yoke extension. This particular approach is confined to relatively small angles, has lubrication and wear problems with the ball and cylinder, and does not produce precise alignment over the full range of use. In another approach disclosed in U.S. Pat. No. 4,352,276 (Smith), the extensions of the end yokes are equipped with meshing annular gear teeth. This provides precise alignment, but again the angle of deflection is limited and the teeth sustain considerable wear. Additionally, the arrangement suffers from instability at greater angles of deflection when the teeth become somewhat worn. In still another invention employing this concept, and disclosed in U.S. Pat. No. 4,257,243 (Herchenbach), there is an intermediate movable piece with which the end shaft extensions mesh in a variety of configurations. This approach claims to be effective at up to 90 degrees of total deflection and produce precise alignment, but at the cost of considerable sliding surface with the attendant wear and frictional losses. Collectively, this group is characterized by either a restricted angle of operation, considerable sliding surfaces, or both.

Another group of inventions uses external guides to give double Cardan joints a wide angle, constant velocity capability. U.S. Pat. No. 1,389,970 (Noel) purports to provide a wide angle of operation, but is restricted to a single plane. U.S. Pat. No. 4,236,420 (Geisthoff) attempts to overcome this by adding another Cardan universal joint and a spring mechanism to prevent direct alignment from causing catastrophic failure if movement occurs in the wrong direction. This approach requires considerable space and hence is proposed primarily for connections between tractor and implement, where such space is available. This approach does not provide the constant velocity capability required in such applications as front end drive vehicles.

Wholly new types of universal joints have been proposed; and some, such as the tripot universal joint, have won widespread acceptance in the automobile industry. They have, however, suffered from restricted angles of operation, sudden failure at high stress and deflection, and failure to produce true constant velocity operation. The strength, reliability, durability, efficiency, wide angle capability, and the potential for true constant velocity operation continues to make the double Cardan joint a desirable alternative.

There remains a need in the art for a way to guide double universals over wide angles without being constrained to a single plane for true constant velocity capability, for reduced frictional losses, and for reduced wear.

SUMMARY OF THE INVENTION

My invention can be arranged to provide larger angular displacement between the shafts of a double universal joint system with fewer losses and true constant velocity operation. My invention can also be arranged to provide true constant velocity operation and maintain two shafts of a double universal joint system in parallel with lower losses than the prior art.

Essentially, my invention provides two pivot points with one shaft swiveling about each pivot point. Two mechanical paths couple swivel of the shafts. The two paths work in concert to couple swivel of the one shaft about a first axis to swivel of the other shaft about a corresponding axis, and the same two paths work in contrast to couple the swivel of the one shaft about a second axis to swivel of the other shaft about a second corresponding axis.

In exemplary embodiments, I solve the problems presented in the prior art by using particular arrangements of wheels or partial wheels, such as gears or partial gears, to couple displacement of the shafts. The two mechanical paths or linkages lie on and between the end yokes of a double Cardan universal joint system.

An object of this invention is to provide a means for dynamically maintaining a double universal joint in a equal angle configuration. A further object is to maintain the desired positioning over wide and varying angles between the driving shaft and the driven shaft. A further object is to reduce wear.

Advantages include wide angle constant velocity operation for double Cardan universal joints, misaligned parallel axis operation of double Cardan universal joints, and the ability to support a variety of double joints allowing them to be used for far wider angles.

DESCRIPTION OF THE DRAWINGS

FIGS. 7, 8, and 9 are schematic representations of a double universal joint using my invention.

DESCRIPTION OF THE INVENTION

Figure 1A:
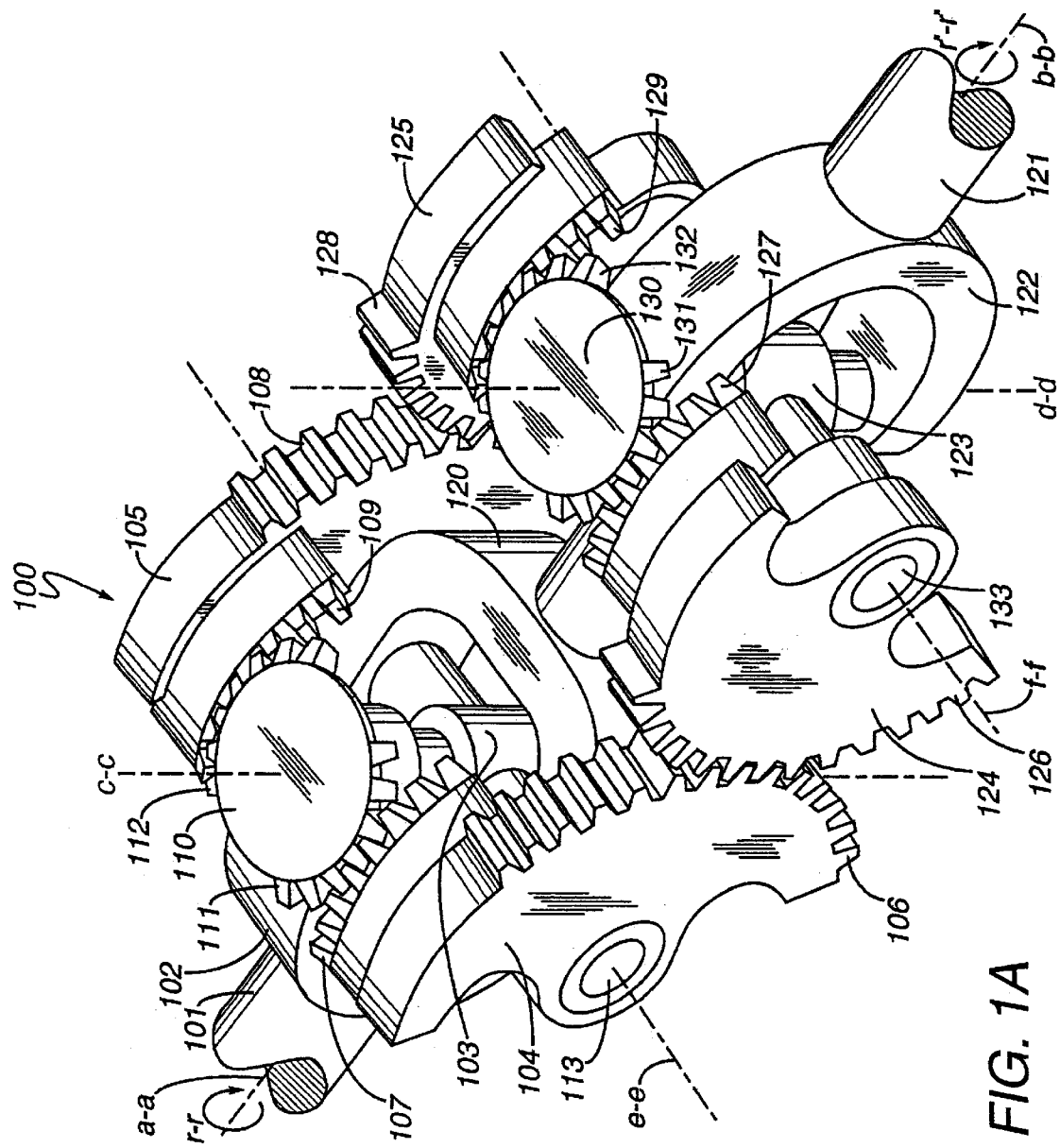
FIG. 1A is a perspective view of an exemplary first embodiment of the invention, comprising a double Cardan universal joint where the relative rotation between the cross members and the center yoke is conveyed by two paths, and the relative rotation between the end yokes and the cross members is conveyed by the same two paths.
Figure 1B:
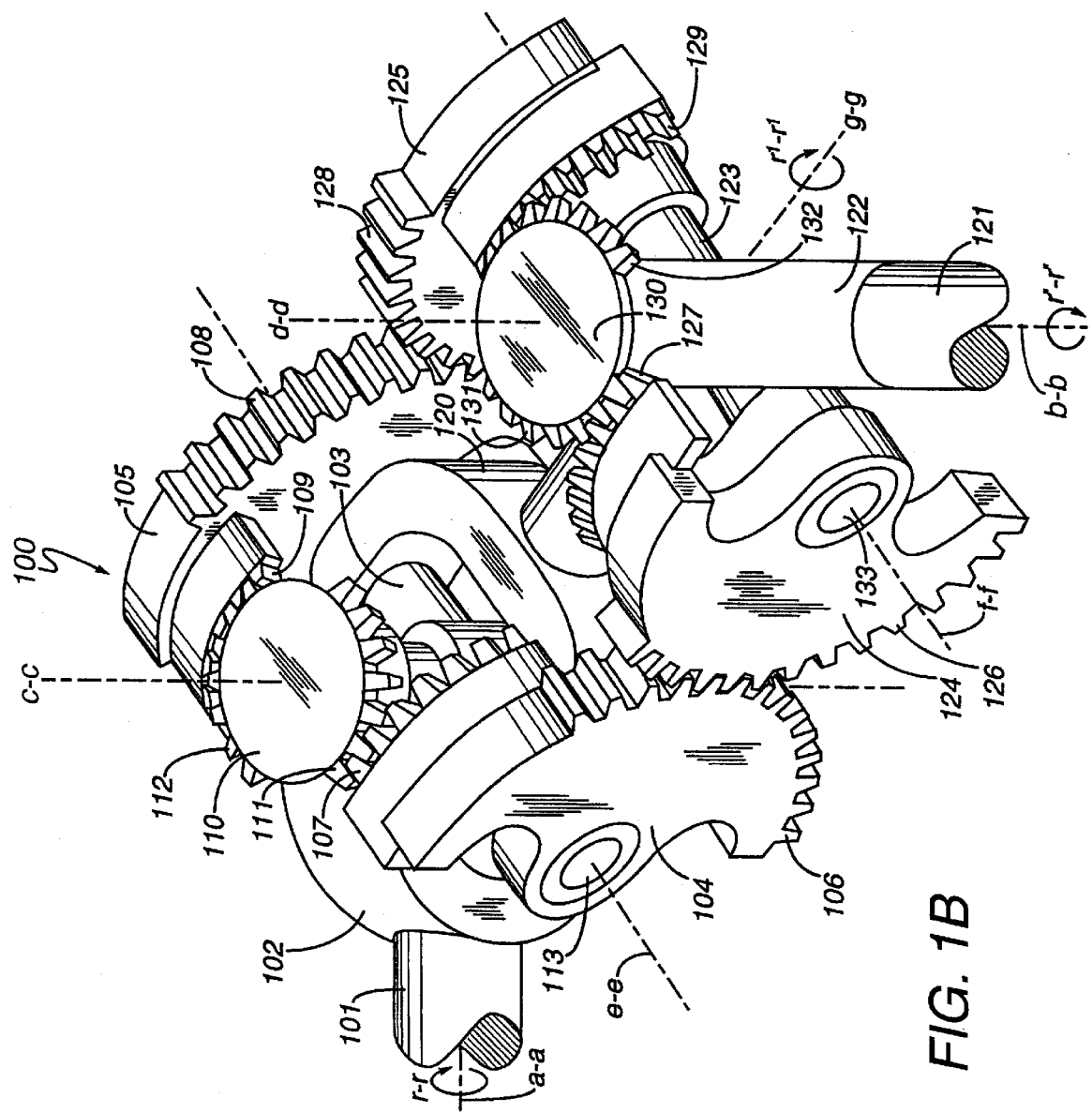
FIG. 1B is a perspective view of the mechanism shown in FIG. 1A with the driving shaft angularly displaced from the driven shaft by 90 degrees to one side.
Figure 1C:
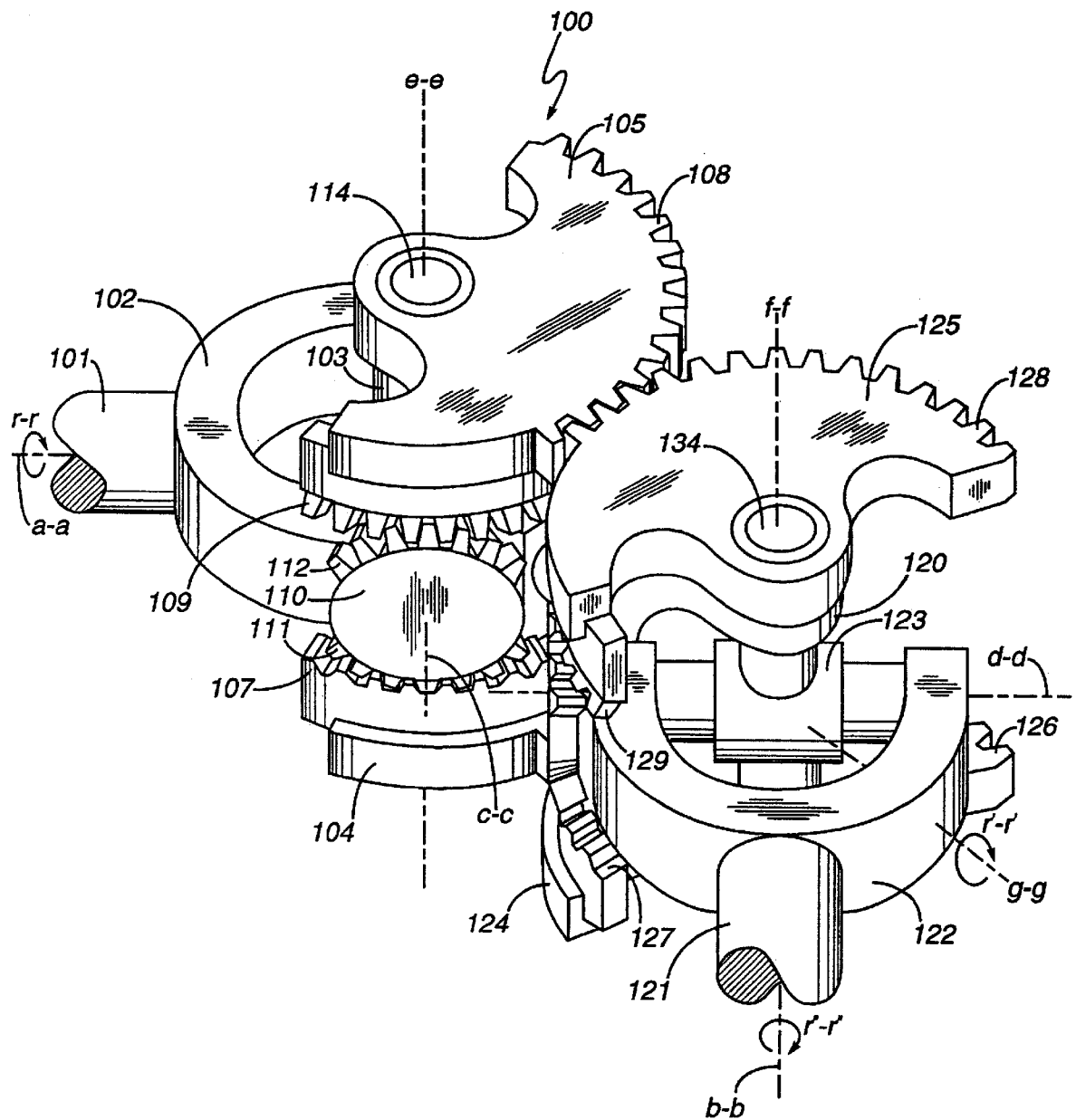
FIG. 1C is a perspective view of the mechanism shown in FIG. 1B with the driving and driven shafts rotated 270° from the position shown in FIG. 1B.
Figure 1D:
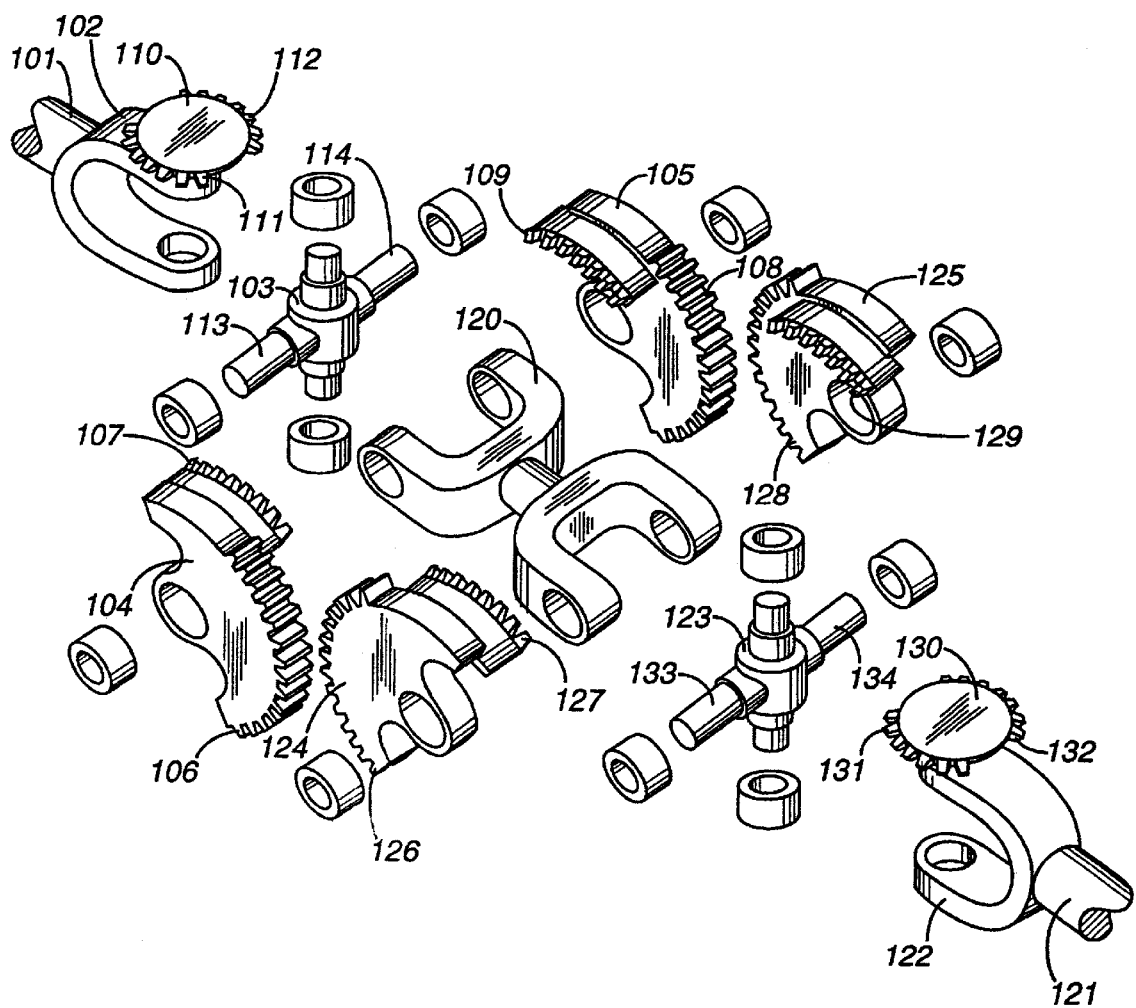
FIG. 1D is an exploded view of the mechanism shown in FIG. 1A.
Figure 2A:
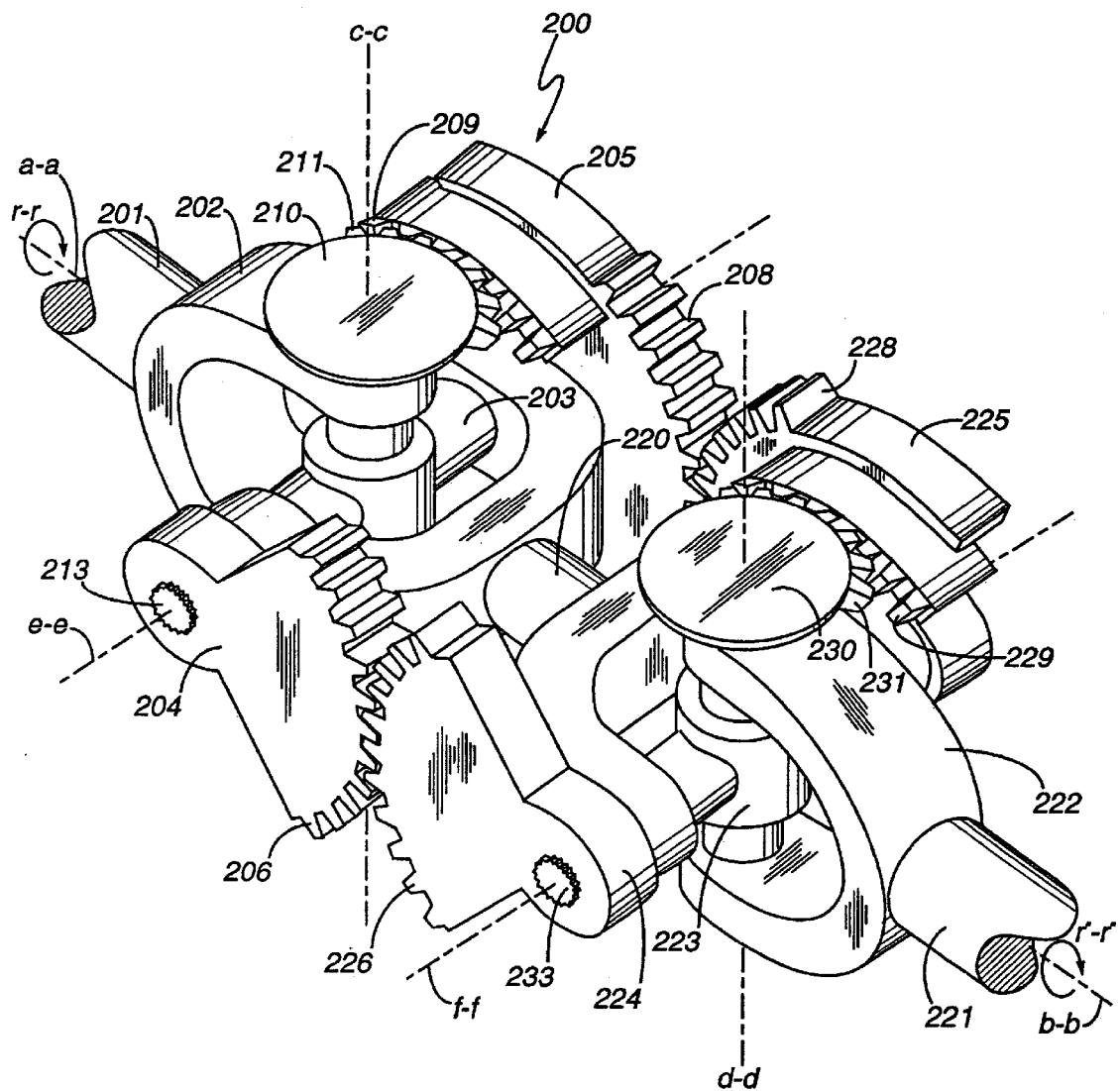
FIG. 2A is a perspective view of an exemplary second embodiment of the invention comprising a double Cardan universal joint where the relative rotation between the cross members and the center yoke is conveyed by two paths, and the relative rotation between the end yokes and the cross members is conveyed by changing the positioning of one of those paths.
Figure 2B:
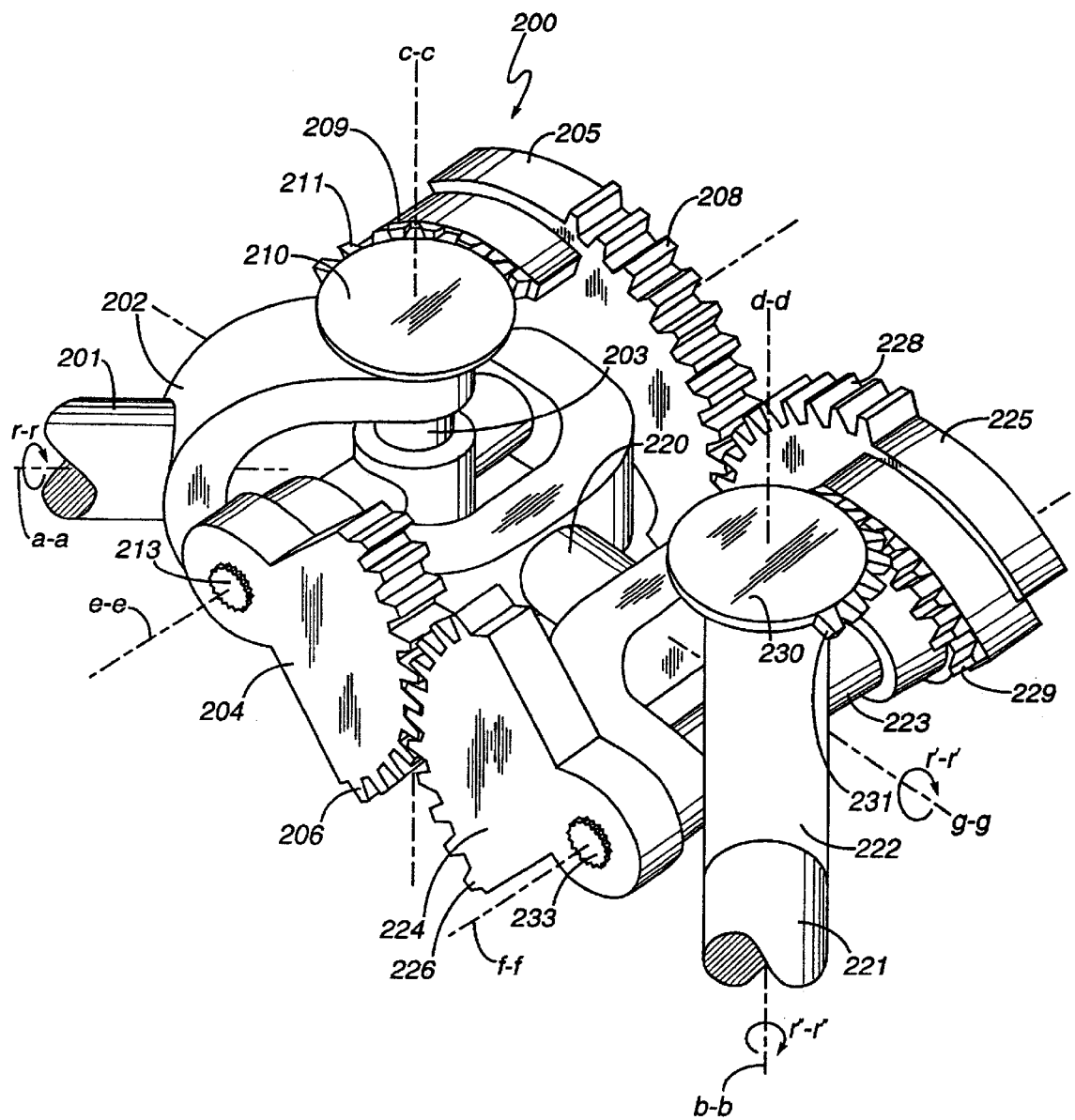
FIG. 2B is a perspective view of the mechanism shown in FIG. 2A with the driving shaft angularly displaced from the driven shaft by 90 degrees to one side.
Figure 2C:
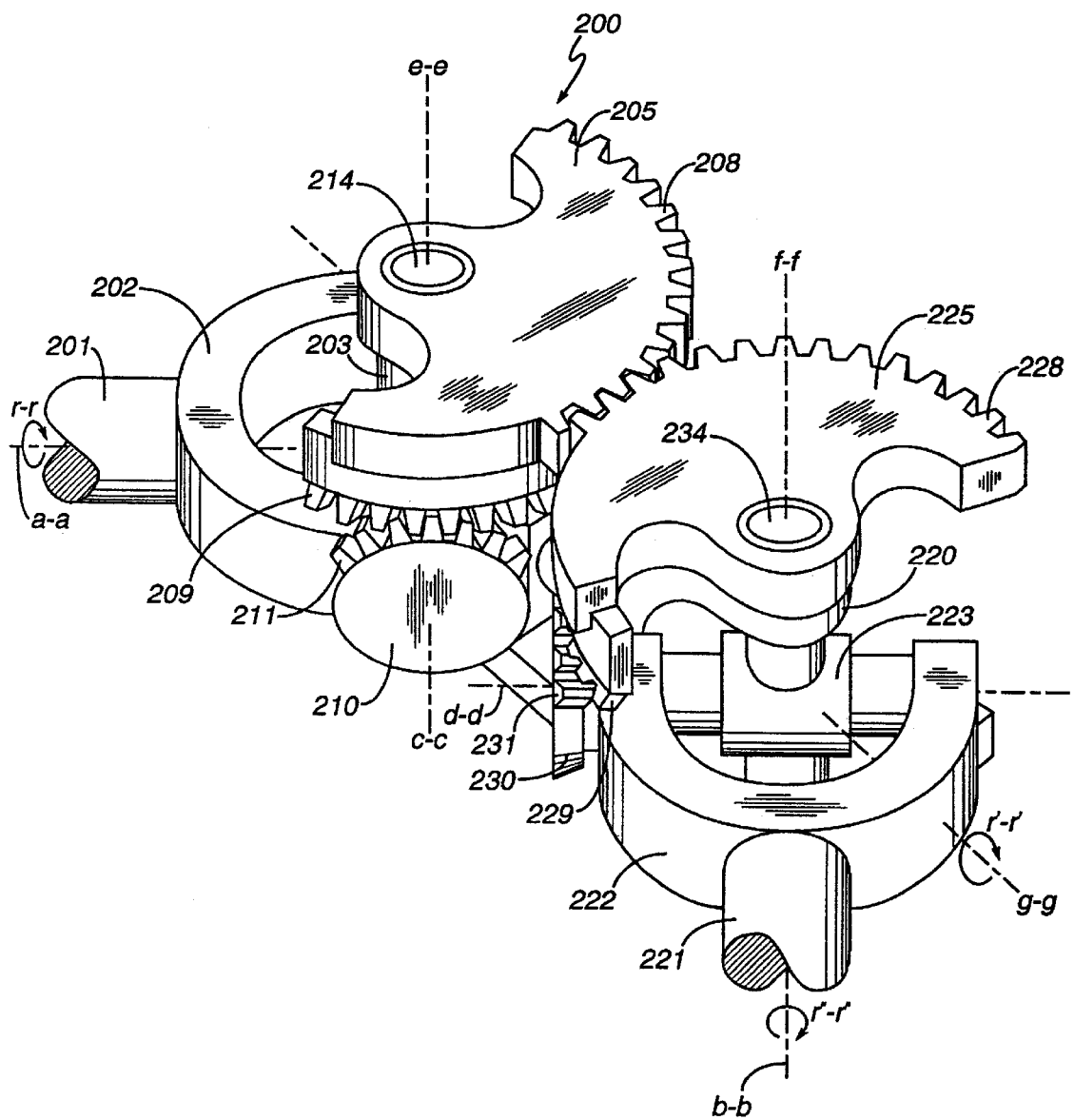
FIG. 2C is a perspective view of the mechanism shown in FIG. 2B with the driving and driven shafts rotated 270° from the position shown in FIG. 1B.
Figure 2D:
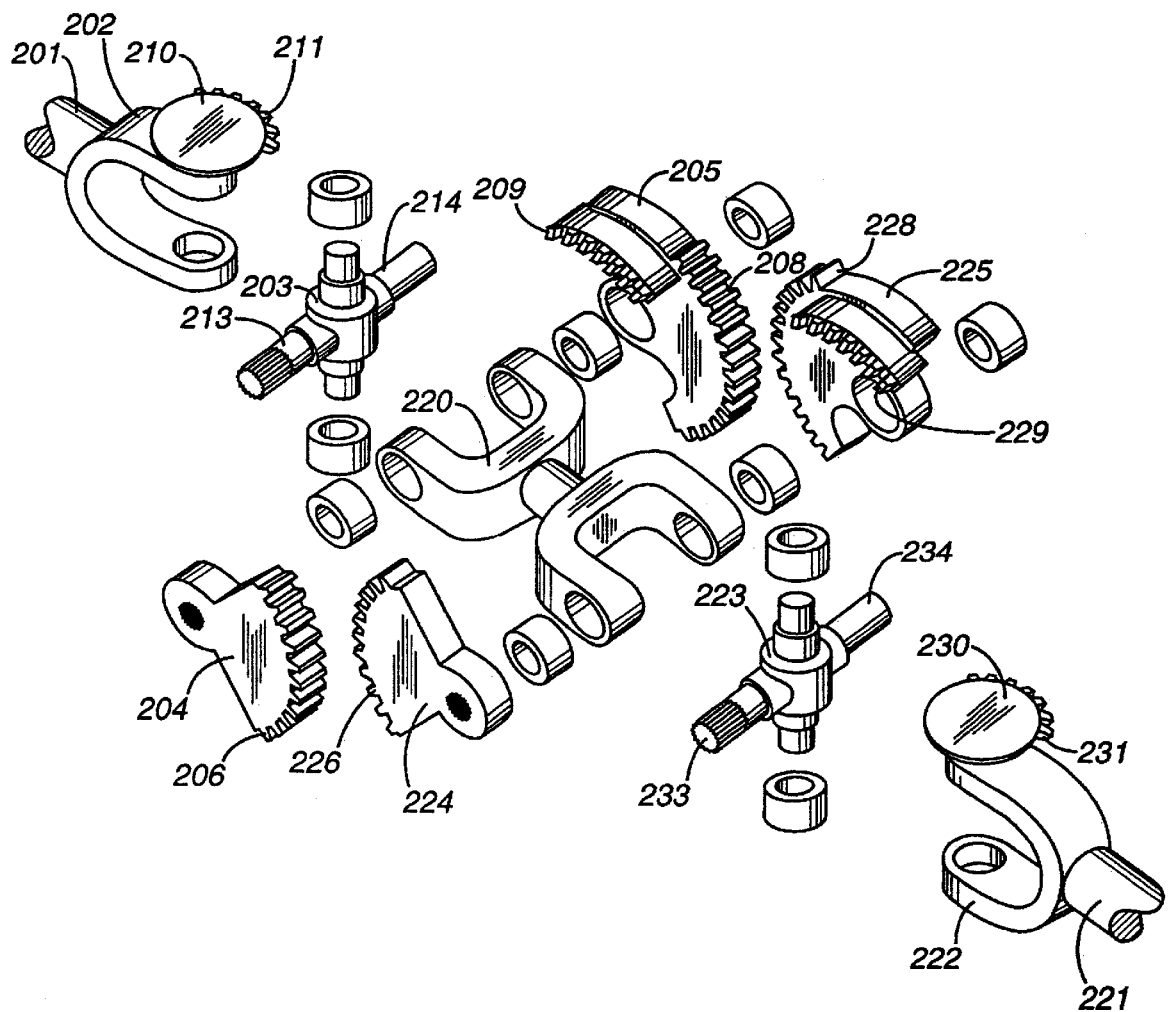
FIG. 2D is an exploded view of the mechanism shown in FIG. 2A.

The basic functioning of my invention is that swivel of an input shaft in a double universal joint about a first pivot point is coupled to swivel of an output shaft of the double universal joint about a second pivot point. Two mechanical paths couple swivel of the shafts. The two paths work in concert to couple swivel of the one shaft about a first axis to equal swivel of the other shaft about a corresponding axis, and the same two paths work in contrast to couple the swivel of the one shaft about a second axis to equal swivel of the other shaft about a second corresponding axis. The input shaft deflects by the same amount as the output shaft should the output shaft move from an initial alignment position and vice versa. My invention can be used to ensure equal and opposite deflection of the shafts or to ensure equal and parallel deflection of the shafts.

The pivot points of double universal joints used with my invention must coincide with the pivot points of my invention. Where the universal joints with which my invention is used include cross members, the intersections of the main axes of the cross members are the pivot points of my invention. For example, a Cardan joint includes a cross member with perpendicular main axes extending through its trunnions and intersecting at the center of the cross member. Here, the center of the cross member is the pivot point. In general, however, there is no requirement that the universal joints include cross members. If, for example, two tripot universal joints are connected back to back and the grooves of the portions attached to the center shaft are aligned, then maintaining this pair of universal joints in an equal angle coplanar configuration will yield true constant velocity operation at up to twice the deflection at which a single tripot universal joint can function.

My invention uses end yokes connected to the ends of the input and output shafts of a double universal joint system. I also include a connector extending between the end yokes. The end yokes can be rigidly mounted on the shafts, in which case they rotate with their respective shafts and cause the connector to rotate. The end yokes can also be rotatably mounted on the shafts so that the end yokes and the connector can remain stationary while the shafts, joints, and, in some configurations, a connecting yoke between the joints rotate within. Either type of mounting works well, though I prefer the rotatable mounting where space and the particular application allow.

In all of the examples provided here, the axes by which the connector is attached to the cross members are parallel, yielding coplanar operation of the input and output shafts. In some current stationary applications, the connection axes of a connecting yoke are not parallel, although both are still perpendicular to the rotational axis of the connecting yoke. They can be described as having a twist. Constant velocity operation of a double Cardan universal joint which has a connecting yoke with a twist can be dynamically achieved by using the apparatus of the invention constructed with the same twist.

The swivel of the shafts about the pivot points can also be called rotation about the pivot points and axes that extend through the pivot points. Because the shafts rotate about their own rotational axes a—a, b—b, however, I refer to pivoting, motion, swivel, or displacement of the shafts about the pivot points and axes that extend through them to avoid confusion. I also refer to swivel of the rotational axes a—a, b—b, which is equivalent to swivel of the shafts themselves.

Figure 7:
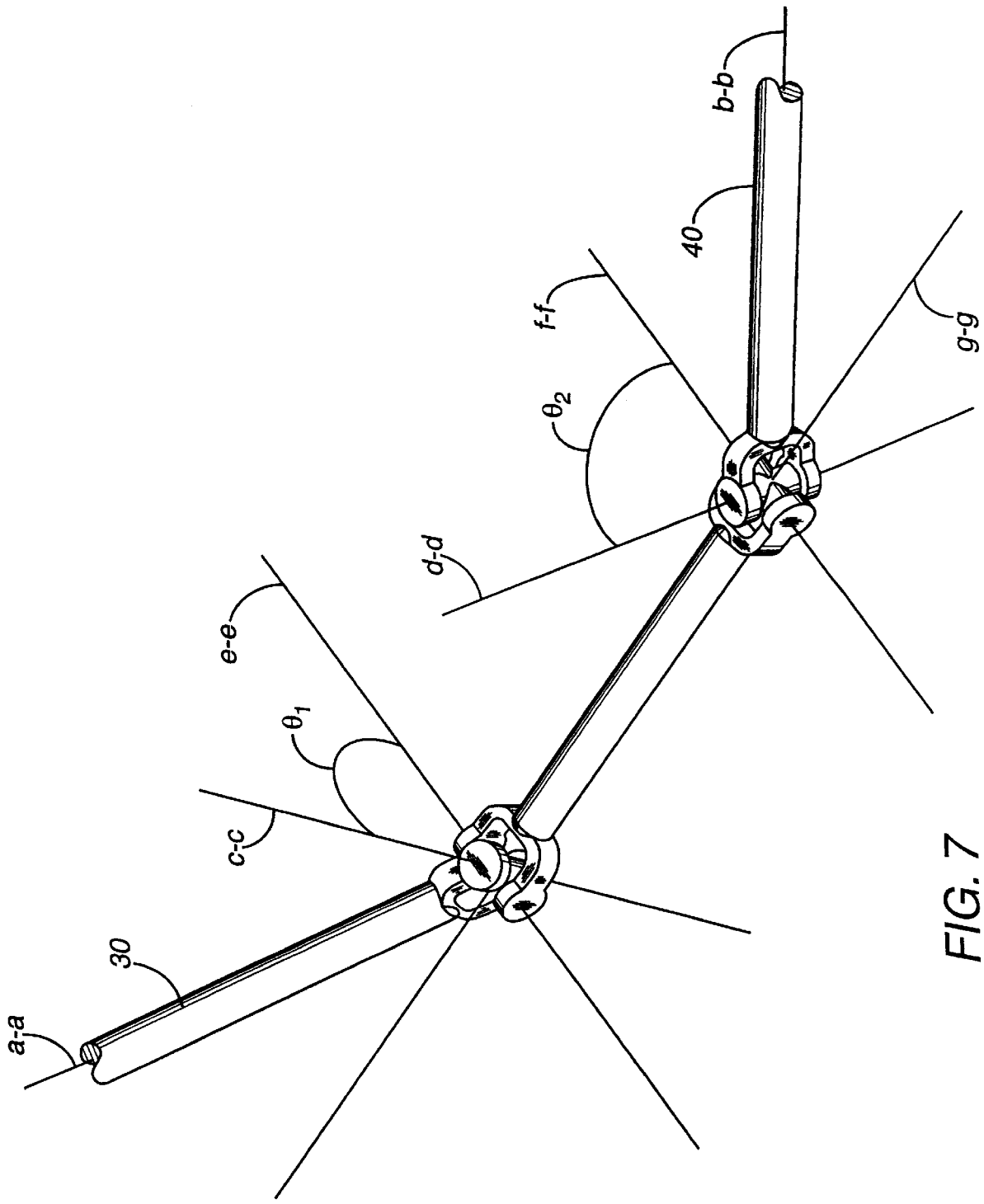
Figure 8:
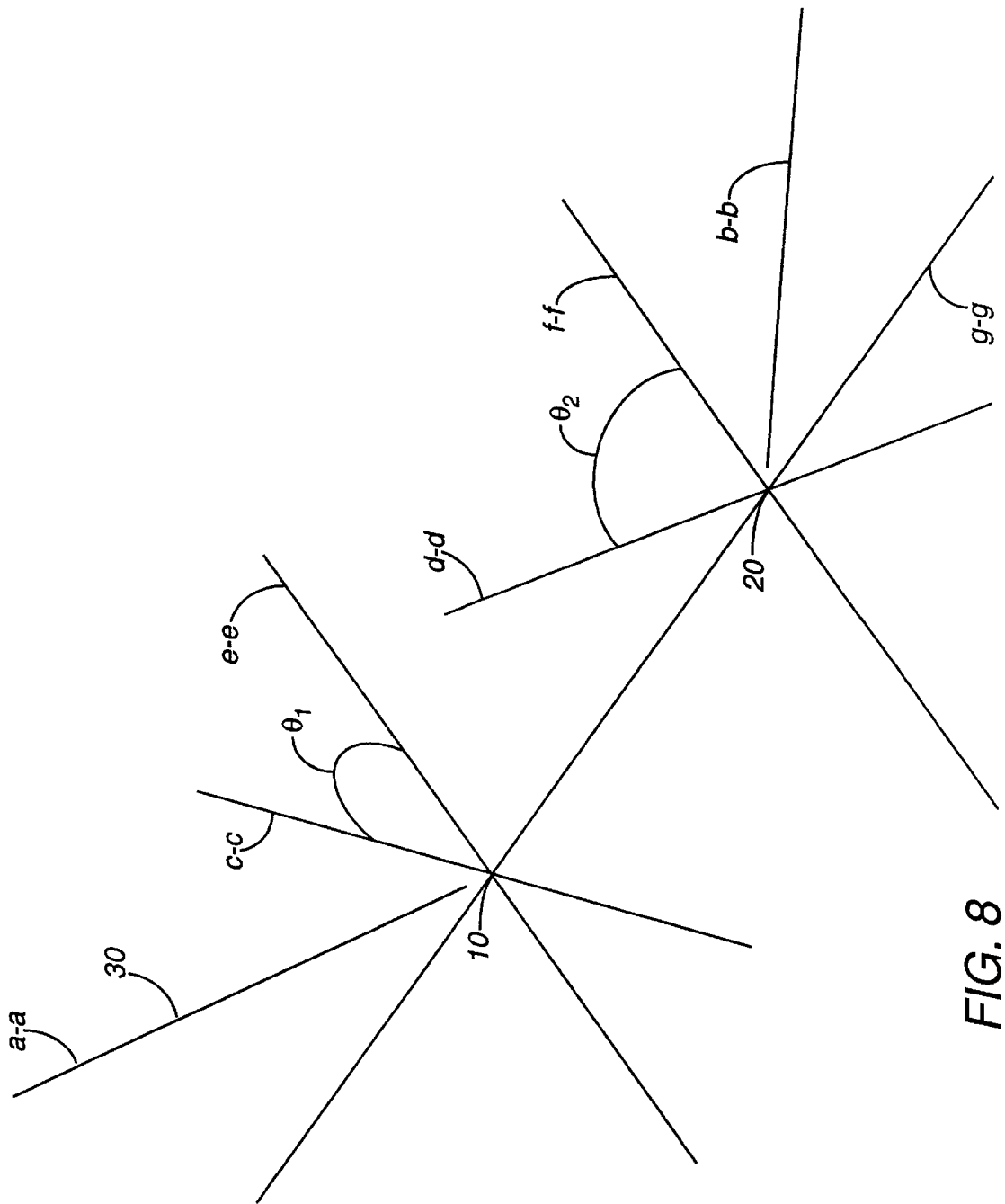

The swivel of the shafts can be described using many different frames of reference. One frame of reference I use is a set of four axes c—c, d—d, e—e, f—f, corresponding to a pair for each pivot point. The axes of each pair intersect the rotational axis of the corresponding shaft at the corresponding pivot point. Thus, referring to FIGS. 7, 8, and 9, two axes c—c and e—e intersect each other and input or driving shaft rotational axis a—a at a first pivot point 10. The axes c—c and e—e are separated by a separation angle $\theta_1$. Still referring to FIGS. 7, 8, and 9, two additional axes d—d and f—f intersect each other and output or driven shaft rotational axis b—b at a second pivot point 20. The axes d—d and f—f are separated by a separation angle $\theta_2$. A connecting axis g—g extends between and through the first and second pivot points 10, 20. This frame of reference is particularly shown in FIG. 8, where the axes a—a, b—b, c—c, d—d, e—e, f—f, g—g; the pivot points 10, 20; and the separation angles $\theta_1$, $\theta_2$ are shown schematically without the input and output shafts 30, 40 and a connecting yoke.

I mount elements of the two mechanical paths or mechanical linkages on and between the end yokes. There are four essential transmitting modules in my system that transmit motion or swivel of one shaft to the other shaft. First and second transmitting modules 50, 51 are arranged to primarily handle motion of the input shaft 30 about first and second axes c—c, e—e, respectively. Similarly, third and fourth transmitting modules 52, 53 are arranged to primarily handle motion of the output shaft 40 about third and fourth axes d—d, f—f, respectively. The first module 50 transmits motion of the input shaft 10 about the first axis c—c to the third module 52 via the second and fourth modules 51, 53. The third module 52 causes the output shaft 40 to move about the third axis d—d in a manner corresponding to the motion of the input shaft 30 and vice versa. This always uses the first mechanical path and either directly or indirectly utilizes the second mechanical path. The actual elements of the transmitting modules 50, 51, 52, 53 will vary with the particular application and configuration of the guide.

The second module 51 transmits motion of the input shaft 30 about the second axis e—e directly to the fourth module 53, the fourth module 53 causing motion of the output shaft 40 about the fourth axis f—f in a manner corresponding to the motion of the input shaft 30 and vice versa. This uses both mechanical paths, and again the actual elements of the transmitting modules 50, 51, 52, 53 will vary with the particular application and configuration of the guide. In the parallel axis configuration, a reversing element can be interposed between the second and fourth modules 51, 53, becoming part of the first and second mechanical paths.

The exemplary implementations of my invention described below illustrate some of the different elements and configurations usable with my invention. I emphasize that these are only exemplary and that my invention is not limited to these particular implementations, types of universal joints, or types of joint systems. Further, as seen in the sixth embodiment, my invention is not limited to employing right-angle symmetric cross members, nor is it limited to use with double Cardan joints. In all instances, the terms "driving" and "driven" are equivalent to "input" and "output," respectively, when used to describe shafts, end yokes, and other parts or portions of parts of the invention. I use these terms for the purposes of description only, and other terms, such as "first" and "second", can also be used to describe these parts. The roles of "driving" and "driven" shafts can generally be interchanged.

The terms "clock-wise" and "counter-clock-wise" as used hereafter are based on viewing from the front-left or from above in the first figure for each embodiment.

Direct Symmetrical Embodiment (First Embodiment)

An exemplary implementation of a direct symmetrical embodiment 100 comprising a double Cardan universal joint is shown in FIGS. 1A, 1B, 1C, and 1D. Driving shaft 101 is joined to driving end yoke 102. Driving rotation axis a—a is the axis of rotation of driving shaft 101. Driving cross member 103 is pivotably mounted on driving end yoke 102 and is operatively arranged for pivoting about first driving connection axis c—c. Driving cross member 103 is also pivotably mounted to connecting yoke 120 and is operatively arranged for pivoting about second driving connection axis e—e. Connecting rotation axis g—g is the axis of rotation of connecting yoke 120. First driving connection axis c—c is substantially intersecting and perpendicular to second driving connection axis e—e. First extended driving trunnion 113 and second extended driving trunnion 114 of driving cross member 103 extend beyond connecting yoke 120. The center of the driving cross member 103 is the first pivot point 10.

Driven shaft 121 is joined to driven end yoke 122. Driven rotation axis b—b is the axis of rotation of driven shaft 121. Driven cross member 123 is pivotably mounted on driven end yoke 122 and is operatively arranged for pivoting about first driven connection axis d—d. Driven cross member 123 is also pivotably mounted to connecting yoke 120 and is operatively arranged for pivoting about second driven connection axis f—f. First driven connection axis d—d is substantially intersecting and perpendicular to second driven connection axis f—f. First extended driven trunnion 133 and second extended driven trunnion 134 of driven cross member 123 extend beyond connecting yoke 120. The center of the driven cross member 123 is the second pivot point 20. Second driven connection axis f—f is substantially parallel to second driving connection axis e—e.

The double Cardan universal joint 140 comprises driving shaft 101, driving end yoke 102, driving cross member 103, connecting yoke 120, driven cross member 123, driven end yoke 122, and driven shaft 121.

Driving bevel gear 110 is rigidly mounted to or integral with driving end yoke 102. Driving bevel gear 110 comprises driving bevel gear first teeth 111 and driving bevel gear second teeth 112. First driving gear 104 and second driving gear 105 are pivotably mounted on first extended driving trunnion 113 and second extended driving trunnion 114, respectively, and are operatively arranged to pivot about axis e—e. Each of the driving gears comprises both spur teeth and bevel teeth. First driving gear 104 carries first driving gear spur teeth 106 and first driving gear bevel teeth 107. Second driving gear 105 carries second driving gear spur teeth 108 and second driving gear bevel teeth 109. Driving bevel gear 110 is an element of the first transmitting module 50, and first and second driving gears 104, 105 are elements of the second transmitting module 51 in this implementation.

Driven bevel gear 130 is rigidly mounted to or is integral with driven end yoke 122. Driven bevel gear 130 comprises driven bevel gear first teeth 131 and driven bevel gear second teeth 132. First driven gear 124 and second driven gear 125 are pivotably mounted on first extended driven trunnion 133 and second extended driven trunnion 134, respectively. Each of the driven gears comprises both spur teeth and bevel teeth. First driven gear 124 carries first driven gear spur teeth 126 and first driven gear bevel teeth 127. Second driven gear 125 carries second driven gear spur teeth 128 and second driven gear bevel teeth 129. Driven bevel gear 130 is an element of the third transmitting module 52, and first and second driven gears 124, 125 are elements of the fourth transmitting module 53 in this implementation.

First driving gear bevel teeth 107 mesh with driving bevel gear first teeth 111, and second driving gear bevel teeth 109 mesh with driving bevel gear second teeth 112.

First driven gear bevel teeth 127 mesh with driven bevel gear first teeth 131, and second driven gear bevel teeth 129 mesh with driven bevel gear second teeth 132.

First driving gear spur teeth 106 mesh with first driven gear spur teeth 126.

Second driving gear spur teeth 108 mesh with second driven gear spur teeth 128.

Driving rotation r—r of the driving shaft 101 occurs about axis a—a. Connecting rotation r'—r' of connecting yoke 120 occurs about axis g—g. Driven rotation r"—r" of driven shaft 121 occurs about axis b—b.

In this embodiment, a first mechanical path comprises driving bevel gear 110, first driving gear 104, first driven gear 124, and driven bevel gear 130. A second mechanical path comprises driving bevel gear 110, second driving gear 105, second driven gear 125, and driven bevel gear 130.

Operation—Direct Symmetrical Embodiment (First Embodiment)

First driving gear bevel teeth 107 mesh with driving bevel gear first teeth 111, and second driving gear bevel teeth 109 mesh with driving bevel gear second teeth 112. This links clock-wise pivoting of driving bevel gear 110 about axis c—c to counter-clock-wise pivoting of first driving gear 104 about axis e—e and to equal clock-wise pivoting of second driving gear 105 about axis e—e.

First driven gear bevel teeth 127 mesh with driven bevel gear first teeth 131, and second driven gear bevel teeth 129 mesh with driven bevel gear second teeth 132. This links clock-wise pivoting of driven bevel gear 130 about axis d—d to counter-clock-wise pivoting of first driven gear 124 about axis f—f and to equal clock-wise pivoting of second driven gear 125 about axis f—f.

When driving end yoke 102 pivots together with driving bevel gear 110 clock-wise about axis e—e, the meshing of first driving gear bevel teeth 107 with driving bevel gear first teeth 111 links that pivoting to identical clock-wise pivoting of first driving gear 104 clock-wise about axis e—e. Likewise, the meshing of second driving gear bevel teeth 109 with driving bevel gear second teeth 112 links clock-wise pivoting of driving end yoke 102 together with driving bevel gear 110 about axis e—e to identical clock-wise pivoting of second driving gear 105 about axis e—e. Since axis e—e is not coaxial with axis c—c, driving cross member 103 must pivot with driving end yoke 102 about axis e—e. In other words, pivoting of driving end yoke 102 about axis e—e causes driving end yoke 102, driving bevel gear 110, driving cross member 103, first driving gear 104, and second driving gear 105 to pivot about axis e—e as a unit.

When driven end yoke 122 pivots together with driven bevel gear 130 clock-wise about axis f—f, the meshing of driven gear bevel teeth 127 with driven bevel gear first teeth 131 links that pivoting to identical clock-wise pivoting of first driven gear 124 clock-wise about axis f—f. Likewise, the meshing of second driven gear bevel teeth 129 with driven bevel gear second teeth 132 links clock-wise pivoting of driven end yoke 122 together with driven bevel gear 130 about axis f—f to identical clock-wise pivoting of second driven gear 125 about axis f—f. Since axis f—f is not coaxial with axis d—d, driven cross member 123 must pivot with driven end yoke 122 about axis f—f. In other words, pivoting of driven end yoke 122 about axis f—f causes driven end yoke 122, driven bevel gear 130, driven cross member 123, first driven gear 124, and second driven gear 125 to pivot about axis f—f as a unit.

First driving gear spur teeth 106 mesh with first driven gear spur teeth 126, linking the pivoting of first driving gear 104 about axis e—e to equal and opposite pivoting of first driven gear 124 about axis f—f. In other words, as first driving gear 104 pivots clock-wise about axis e—e, first driven gear 124 pivots equally counter-clock-wise about axis f—f.

Second driving gear spur teeth 108 mesh with second driven gear spur teeth 128, linking the pivoting of second driving gear 105 about axis e—e to equal and opposite pivoting of second driven gear 125 about axis f—f. In other words, as second driving gear 105 pivots clock-wise about axis e—e, second driven gear 125 pivots equally counter-clock-wise about axis f—f.

Clock-wise pivotal motion of driving end yoke 102 about axis c—c causes first driving gear 104 to pivot counter-clock-wise about axis e—e and also causes second driving gear 105 to pivot equally clock-wise about axis e—e. In turn, since first driving gear 104 and first driven gear 124 are linked to pivot equally in opposite directions, this causes first driven gear 124 to pivot clock-wise about axis f—f. Also, since second driving gear 105 and second driven gear 125 are linked to pivot equally in opposite directions, the pivoting of second driving gear 105 clock-wise about axis e—e causes second driven gear 125 to pivot equally counter-clock-wise about axis f—f. The clock-wise pivoting of first driven gear 124 about axis f—f and the equal counter-clock-wise pivoting of second driven gear 125 about axis f—f cause driven bevel gear 130 to pivot counter-clock-wise about axis d—d. Since driven bevel gear 130 is rigidly mounted on or is integral with driven end yoke 122, this causes driven end yoke 122 to pivot counter-clock-wise about axis d—d. Clock-wise pivoting of driving end yoke 102 about axis c—c is exactly matched by equal counter-clock-wise pivoting of driven end yoke 122 about axis d—d.

Clock-wise pivoting of driving end yoke 102 about driving second axis e—e compels first driving gear 104 and second driving gear 105 to pivot equally clock-wise about axis e—e. Since first driving gear 104 and first driven gear 124 are linked to pivot equally in opposite directions, and since second driving gear 105 and second driven gear 125 are linked to pivot equally in opposite directions, the equal pivoting of the first driving gear 104 and second driving gear 105 clock-wise about axis e—e causes first driven gear 124 and second driven gear 125 to pivot equally counter-clock-wise together about axis f—f. The equal counter-clock-wise pivoting of first driven gear 124 and second driven gear 125 together about axis f—f causes driven end yoke 122 to pivot counter-clock-wise with driven cross member 123 about axis f—f. In other words, clock-wise pivoting of driving end yoke 102 about axis e—e causes equal counter-clock-wise pivoting of driven end yoke 122 about axis f—f.

In a straight initial configuration, axes a—a, b—b, and g—g are collinear. In operation, however, since clock-wise pivoting of driving end yoke 102 about axis c—c is exactly matched by counter-clock-wise pivoting of driven end yoke 122 about axis d—d, and since clock-wise pivoting of driving end yoke 102 about axis e—e is exactly matched by counter-clock-wise pivoting of driven end yoke 122 about axis f—f, any pivoting of driving end yoke 102 in relation to connecting yoke 120 is exactly matched in magnitude and direction by pivoting of driven end yoke 122 in relation to connecting yoke 120. Consequently, axis a—a, axis b—b, and axis g—g always lie in the same plane and the angle between axis a—a and axis g—g are always equal to the angle between axis b—b and axis g—g. Further, in the plane containing axis a—a, axis b—b, and axis g—g at any moment, axis a—a and axis b—b always lie on the same side axis g—g.

As the double Cardan universal joint 140 rotates, the angles between axis a—a and axis b—b can change. However, as axis a—a and axis b—b deviate away from straight, axis a—a, axis b—b, and axis g—g are all compelled to stay in a coplanar configuration. Further, the angle between axis a—a and axis g—g is compelled to remain equal to the angle between axis b—b and axis g—g. This fulfills the requirements for constant velocity operation of a double Cardan joint according to the article by Johnson and Willems cited above. The ratio r—r:r'—r' is equal to the ratio r"—r":r'—r'. Rotation r—r is therefore always equal to rotation r"—r".

Direct Asymmetrical Embodiment (Second Embodiment)

An exemplary implementation of a direct asymmetrical embodiment 200 comprising a double Cardan universal joint is shown in FIGS. 2A, 2B, 2C, and 2D.

Driving shaft 201 is joined to driving end yoke 202. Driving rotation axis a—a is the axis of rotation of driving shaft 201. Driving cross member 203 is pivotably mounted on driving end yoke 202 and operatively arranged for pivoting about first driving connection axis c—c. Driving cross member 203 is also pivotably mounted to connecting yoke 220 and operatively arranged for pivoting about second driving connection axis e—e. The center of the driving cross member 203 is the first pivot point 10. Connecting rotation axis g—g is the axis of rotation of connecting yoke 220. First driving connection axis c—c is substantially intersecting and perpendicular to second driving connection axis e—e. First extended driving trunnion 213 and second extended driving trunnion 214 of driving cross member 203 extend beyond connecting yoke 220. The portion of first extended driving trunnion 213 that extends beyond connecting yoke 220 is splined.

Driven shaft 221 is joined to driven end yoke 222. Driven rotation axis b—b is the axis of rotation of driven shaft 221. Driven cross member 223 is pivotably mounted on driven end yoke 222 and operatively arranged for pivoting about first driven connection axis d—d. Driven cross member 223 is also pivotably mounted to connecting yoke 220 and operatively arranged for pivoting about second driven connection axis f—f. The center of the driven cross member 223 is the second pivot point 20. First driven connection axis d—d is substantially intersecting and perpendicular to second driven connection axis f—f. First extended driven trunnion 233 and second extended driven trunnion 234 of driven cross member 223 extend beyond connecting yoke 220. The portion of first extended driven trunnion 233 that extends beyond connecting yoke 220 is splined.

Second driven connection axis f—f is substantially parallel to second driving connection axis e—e.

The double Cardan universal joint 240 comprises driving shaft 201, driving end yoke 202, driving cross member 203, connecting yoke 220, driven cross member 223, driven end yoke 222, and driven shaft 221.

Driving bevel gear 210 is rigidly mounted to or is integral with driving end yoke 202. Driving bevel gear 210 comprises driving bevel gear teeth 211. First driving gear 204 is rigidly mounted on the splined portion of first extended driving trunnion 213. Second driving gear 205 is pivotably mounted on second extended driving trunnion 214. First driving gear 204 carries first driving gear spur teeth 206. Second driving gear 205 carries second driving gear spur teeth 208 and second driving gear bevel teeth 209. Driving bevel gear 210 is an element of the first transmitting module 50, and first and second driving gears 204, 205 are elements of the second transmitting module 51 in this implementation.

Driven bevel gear 230 is rigidly mounted to or is integral with driven end yoke 222. Driven bevel gear 230 comprises driven bevel gear teeth 231. First driven gear 224 is rigidly mounted on the splined portion of first extended driven trunnion 233. Second driven gear 225 is pivotably mounted on second extended driven trunnion 234. First driven gear 224 carries first driven gear spur teeth 226. Second driven gear 225 carries second driven gear spur teeth 228 and second driven gear bevel teeth 229. Driven bevel gear 230 is an element of the third transmitting module 52, and first and second driven gears 224, 225 are elements of the fourth transmitting module 53 in this implementation.

Second driving gear bevel teeth 209 mesh with driving bevel gear teeth 211.

Second driven gear bevel teeth 229 mesh with driven bevel gear teeth 231.

First driving gear spur teeth 206 mesh with first driven gear spur teeth 226.

Second driving gear spur teeth 208 mesh with second driven gear spur teeth 228.

Driving rotation r—r of the driving shaft 201 occurs about axis a—a. Connecting rotation r'—r' of connecting yoke 220 occurs about axis g—g. Driven rotation r"–r" of driven shaft 221 occurs about axis b—b.

In this embodiment, a first mechanical path comprises driving bevel gear 210, first driving gear 204, first driven gear 224, and driven bevel gear 230. A second mechanical path comprises driving cross member 203, second driving gear 205, second driven gear 225, and driven cross member 223.

Operation—Direct Asymmetrical Embodiment (Second Embodiment)

Second driving gear bevel teeth 209 mesh with driving bevel gear teeth 211. This links clock-wise pivoting of driving bevel gear 210 and driving end yoke 202 about axis c—c to clock-wise pivoting of second driving gear 205 about axis e—e. However, since pivoting of driving bevel gear 210 about axis c—c is not linked to pivoting of driving cross member 203 about axis e—e, first driving gear 204 does not pivot about axis e—e.

Second driven gear bevel teeth 229 mesh with driven bevel gear teeth 231. This links clock-wise pivoting of driven bevel gear 230 and driven end yoke 222 about axis d—d to clock-wise pivoting of second driven gear 225 about axis f—f. However, since pivoting of driven bevel gear 230 about axis d—d is not linked to pivoting of driven cross member 223 about axis f—f, first driven gear 224 does not pivot about axis f—f.

When driving end yoke 202 pivots together with driving bevel gear 210 clock-wise about axis e—e, driving cross member 203 pivots with them because first driving connection axis c—c is substantially perpendicular to second driving connection axis e—e. The rigid mounting of first driving gear 204 on first extended driving trunnion 213 then links the pivoting of driving cross member 203 to identical pivoting of first driving gear 204 clock-wise about axis e—e. The meshing of second driving gear bevel teeth 209 with driving bevel gear teeth 211 links clock-wise pivoting of driving end yoke 202 together with driving bevel gear 210 clock-wise about axis e—e to identical clock-wise pivoting of second driving gear 205 about axis e—e. In other words, clock-wise pivoting of driving end yoke 202 about axis e—e is linked to driving end yoke 202, driving bevel gear 210, driving cross member 203, first driving gear 204, and second driving gear 205 pivoting clock-wise about axis e—e as a unit.

When driven end yoke 222 pivots together with driven bevel gear 230 clock-wise about axis f—f, driven cross member 223 pivots with them because first driven connection axis d—d is substantially perpendicular to second driven connection axis f—f. The rigid mounting of first driven gear 224 on first extended driven trunnion 233 then links the pivoting of driven cross member 223 to identical pivoting of first driven gear 224 clock-wise about axis f—f. The meshing of second driven gear bevel teeth 229 with driven bevel gear teeth 231 links clock-wise pivoting of driven end yoke 222 together with driven bevel gear 230 clock-wise about axis f—f to identical clock-wise pivoting of second driven gear 225 about axis f—f. In other words, clock-wise pivoting of driven end yoke 222 about axis f—f is linked to driven end yoke 222, driven bevel gear 230, driven cross member 223, first driven gear 224, and second driven gear 225 pivoting clock-wise about axis f—f as a unit.

First driving gear spur teeth 206 mesh with first driven gear spur teeth 226, linking the pivoting of first driving gear 204 about axis e—e to equal and opposite pivoting of first driven gear 224 about axis f—f. In other words, as first driving gear 204 pivots clock-wise about axis e—e, first driven gear 224 pivots equally counter-clock-wise about axis f—f.

Second driving gear spur teeth 208 mesh with second driven gear spur teeth 228, linking the pivoting of second driving gear 205 about axis e—e to equal and opposite pivoting of second driven gear 225 about axis f—f. In other words, as second driving gear 205 pivots clock-wise about axis e—e, second driven gear 225 pivots equally counter-clock-wise about axis f—f.

Clock-wise pivotal motion of driving end yoke 202 about axis c—c causes second driving gear 205 to pivot clock-wise about axis e—e relative to connecting yoke 220 while first driving gear 204 does not pivot about axis e—e. Consequently, second driven gear 225 pivots counter-clock-wise about axis f—f, and first driven gear 224 does not pivot about axis f—f. Since first driven gear 224 does not pivot about axis f—f, driven cross member 223 does not pivot about axis f—f. Since second driven gear 225 pivots counter-clock-wise about axis f—f, and since driven cross member 223 does not pivot about axis f—f, driven bevel gear 230 pivots counter-clock-wise about axis d—d. Since driven bevel gear 230 is rigidly mounted on or is integral with driven end yoke 222, this causes driven end yoke 222 to pivot counter-clock-wise about axis d—d. Thus, clock-wise pivoting of driving end yoke 202 about axis c—c is exactly matched by counter-clock-wise pivoting of driven end yoke 222 about axis d—d.

Clock-wise pivoting of driving end yoke 202 about axis e—e causes first driving gear 204 and second driving gear 205 to pivot equally clock-wise about axis e—e. Clock-wise pivoting of first driving gear 204 about axis e—e causes equal counter-clock-wise pivoting of first driven gear 224 about axis f—f. Clock-wise pivoting of second driving gear 205 about axis e—e causes equal counter-clock-wise pivoting of second driven gear 225 about axis f—f. The equal counter-clock-wise pivoting of first driven gear 224 and second driven gear 225 about axis f—f then causes driven cross member 223, driven end yoke 222, and driven bevel gear 230 to pivot with them. Since driven bevel gear 230 is pivoting together with second driven gear 225, there is no pivotal motion of driven bevel gear 230 and driven end yoke 222 about axis d—d. Thus, clock-wise pivoting of driving end yoke 202 about axis e—e causes equal counter-clock-wise pivoting of driven end yoke 222 about axis f—f.

In a straight initial configuration, axes a—a, b—b, and g—g are collinear. Since clock-wise pivoting of driving end yoke 202 about axis c—c is exactly matched by counter-clock-wise pivoting of driven end yoke 222 about axis d—d, and since clock-wise pivoting of driving end yoke 202 about axis e—e is exactly matched by counter-clock-wise pivoting of driven end yoke 222 about axis f—f, any pivoting of driving end yoke 202 in relation to connecting yoke 220 is exactly matched in magnitude and direction by pivoting of driven end yoke 222 in relation to connecting yoke 220. Consequently, axis a—a, axis b—b, and axis g—g always lie in the same plane and the angles between axis a—a and axis g—g are always equal to the angles between axis b—b and axis g—g. Further, in the plane containing axis a—a, axis b—b, and axis g—g at any moment, axis a—a and axis b—b always lie on the same side axis g—g.

As the double Cardan universal joint rotates, the angles between axis a—a and axis b—b can change. However, as axis a—a and axis b—b deviate away from straight, axis a—a, axis b—b, and axis g—g are all compelled to stay in a coplanar configuration at all times. Further, the angle between axis a—a and axis g—g is compelled to remain equal to the angle between axis b—b and axis g—g. This fulfills the requirements for constant velocity operation of a double Cardan joint according to the article by Johnson and Willems cited above. The ratio r—r:r'—r' is equal to the ratio r"—r":r'—r'. Rotation r—r is therefore always equal to rotation r"—r".

External Symmetrical Embodiment (Third Embodiment)

An exemplary implementation of an external symmetrical embodiment 300 comprising a non-rotating mechanism controlling the positioning of a rotating double Cardan universal joint is shown in FIGS. 3A, 3B, 3C, 3D, 3E, and 3F.

Connecting yoke 320 comprises two halves: connecting yoke first half 318 and connecting yoke second half 319.

Driving cross member 303 is pivotably mounted on driving end yoke 302 and is operatively arranged for pivoting about first driving connection axis c—c. Driving cross member 303 is also pivotably mounted to connecting yoke 320 and is operatively arranged for pivoting about second driving connection axis e—e. The center of the driving cross member 303 is the first pivot point 10. First driving connection axis c—c is substantially intersecting and perpendicular to second driving connection axis e—e.

Driven cross member 323 is pivotably mounted on driven end yoke 322 and is operatively arranged for pivoting about first driven connection axis d—d. Driven cross member 323 is also pivotably mounted to connecting yoke 320 and is operatively arranged for pivoting about second driven connection axis f—f. The center of the driven cross member 323 is the second pivot point 20. First driven connection axis d—d is substantially intersecting and perpendicular to second driven connection axis f—f. Second driven connection axis f—f is substantially parallel to second driving connection axis e—e.

Driving bevel gear 310 is rigidly mounted to or is integral with driving end yoke 302. Driving bevel gear 310 comprises driving bevel gear first teeth 311 and driving bevel gear second teeth 312. First driving gear 304 and second driving gear 305 are pivotably mounted to connecting yoke 320 and are operatively arranged to pivot about axis e—e. Each of the driving gears comprises both spur teeth and bevel teeth. First driving gear 304 carries first driving gear spur teeth 306 and first driving gear bevel teeth 307. Second driving gear 305 carries second driving gear spur teeth 308 and second driving gear bevel teeth 309. Driving bevel gear 310 is an element of the first transmitting module 50, and first and second driving gears 304, 305 are elements of the second transmitting module 51 in this implementation.

Driven bevel gear 330 is rigidly mounted to or is integral with driven end yoke 322. Driven bevel gear 330 comprises driven bevel gear first teeth 331 and driven bevel gear second teeth 332. First driven gear 324 and second driven gear 325 are pivotably mounted to connecting yoke 320 and are operatively arranged to pivot about axis f—f. Each of the driven gears comprises both spur teeth and bevel teeth. First driven gear 324 carries first driven gear spur teeth 326 and first driven gear bevel teeth 327. Second driven gear 325 carries second driven gear spur teeth 328 and second driven gear bevel teeth 329. Driven bevel gear 330 is an element of the third transmitting module 52, and first and second driven gears 324, 325 are elements of the fourth transmitting module 53 in this implementation.

First driving gear bevel teeth 307 mesh with driving bevel gear first teeth 311, and second driving gear bevel teeth 309 mesh with driving bevel gear second teeth 312.

First driven gear bevel teeth 327 mesh with driven bevel gear first teeth 331, and second driven gear bevel teeth 329 mesh with driven bevel gear second teeth 332.

First driving gear spur teeth 306 mesh with first driven gear spur teeth 326.

Second driving gear spur teeth 308 mesh with second driven gear spur teeth 328.

External guide mechanism 301 includes driving end yoke 302, driving cross member 303, first driving gear 304, second driving gear 305, driving bevel gear 310, connecting yoke 320, driven end yoke 322, driven cross member 323, first driven gear 324, second driven gear 325, and driven bevel gear 330.

Driving shaft 341 is rotatably mounted to driving end yoke 302 and is joined to inner driving end yoke 342. Driving rotation axis a—a is the axis of rotation of driving shaft 341. Driving end yoke 302 is operatively configured such that axis a—a substantially intersects the intersection of axes e—e and c—c. Inner driving cross member 343 is pivotably mounted on inner driving end yoke 342. Inner driving cross member 343 is also pivotably mounted to inner connecting yoke 345. Driven shaft 351 is rotatably mounted to driven end yoke 322 and is joined to inner driven end yoke 352. Driven rotation axis b—b is the axis of rotation of driven shaft 351. Driven end yoke 322 is operatively configured such that axis b—b substantially intersects the intersection of axes f—f and d—d. Inner driven cross member 353 is pivotably mounted on inner driven end yoke 352. Inner driven cross member 353 is also pivotably mounted to inner connecting yoke 345.

Connecting rotation axis g—g is the axis of rotation of inner connecting yoke 345. Driving shaft 341, inner driving end yoke 342, inner driving cross member 343, inner connecting yoke 345, driven shaft 351, inner driven end yoke 352, and inner driven cross member 353 are operatively configured such that axis g—g substantially intersects the intersection of axes e—e and c—c and also the intersection of axes f—f and d—d.

The double Cardan universal joint comprises driving shaft 341, inner driving end yoke 342, inner driving cross member 343, inner connecting yoke 345, inner driven cross member 353, inner driven end yoke 352, and driven shaft 351. Driving rotation r—r of the driving shaft 341 occurs about axis a—a. Connecting rotation r'—r' of inner connecting yoke 345 occurs about axis g—g. Driven rotation r"—r" of driven shaft 351 occurs about axis b—b.

Figure 3A:
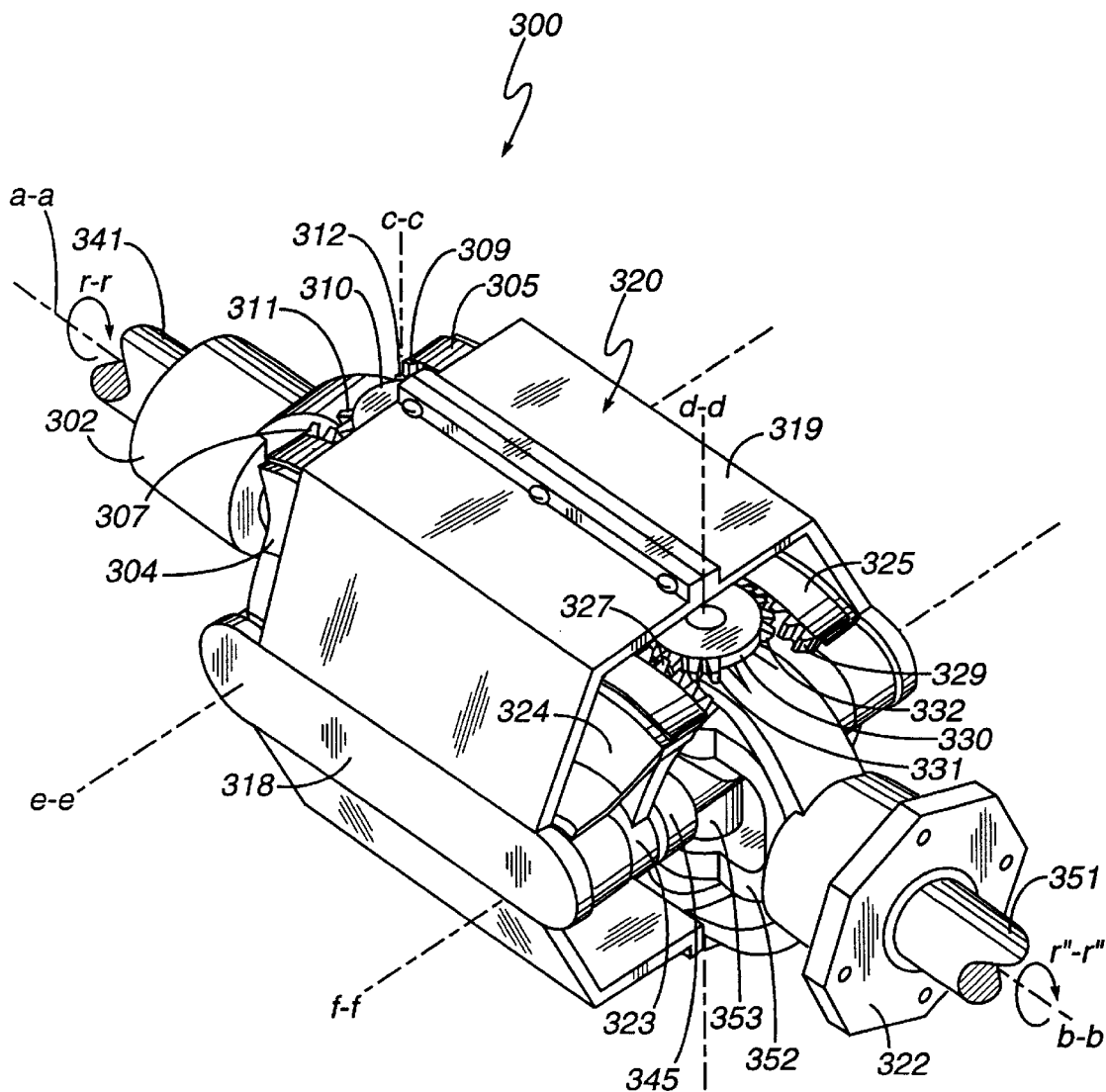
FIG. 3A is a perspective view of a third embodiment of the invention comprising an external harness supporting a double Cardan joint.
Figure 3B:
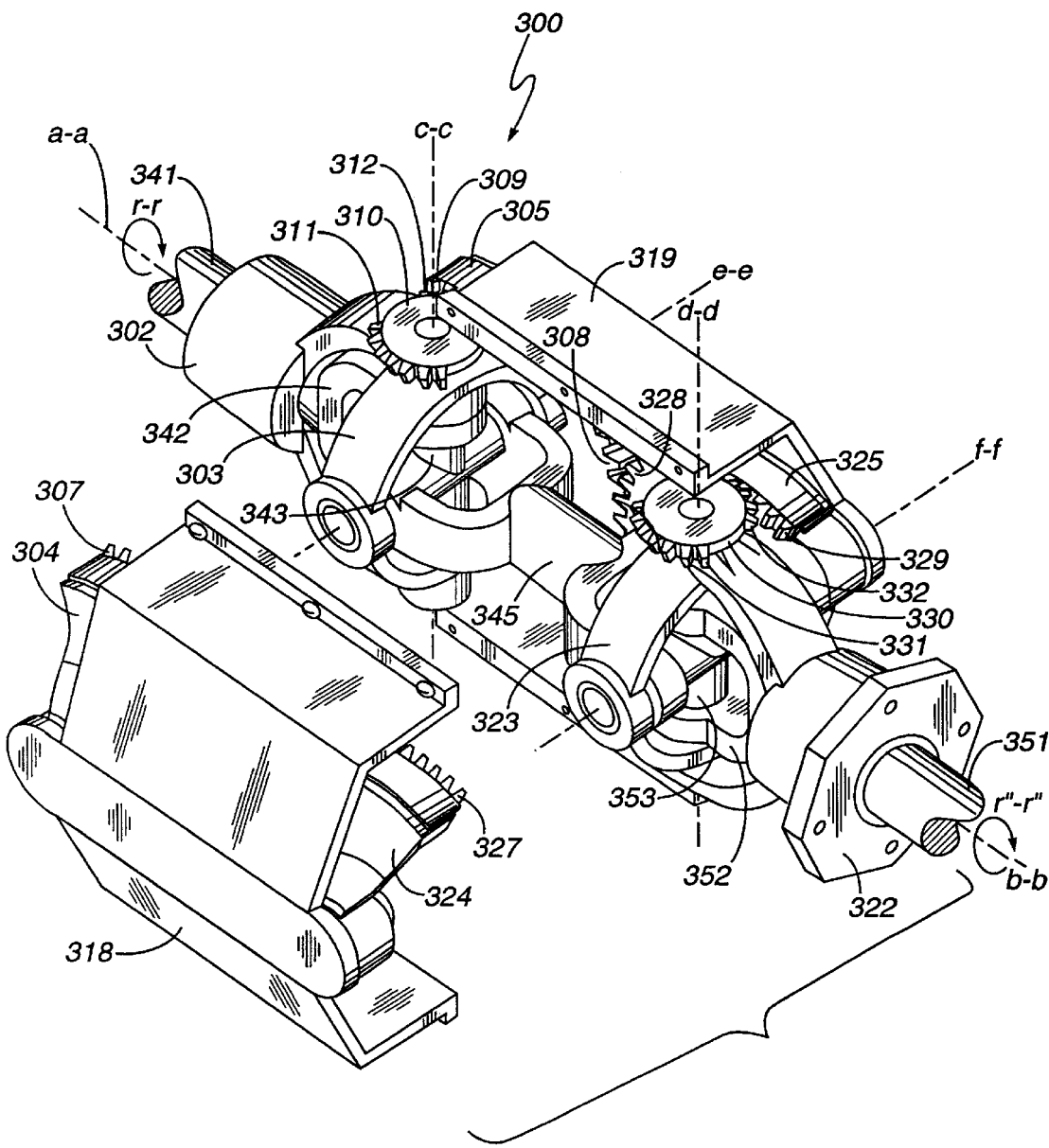
FIG. 3B is a perspective view of the mechanism shown in FIG. 3A with one side of the connecting yoke and adjacent gear segments moved away from the external harness.
Figure 3C:
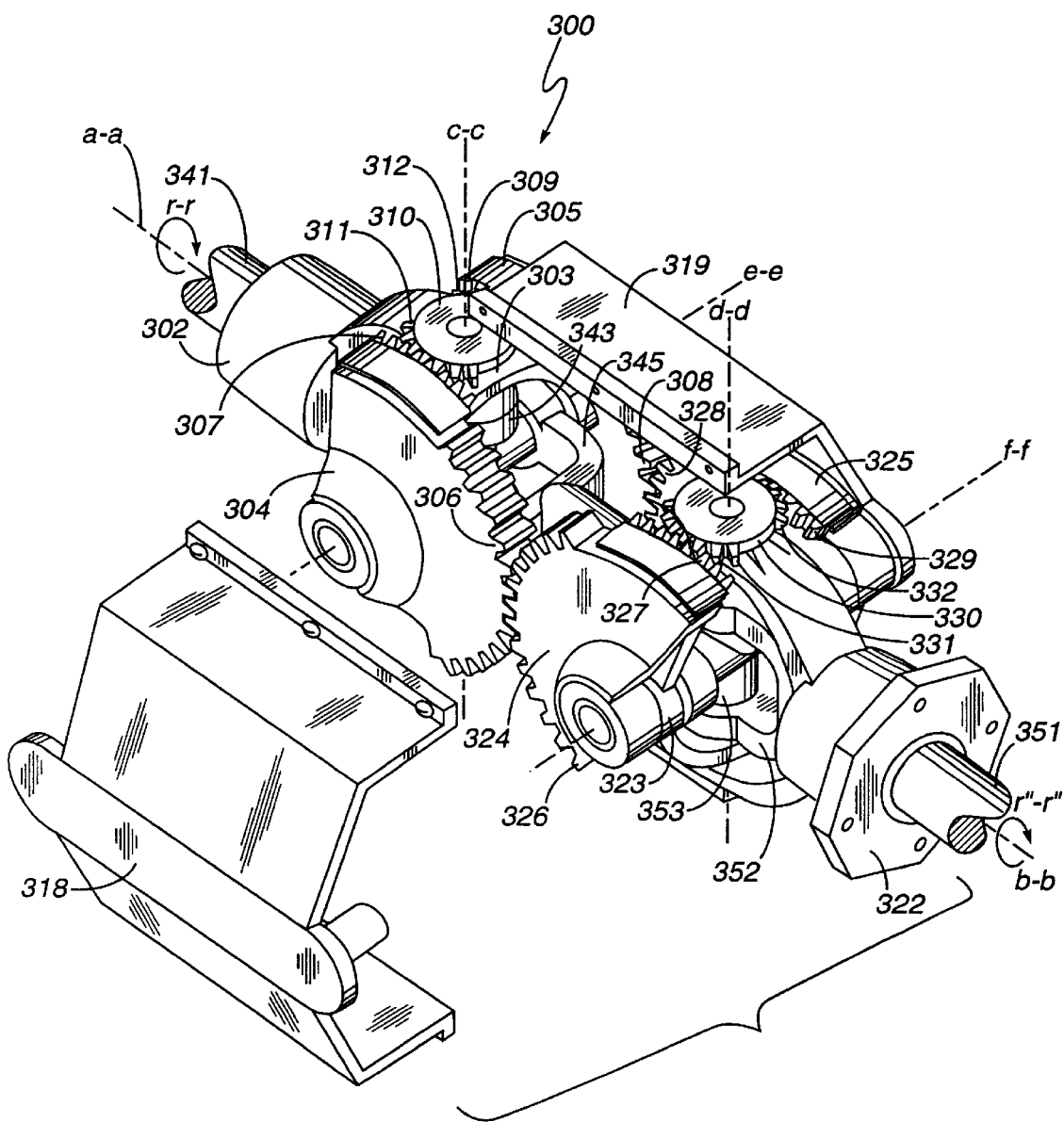
FIG. 3C is a perspective view of the mechanism shown in FIG. 3A with one side of the connecting yoke moved away from the external harness.
Figure 3D:
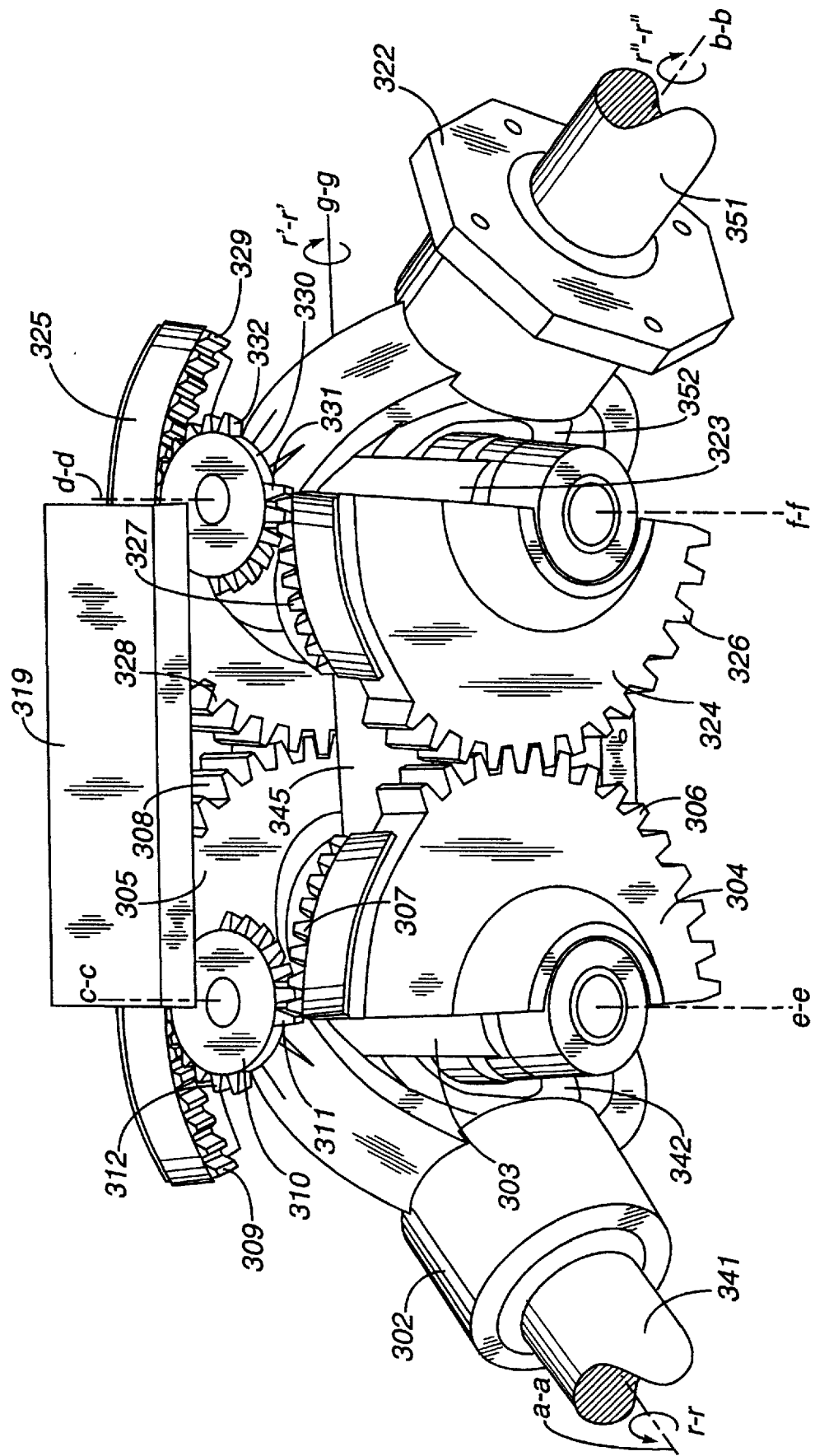
FIG. 3D is a perspective view of the mechanism shown in FIG. 3C with the driving shaft angularly displaced form the driven shaft by 90 degrees to one side.
Figure 3E:
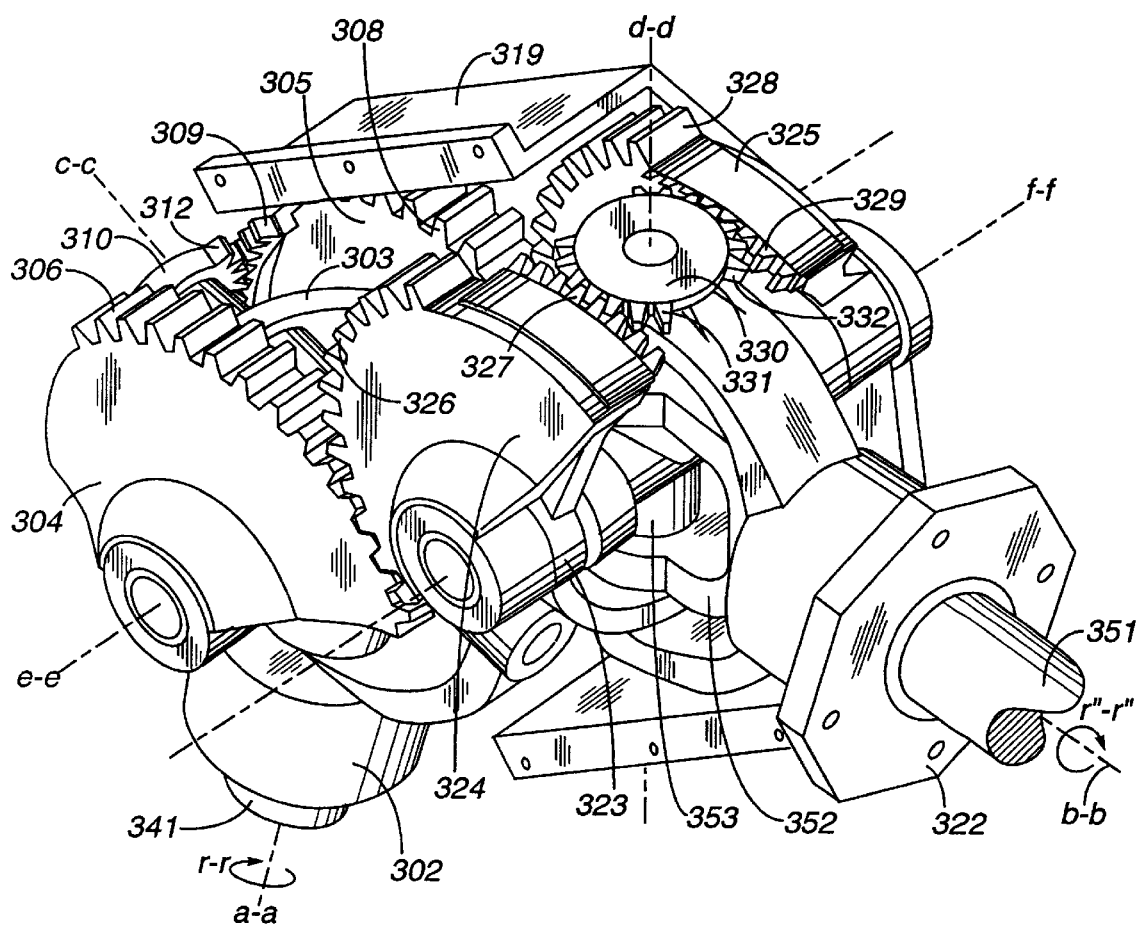
FIG. 3E is a perspective view of the mechanism shown in FIG. 3C with the driving shaft angularly displaced go degrees downward from the driven shaft.
Figure 3F:
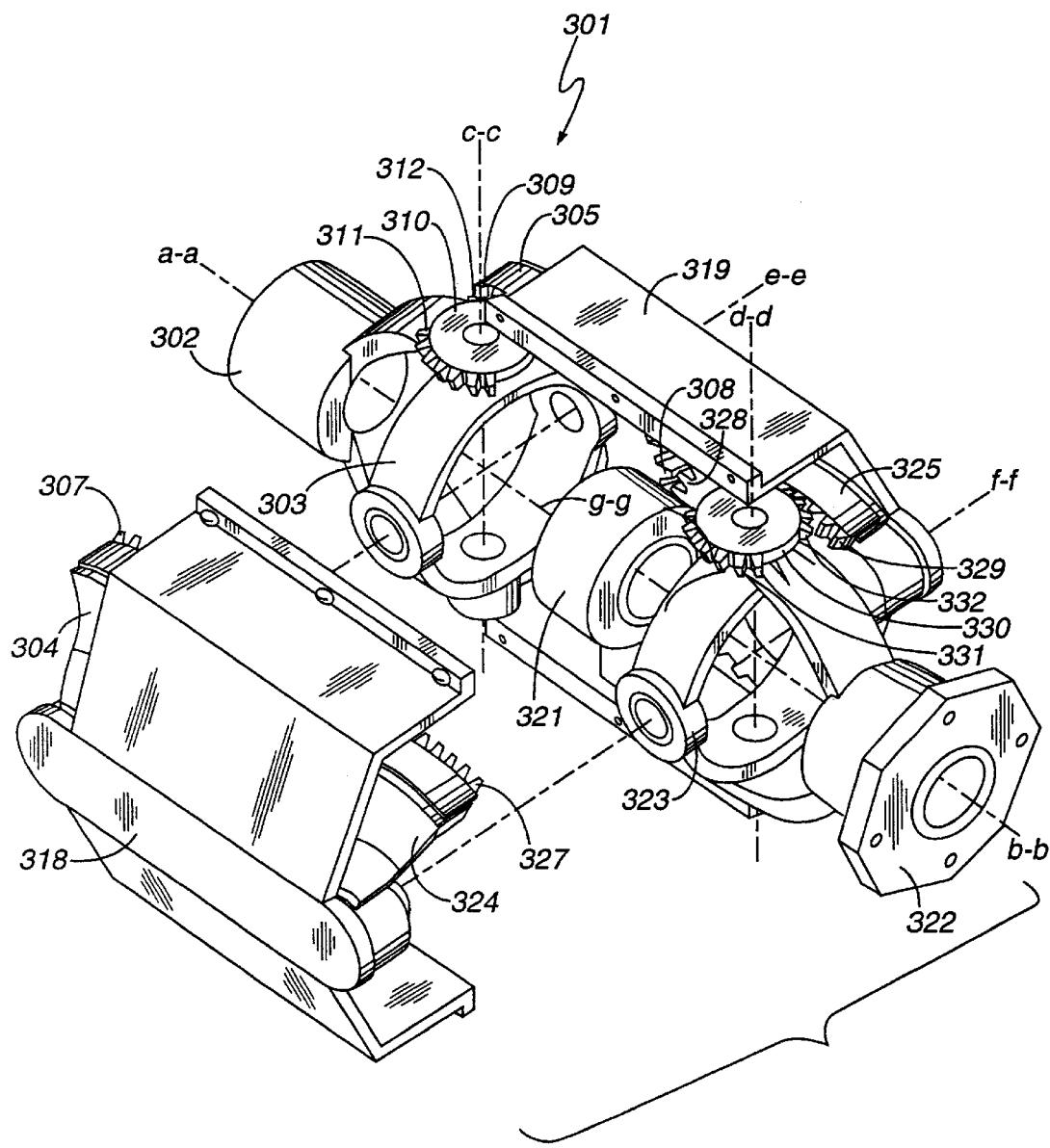
FIG. 3F is a perspective view of the external harness embodiment of the invention showing how a center support can be added.

FIG. 3F shows external guide mechanism 301 with connecting yoke first half 318, first driving gear 304, and first driven gear 324 removed from the remainder of external guide mechanism 301. Also shown only in this view is optional center support 321 mounted on connecting yoke 320. Optional center support 321 could be mounted on connecting yoke 320 and rotatably connected to inner connecting yoke 345 to provide additional stability.

In this embodiment, a first mechanical path comprises driving bevel gear 310, first driving gear 304, first driven gear 324, and driven bevel gear 330. A second mechanical path comprises driving bevel gear 310, second driving gear 305, second driven gear 325, and driven bevel gear 330.

Operation—External Symmetrical Embodiment
(Third Embodiment)

First driving gear bevel teeth 307 mesh with driving bevel gear first teeth 311, and second driving gear bevel teeth 309 mesh with driving bevel gear second teeth 312. This links clock-wise pivoting of driving bevel gear 310 about axis c—c to counter-clock-wise pivoting of first driving gear 304 about axis e—e and to equal clock-wise pivoting of second driving gear 305 about axis e—e.

First driven gear bevel teeth 327 mesh with driven bevel gear first teeth 331, and second driven gear bevel teeth 329 mesh with driven bevel gear second teeth 332. This links clock-wise pivoting of driven bevel gear 330 about axis d—d to counter-clock-wise pivoting of first driven gear 324 about axis f—f and to equal clock-wise pivoting of second driven gear 325 about axis f—f.

When driving end yoke 302 pivots together with driving bevel gear 310 clock-wise about axis e—e, the meshing of driving gear bevel teeth 307 with driving bevel gear first teeth 311 links that pivoting to identical clock-wise pivoting of first driving gear 304 clock-wise about axis e—e. Likewise, the meshing of second driving gear bevel teeth 309 with driving bevel gear second teeth 312 links clock-wise pivoting of driving end yoke 302 together with driving bevel gear 310 clock-wise about axis e—e to identical clock-wise pivoting of second driving gear 305 about axis e—e. Since axis e—e is not coaxial with axis c—c, driving cross member 303 must pivot with driving end yoke 302 about axis e—e. In other words, pivoting of driving end yoke 302 about axis e—e causes driving end yoke 302, driving bevel gear 310, driving cross member 303, first driving gear 304, and second driving gear 305 to pivot about axis e—e as a unit.

When driven end yoke 322 pivots together with driven bevel gear 330 clock-wise about axis f—f, the meshing of first driven gear bevel teeth 327 with driven bevel gear first teeth 331 links that pivoting to identical clock-wise pivoting of first driven gear 324 clock-wise about axis f—f. Likewise, the meshing of second driven gear bevel teeth 329 with driven bevel gear second teeth 332 links clock-wise pivoting of driven end yoke 322 together with driven bevel gear 330 clock-wise about axis f—f to identical clock-wise pivoting of second driven gear 325 about axis f—f. Since axis f—f is not coaxial with axis d—d, driven cross member 323 must pivot with driven end yoke 322 about axis f—f. In other words, pivoting of driven end yoke 322 about axis f—f causes driven end yoke 322, driven bevel gear 330, driven cross member 323, first driven gear 324, and second driven gear 325 to pivot about axis f—f as a unit.

First driving gear spur teeth 306 mesh with first driven gear spur teeth 326, linking the pivoting of first driving gear 304 about axis e—e to equal and opposite pivoting of first driven gear 324 about axis f—f. In other words, as first driving gear 304 pivots clock-wise about axis e—e, first driven gear 324 pivots equally counter-clock-wise about axis f—f.

Second driving gear spur teeth 308 mesh with second driven gear spur teeth 328, linking the pivoting of second driving gear 305 about axis e—e to equal and opposite pivoting of second driven gear 325 about axis f—f. In other words, as second driving gear 305 pivots clock-wise about axis e—e, second driven gear 325 pivots equally counter-clock-wise about axis f—f.

Clock-wise pivotal motion of driving end yoke 302 about axis c—c causes first driving gear 304 to pivot counter-clock-wise about axis e—e and also causes second driving gear 305 to pivot equally clock-wise about axis e—e. In turn, since first driving gear 304 and first driven gear 324 are linked to pivot equally in opposite directions, this causes first driven gear 324 to pivot clock-wise about axis f—f. Also, since second driving gear 305 and second driven gear 325 are linked to pivot equally in opposite directions, the pivoting of second driving gear 305 clock-wise about axis e—e causes second driven gear 325 to pivot equally counter-clock-wise about axis f—f. The clock-wise pivoting of first driven gear 324 about axis f—f and the equal counter-clock-wise pivoting of second driven gear 325 about axis f—f cause driven bevel gear 330 to pivot counter-clock-wise about axis d—d. Since driven bevel gear 330 is rigidly mounted on or is integral with driven end yoke 322, this causes driven end yoke 322 to pivot counter-clock-wise about axis d—d. Clock-wise pivoting of driving end yoke 302 about axis c—c is exactly matched by equal counter-clock-wise pivoting of driven end yoke 322 about axis d—d.

Clock-wise pivoting of driving end yoke 302 about driving second axis e—e compels first driving gear 304 and second driving gear 305 to pivot equally clock-wise about axis e—e. Since first driving gear 304 and first driven gear 324 are linked to pivot equally in opposite directions, and since second driving gear 305 and second driven gear 325 are linked to pivot equally in opposite directions, the pivoting of first driving gear 304 and second driving gear 305 clock-wise about axis e—e causes first driven gear 324 and second driven gear 325 to pivot equally counter-clock-wise together about axis f—f. The equal counter-clock-wise pivoting of first driven gear 324 and second driven gear 325 together about axis f—f causes driven end yoke 322 to pivot counter-clock-wise with driven cross member 323 about axis f—f. In other words, clock-wise pivoting of driving end yoke 302 about axis e—e causes equal counter-clock-wise pivoting of driven end yoke 322 about axis f—f.

In a straight initial configuration, axes a—a, b—b, and g—g are collinear. Since clock-wise pivoting of driving end yoke 302 about axis c—c is exactly matched by counter-clock-wise pivoting of driven end yoke 322 about axis d—d, and since clock-wise pivoting of driving end yoke 302 about axis e—e is exactly matched by counter-clock-wise pivoting of driven end yoke 322 about axis f—f, any pivoting of driving end yoke 302 in relation to connecting yoke 320 is exactly matched in magnitude and direction by pivoting of driven end yoke 322 in relation to connecting yoke 320. Consequently, axis a—a, axis b—b, and axis g—g always lie in the same plane and the angles between axis a—a and axis g—g are always equal to the angles between axis b—b and axis g—g. Further, in the plane containing axis a—a, axis b—b, and axis g—g at any moment, axis a—a and axis b—b always lie on the same side axis g—g.

As the double Cardan universal joint rotates, the angles between axis a—a and axis b—b can change. However, as axis a—a and axis b—b deviate away from straight, axis a—a, axis b—b, and axis g—g are all compelled to stay in a coplanar configuration. Further, the angle between axis a—a and axis g—g is compelled to remain equal to the angle between axis b—b and axis g—g. Under these conditions, the double Cardan universal joint functions as a constant velocity universal joint.

Parallel Axis Embodiment (Fourth Embodiment)

Figure 4A:
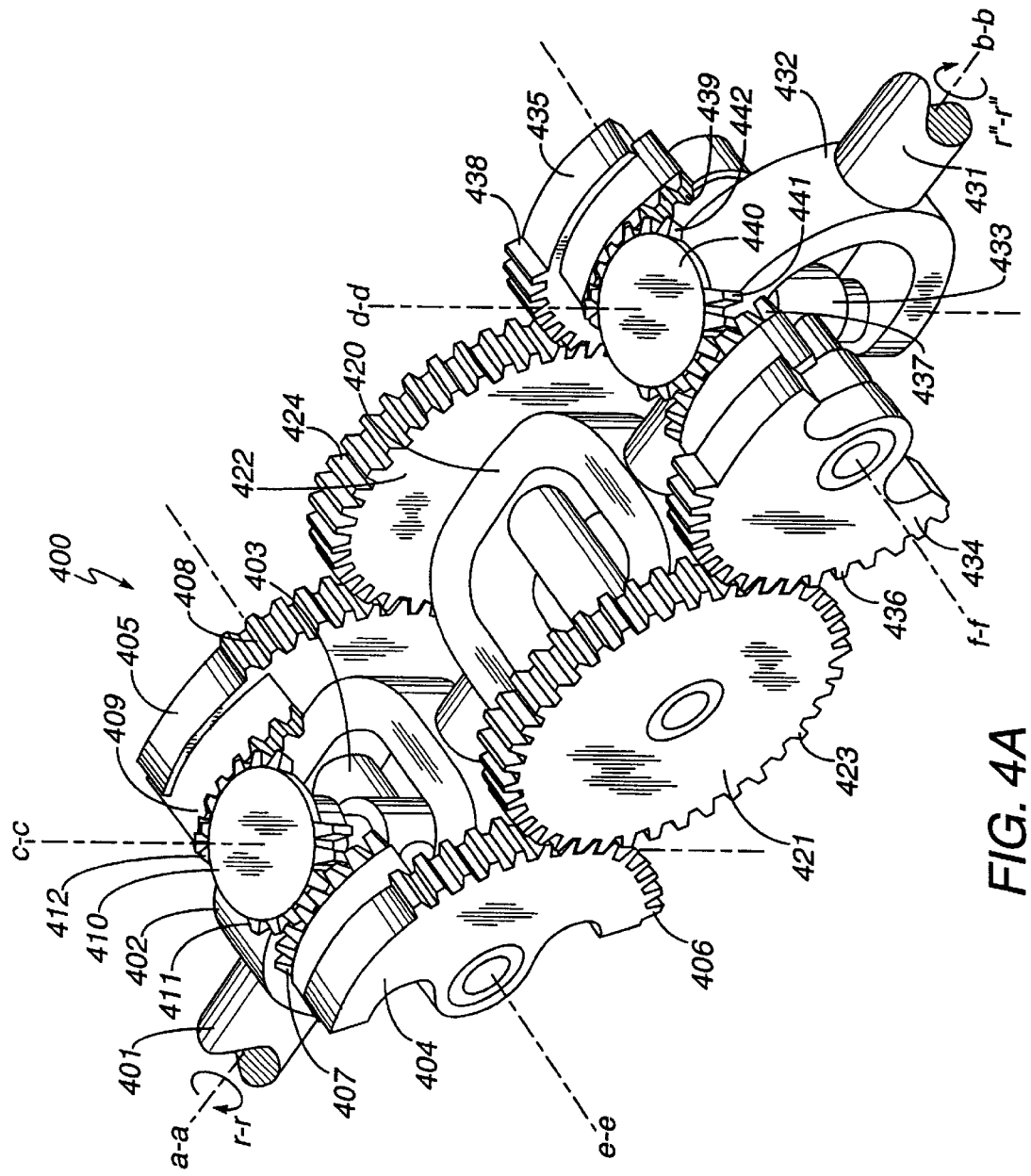
FIG. 4A is a perspective view of a fourth (parallel axis) embodiment of the invention.
Figure 4B:
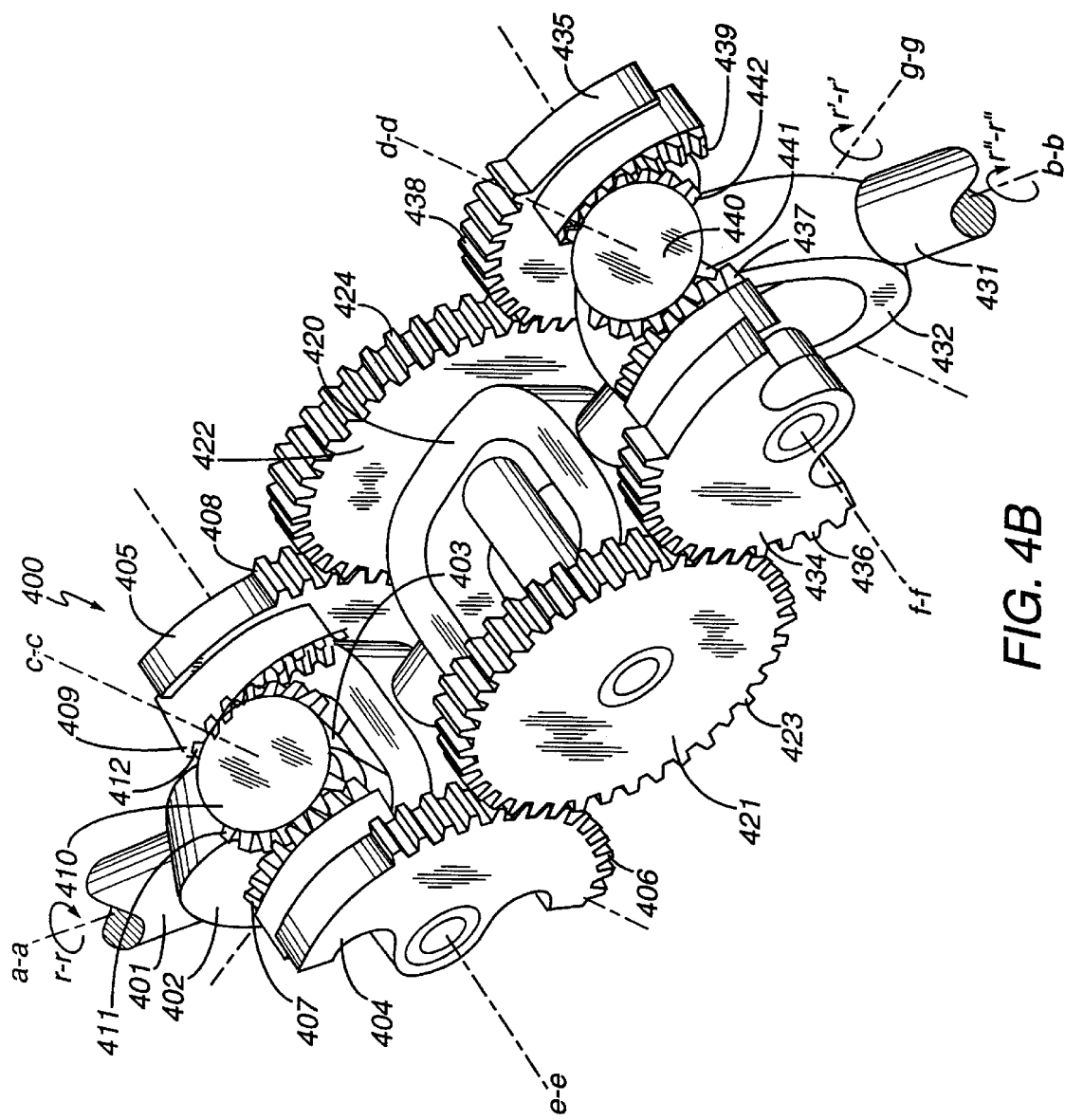
FIG. 4B is a perspective view of the mechanism shown in FIG. 4A with the driving and driven shafts axially misaligned.
Figure 5A:
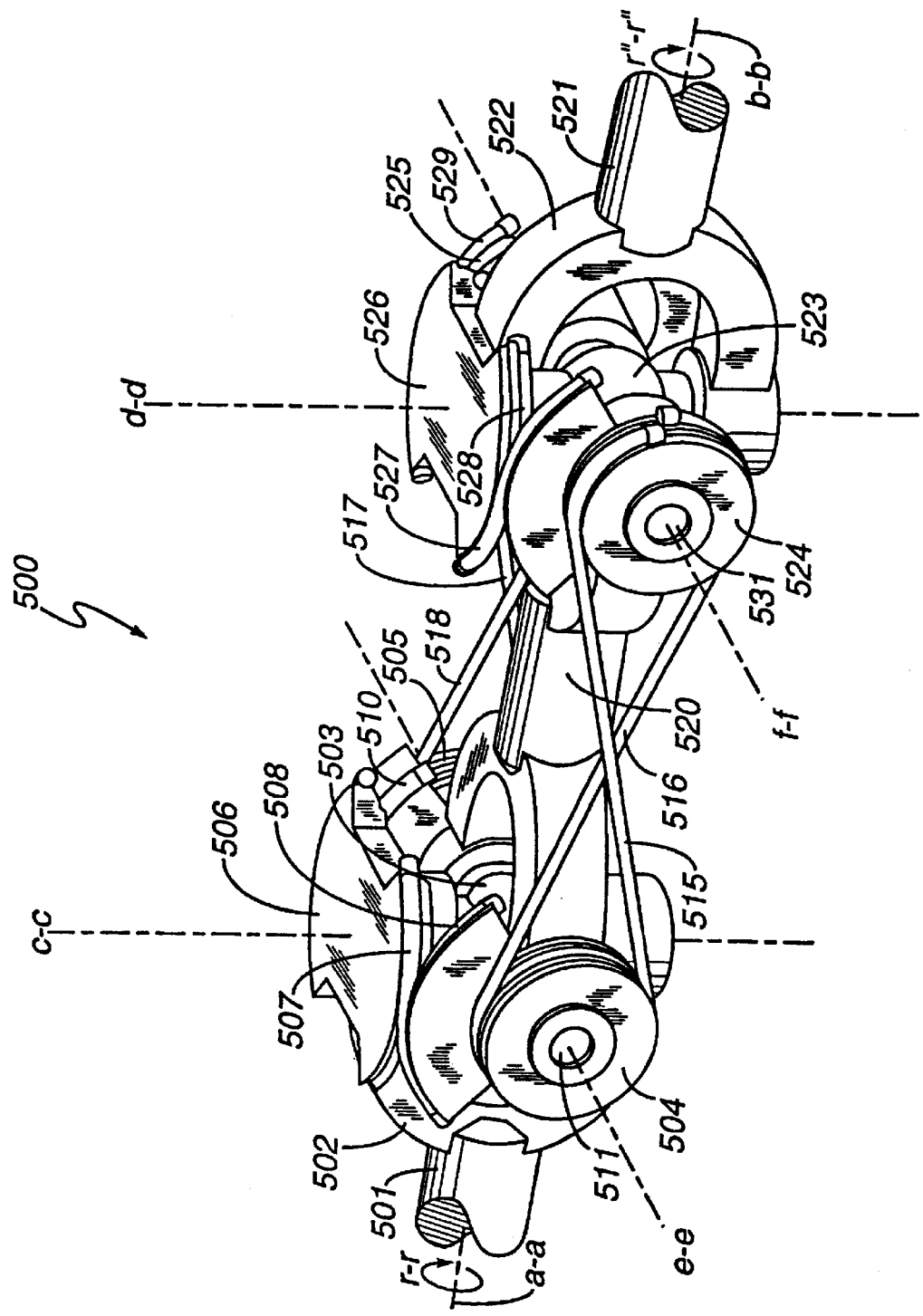
FIG. 5A is a perspective view of a fifth embodiment of the invention where rotation of pivotable elements is linked using flexible elements such as cable or chain.
Figure 5B:
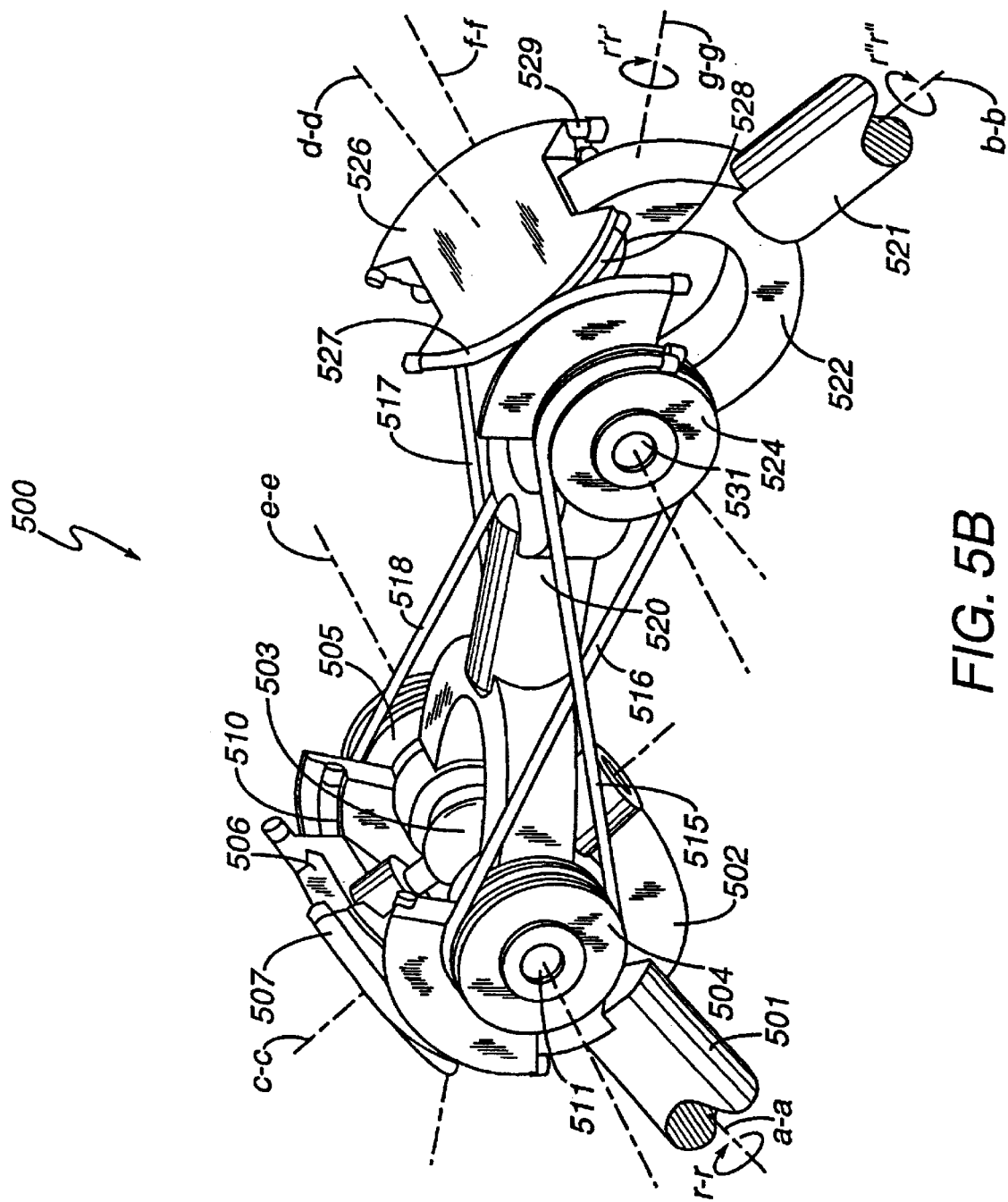
FIG. 5B is a perspective view of the mechanism shown in FIG. 5A with each end yoke deflected 45 degrees downward from the straight position for a total 90 degree bend.
Figure 5C:
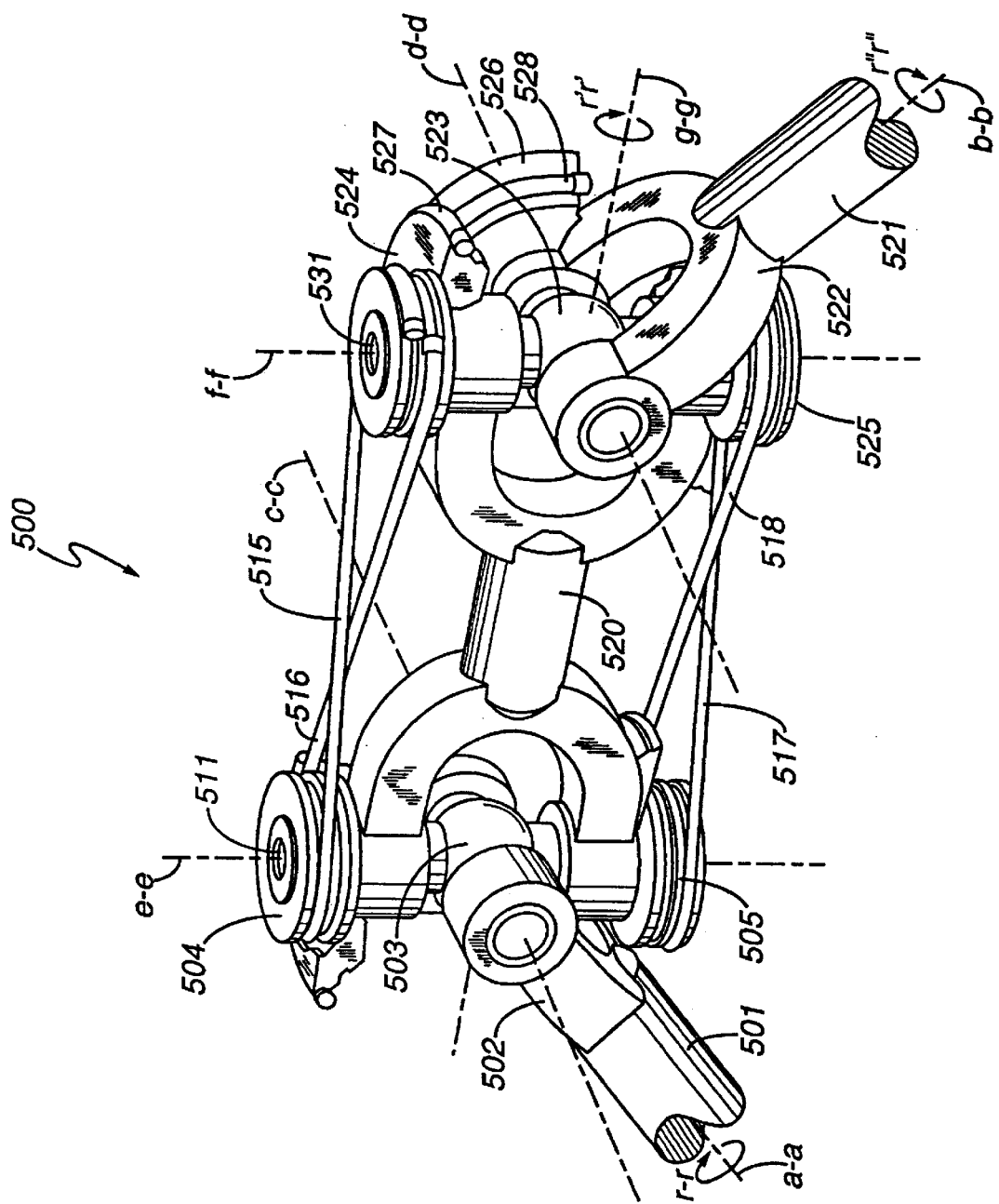
FIG. 5C is a perspective view of the mechanism shown in FIG. 5B where the shafts have rotated 90 degrees.
Figure 5D:
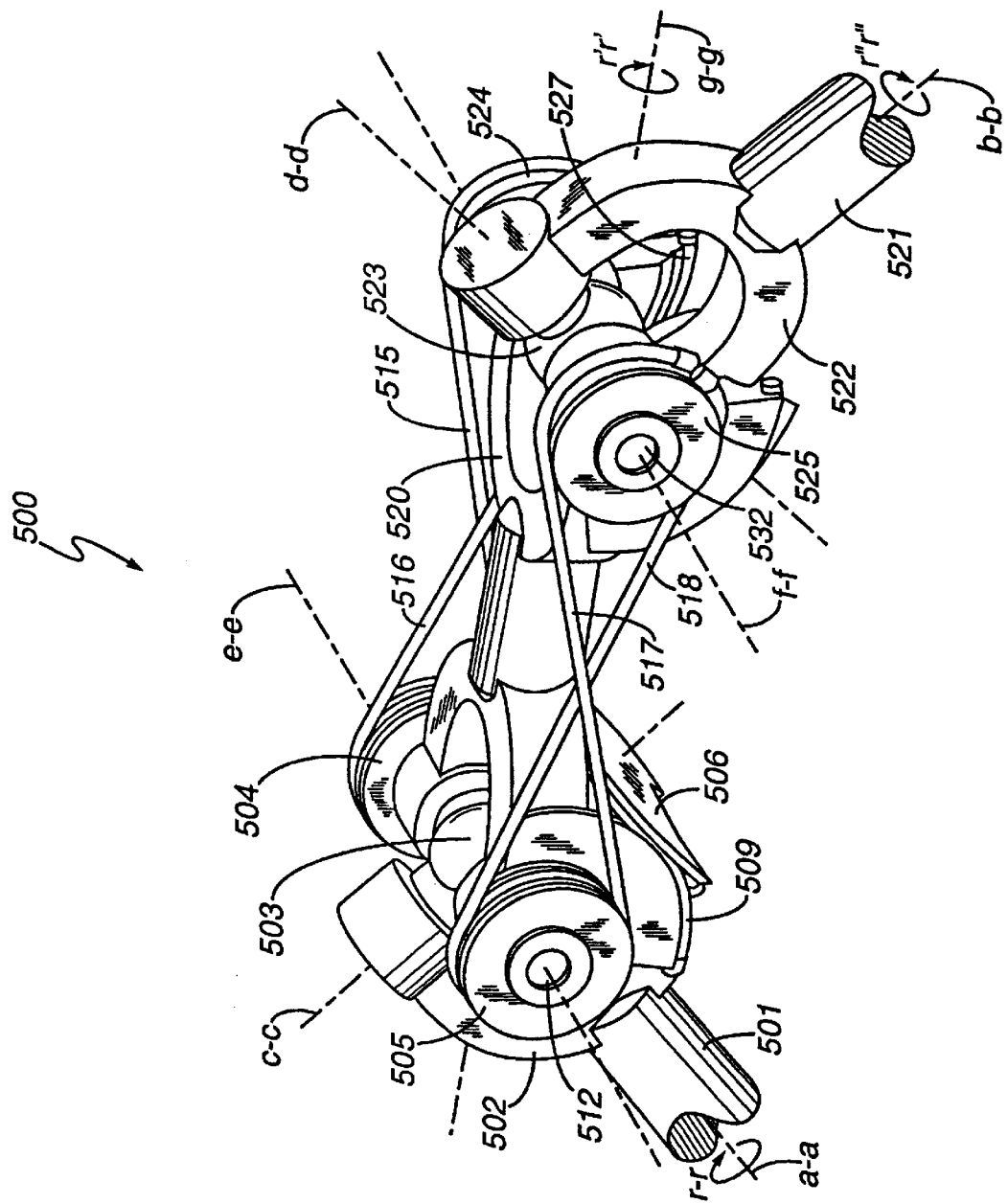
FIG. 5D is a perspective view of the mechanism shown in FIG. 5B where the shafts have rotated 180 degrees.
Figure 5E:
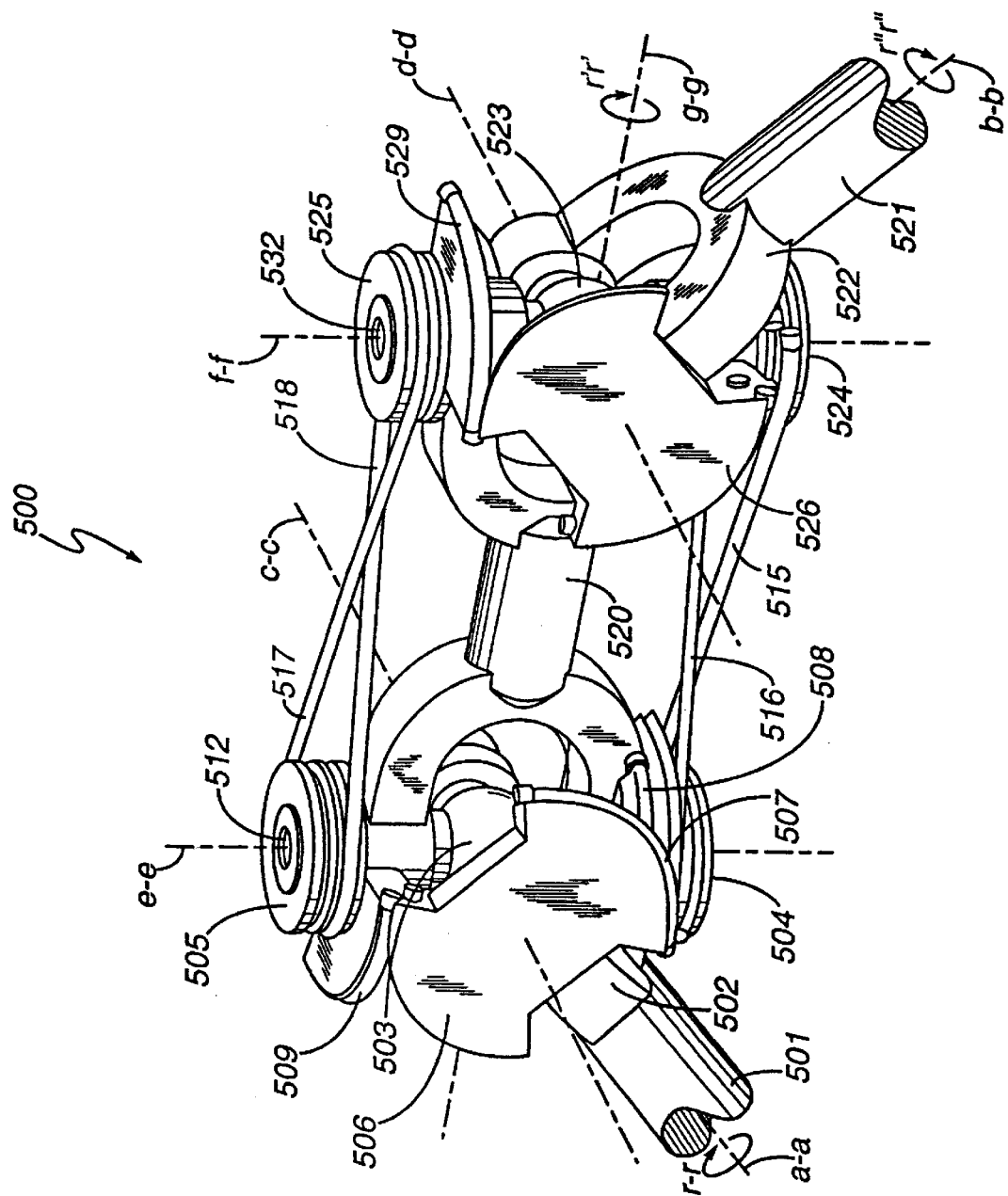
FIG. 5E is a perspective view of the mechanism shown in FIG. 5B where the shafts have rotated 270 degrees.
Figure 6A:
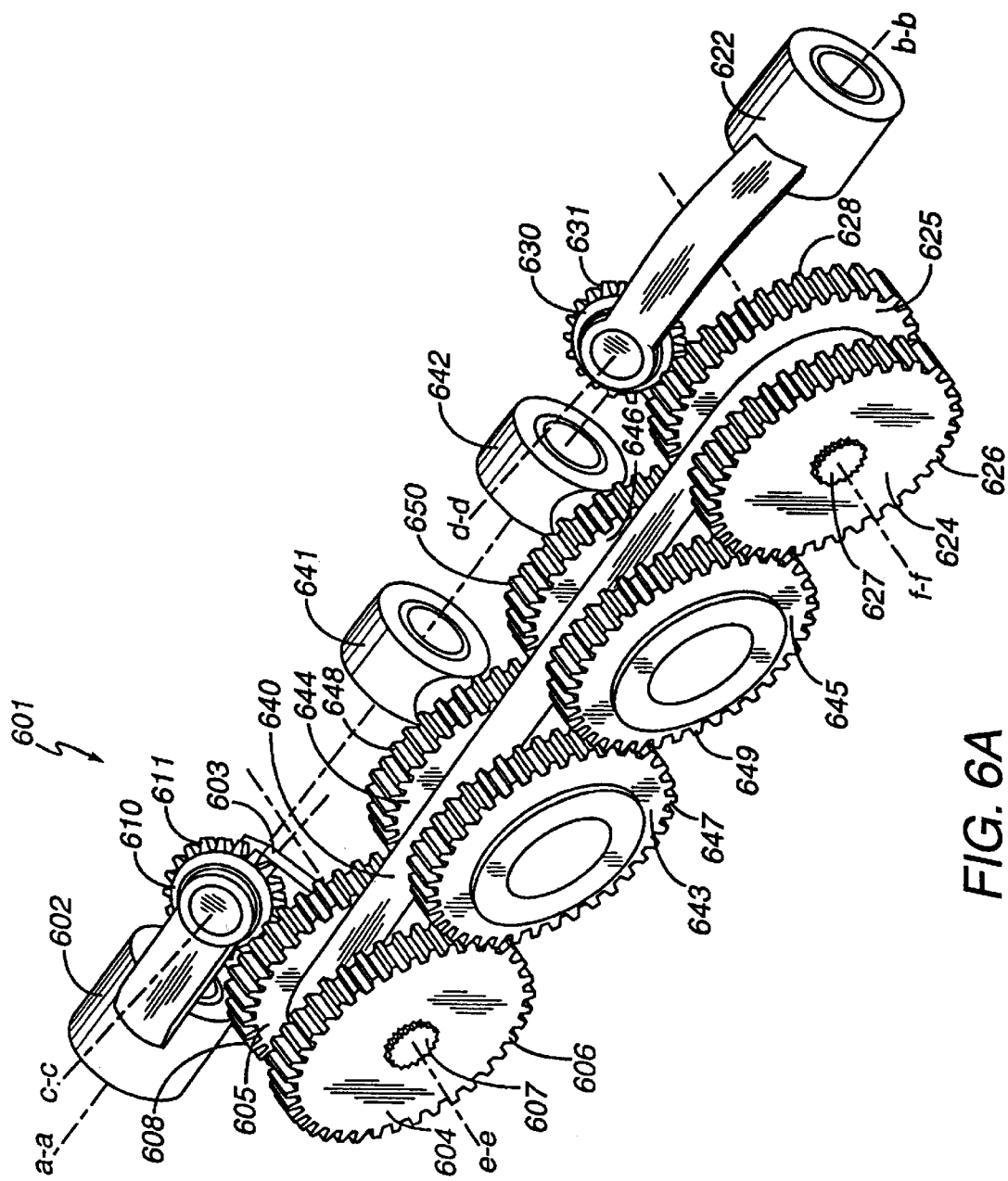
FIG. 6A is a perspective view of a sixth embodiment of the invention comprising an offset asymmetric Hookes joint based harness.
Figure 6B:
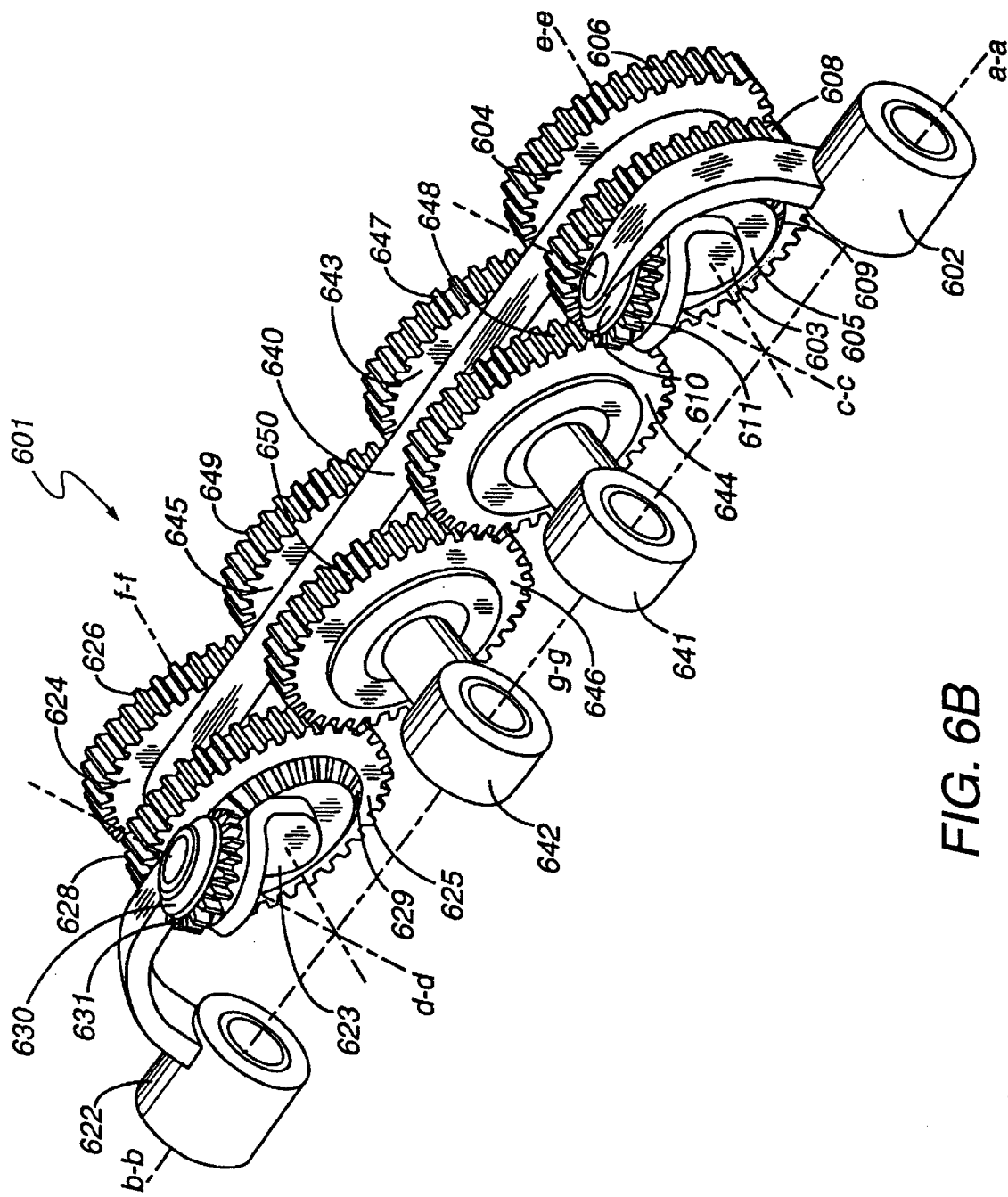
FIG. 6B is a perspective view of the mechanism shown in FIG. 6A from another viewpoint.
Figure 6C:
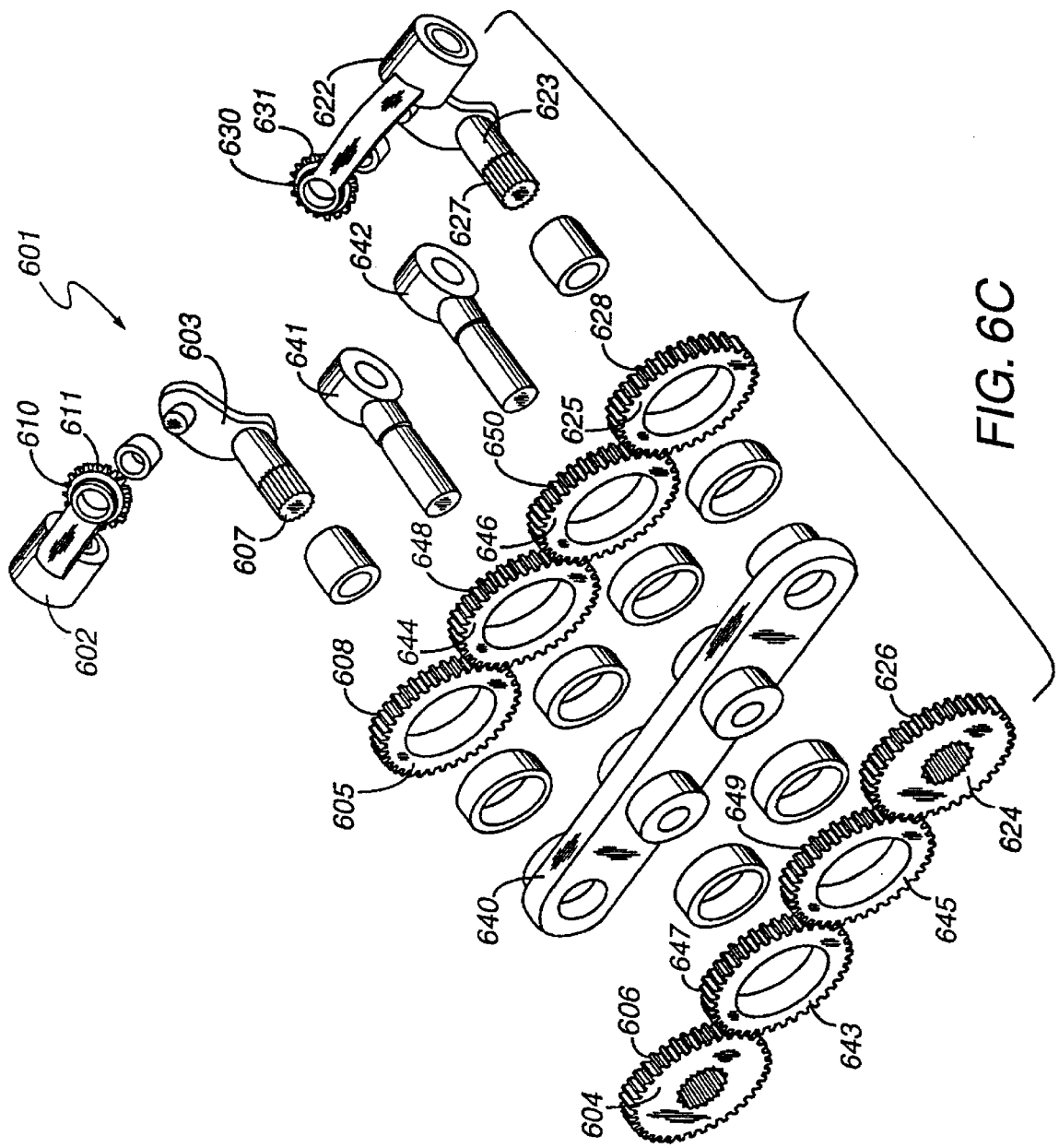
FIG. 6C is an exploded perspective view of the mechanism shown in FIG. 6A.
Figure 6D:
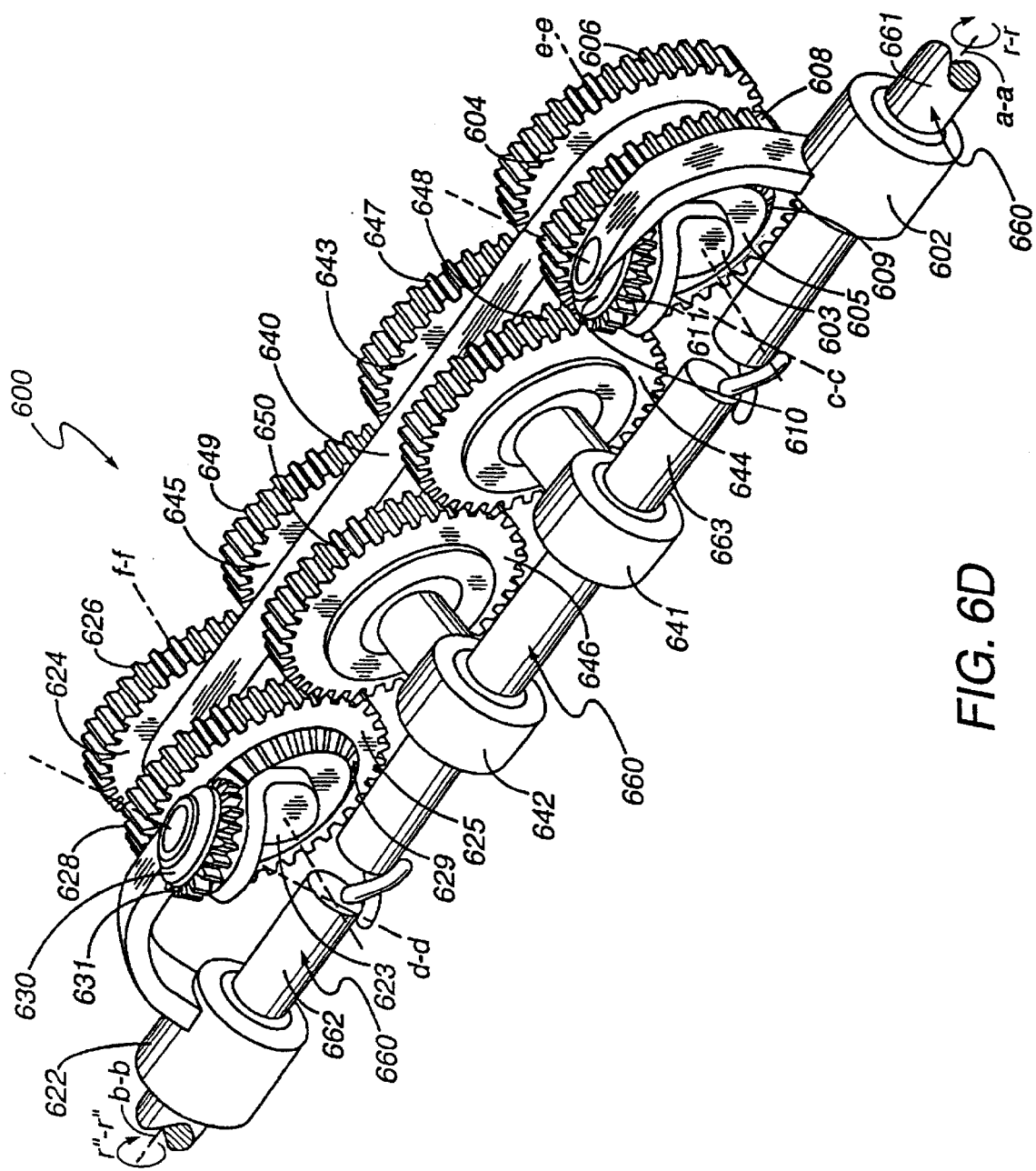
FIG. 6D is a perspective view of the mechanism shown in FIG. 6A supporting a rudimentary constant velocity double universal joint.

An exemplary implementation of a parallel axis embodiment 400 comprising a double Cardan universal joint is shown in FIGS. 4A and 4B.

Driving shaft 401 is joined to driving end yoke 402. Driving rotation axis a—a is the axis of rotation of driving shaft 401. Driving cross member 403 is pivotably mounted on driving end yoke 402 and is operatively arranged for pivoting about first driving connection axis c—c. Driving cross member 403 is also pivotably mounted to connecting yoke 420 and is operatively arranged for pivoting about second driving connection axis e—e. Connecting rotation axis g—g is the axis of rotation of connecting yoke 420. The center of the driving cross member 403 is the first pivot point 10. First driving connection axis c—c is substantially intersecting and perpendicular to second driving connection axis e—e.

Driven shaft 431 is joined to driven end yoke 432. Driven rotation axis b—b is the axis of rotation of driven shaft 431. Driven cross member 433 is pivotably mounted on driven end yoke 432 and is operatively arranged for pivoting about first driven connection axis d—d. Driven cross member 433 is also pivotably mounted to connecting yoke 420 and is operatively arranged for pivoting about second driven connection axis f—f. The center of the driven cross member 433 is the second pivot point 20. First driven connection axis d—d is substantially intersecting and perpendicular to second driven connection axis f—f. Second driven connection axis f—f is substantially parallel to second driving connection axis e—e.

Driving bevel gear 410 is rigidly mounted to or is integral with driving end yoke 402. Driving bevel gear 410 comprises driving bevel gear first teeth 411 and driving bevel gear second teeth 412. First driving gear 404 and second driving gear 405 are pivotably mounted on driving cross member 403 and are operatively arranged to pivot about axis e—e. Each of the driving gears comprises both spur teeth and bevel teeth. First driving gear 404 carries first driving gear spur teeth 406 and first driving gear bevel teeth 407. Second driving gear 405 carries second driving gear spur teeth 408 and second driving gear bevel teeth 409. Driving bevel gear 410 is an element of the first transmitting module 50, and first and second driving gears 404, 405 are elements of the second transmitting module 51 in this implementation.

Driven bevel gear 440 is rigidly mounted to or is integral with driven end yoke 432. Driven bevel gear 440 comprises driven bevel gear first teeth 441 and driven bevel gear second teeth 442. First driven gear 434 and second driven gear 435 are pivotably mounted on driven cross member 433 and are operatively arranged to pivot about axis f—f. Each of the driven gears comprises both spur teeth and bevel teeth. First driven gear 434 carries first driven gear spur teeth 436 and first driven gear bevel teeth 437. Second driven gear 435 carries second driven gear spur teeth 438 and second driven gear bevel teeth 439. Driven bevel gear 440 is an element of the third transmitting module 52, and first and second driven gears 434, 435 are elements of the fourth transmitting module 53 in this implementation.

First connecting gear 421 is pivotably mounted on connecting yoke 420 and is a reversing element. First connecting gear 421 carries first connecting gear spur teeth 423. Second connecting gear 422 is pivotably mounted on connecting yoke 420. Second connecting gear 422 carries second connecting gear spur teeth 424.

First driving gear bevel teeth 407 mesh with driving bevel gear first teeth 411, and second driving gear bevel teeth 409 mesh with driving bevel gear second teeth 412.

First driven gear bevel teeth 437 mesh with driven bevel gear first teeth 441, and second driven gear bevel teeth 439 mesh with driven bevel gear second teeth 442.

First driving gear spur teeth 406 mesh with first connecting gear spur teeth 423. First connecting gear spur teeth 423 mesh with first driven gear spur teeth 436.

Second driving gear spur teeth 408 mesh with second connecting gear spur teeth 424. Second connecting gear spur teeth 424 mesh with second driven gear spur teeth 438.

Driving rotation r—r of the driving shaft 401 occurs about axis a—a. Connecting rotation r'—r' of connecting yoke 420 occurs about axis g—g. Driven rotation r"—r" of driven shaft 431 occurs about axis b—b.

In this embodiment, a first mechanical path comprises driving bevel gear 410, first driving gear 404, first connecting gear 421, first driven gear 434, and driven bevel gear 440. A second mechanical path comprises driving bevel gear 410, second driving gear 405, second connecting gear 422, second driven gear 435, and driven bevel gear 440.

Operation—Parallel Axis Embodiment (Fourth Embodiment)

First driving gear bevel teeth 407 mesh with driving bevel gear first teeth 411, and second driving gear bevel teeth 409 mesh with driving bevel gear second teeth 412. This links clock-wise pivoting of driving bevel gear 410 about axis c—c to counter-clock-wise pivoting of first driving gear 404 about axis e—e and to clock-wise pivoting of second driving gear 405 about axis e—e.

First driven gear bevel teeth 437 mesh with driven bevel gear first teeth 441, and second driven gear bevel teeth 439 mesh with driven bevel gear second teeth 442. This links clock-wise pivoting of driven bevel gear 440 about axis d—d to counter-clock-wise pivoting of first driven gear 434 about axis f—f and to clock-wise pivoting of second driven gear 435 about axis f—f.

When driving end yoke 402 pivots together with driving bevel gear 410 clock-wise about axis e—e, the meshing of first driving gear bevel teeth 407 with driving bevel gear first teeth 411 links that pivoting to identical clock-wise pivoting of first driving gear 404 about axis e—e. Likewise, the meshing of second driving gear bevel teeth 409 with driving bevel gear second teeth 412 links clock-wise pivoting of driving end yoke 402 together with driving bevel gear 410 about axis e—e to identical clock-wise pivoting of second driving gear 405 about axis e—e. Since axis e—e is not coaxial with axis c—c, driving cross member 403 must pivot with driving end yoke 402 about axis e—e. In other words, pivoting of driving end yoke 402 about axis e—e causes driving end yoke 402, driving bevel gear 410, driving cross member 403, first driving gear 404, and second driving gear 405 to pivot about axis e—e as a unit.

When driven end yoke 432 pivots together with driven bevel gear 440 clock-wise about axis f—f, the meshing of first driven gear bevel teeth 437 with driven bevel gear first teeth 441 links that pivoting to identical pivoting of first driven gear 434 clock-wise about axis f—f. Likewise, the meshing of second driven gear bevel teeth 439 with driven bevel gear second teeth 442 links pivoting of driven end yoke 432 together with driven bevel gear 440 clock-wise about axis f—f to identical clock-wise pivoting of second driven gear 435 about axis f—f. Since axis f—f is not coaxial with axis d—d, driven cross member 433 must pivot with driven end yoke 432 about axis f—f. In other words, pivoting of driven end yoke 432 about axis e—e causes driven end yoke 432, driven bevel gear 440, driven cross member 433, first driven gear 434, and second driven gear 435 to pivot about axis f—f as a unit.

The meshing of first driving gear spur teeth 406 with first connecting gear spur teeth 423 links clock-wise pivoting of first driving gear 404 about axis e—e to equal counter-clock-wise pivoting of first connecting gear 421. The meshing of first connecting gear spur teeth 423 with first driven gear spur teeth 436 links the counter-clock-wise pivoting of first connecting gear 421 to clock-wise pivoting of first driven gear 434 about axis f—f. In other words, first driving gear 404 and first driven gear 434 are linked to pivot together.

The meshing of second driving gear spur teeth 408 with second connecting gear spur teeth 424 link clock-wise pivoting of second driving gear 405 about axis e—e to counter-clock-wise pivoting of second connecting gear 422. The meshing of second connecting gear spur teeth 424 with second driven gear spur teeth 438 links counter-clock-wise pivoting of second connecting gear 422 to clock-wise pivoting of second driven gear 435 about axis f—f. In other words, second driving gear 405 and second driven gear 435 are linked to pivot together.

Clock-wise pivotal motion of driving end yoke 402 about axis c—c causes first driving gear 404 to pivot counter-clock-wise about axis e—e and also causes second driving gear 405 to pivot equally clock-wise about axis e—e. In turn, since first driving gear 404 and first driven gear 434 are linked to pivot together, this causes first driven gear 434 to pivot counter-clock-wise about axis f—f. Also, since second driving gear 405 and second driven gear 435 are linked to pivot together, this causes second driven gear 435 to pivot equally clock-wise about axis f—f. The counter-clock-wise pivoting of first driven gear 434 about axis f—f and the equal clock-wise pivoting of second driven gear 435 about axis f—f cause driven bevel gear 440 to pivot clock-wise about axis d—d. Since driven bevel gear 440 is rigidly mounted on or is integral with driven end yoke 432, this causes driven end yoke 432 to pivot clock-wise about axis d—d. Clock-wise pivoting of driving end yoke 402 about axis c—c is exactly matched by equal clock-wise pivoting of driven end yoke 432 about axis d—d.

Clock-wise pivoting of driving end yoke 402 about driving second axis e—e compels first driving gear 404 and second driving gear 405 to pivot equally clock-wise about axis e—e. Since first driving gear 404 and first driven gear 434 are linked to pivot together, and second driving gear 405 and second driven gear 435 are linked to pivot together, the pivoting first driving gear 404 and second driving gear 405 clock-wise about axis e—e causes first driven gear 434 and second driven gear 435 to pivot clock-wise together about axis f—f. The clock-wise pivoting of first driven gear 434 and second driven gear 435 together about axis f—f causes driven end yoke 432 to pivot clock-wise with driven cross member 433 about axis f—f. In other words, clock-wise pivoting of driving end yoke 402 about axis e—e causes equal clock-wise pivoting of driven end yoke 432 about axis f—f.

In a straight initial configuration, axes a—a, b—b, and g—g are collinear. Since clock-wise pivoting of driving end yoke 402 about axis c—c is exactly matched by clock-wise pivoting of driven end yoke 432 about axis d—d, and since clock-wise pivoting of driving end yoke 402 about axis e—e is exactly matched by clock-wise pivoting of driven end yoke 432 about axis f—f, any pivoting of driving end yoke 402 in relation to connecting yoke 420 is exactly matched in magnitude by pivoting of driven end yoke 432 in relation to connecting yoke 420. Consequently, axis a—a, axis b—b, and axis g—g always lie in the same plane and the angles between axis a—a and axis g—g are always equal to the angles between axis b—b and axis g—g. Further, in the plane containing axis a—a, axis b—b, and axis g—g at any moment, axis a—a and axis b—b always lie on the opposite side of axis g—g and are always parallel to one another.

As the double Cardan universal joint rotates, the displacement between axis a—a and axis b—b can change in magnitude and direction; but as axis a—a and axis b—b deviate away from straight, axis a—a and axis b—b will always be parallel. Axis a—a, axis b—b, and axis g—g are all compelled to stay in a coplanar configuration. Further, the angle between axis a—a and axis g—g is compelled to remain equal to the angle between axis b—b and axis g—g. This fulfills the requirements for constant velocity operation of a double Cardan joint according to the article by Johnson and Willems cited above. The ratio r—r:r'—r' is equal to the ratio r"—r":r'—r'. Rotation r—r is therefore always equal to rotation r"—r".

Flexible Element Linkage Embodiment (Fifth Embodiment)

An exemplary implementation of a flexible element linkage embodiment 500 comprising a double Cardan universal joint is shown in FIGS. 5A, 5B, 5C, 5D, and 5E Flexible elements as used in this context represent several different devices which are laterally flexible, but longitudinally stable. These include, but are not limited to, belts, cables, and chains. In certain situations, pulleys and partial pulleys can be replaced by wheels, partial wheels, sprockets, partial sprockets, or some other support which either pivots or simulates pivoting.

Driving shaft 501 is joined to driving end yoke 502. Driving rotation axis a—a is the axis of rotation of driving shaft 501. Driving cross member 503 is pivotably mounted on driving end yoke 502 and is operatively arranged for pivoting about first driving connection axis c—c. Driving cross member 503 is also pivotably mounted to connecting yoke 520 and is operatively arranged for pivoting about second driving connection axis e—e. The center of the driving cross member 503 is the first pivot point 10. Connecting rotation axis g—g is the axis of rotation of connecting yoke 520. First driving connection axis c—c is substantially intersecting and perpendicular to second driving connection axis e—e. First extended driving trunnion 511 and second extended driving trunnion 512 of driving cross member 503 extend beyond connecting yoke 520.

Driven shaft 521 is joined to driven end yoke 522. Driven rotation axis b—b is the axis of rotation of driven shaft 521. Driven cross member 523 is pivotably mounted on driven end yoke 522 and is operatively arranged for pivoting about first driven connection axis d—d. Driven cross member 523 is also pivotably mounted to connecting yoke 520 and is operatively arranged for pivoting about second driven connection axis f—f. The center of the driven cross member 523 is the second pivot point 20. First driven connection axis d—d is substantially intersecting and perpendicular to second driven connection axis f—f. First extended driven trunnion 531 and second extended driven trunnion 532 of driven cross member 523 extend beyond connecting yoke 520. Second driven connection axis f—f is substantially parallel to second driving connection axis e—e.

The double Cardan universal joint comprises driving shaft 501, driving end yoke 502, driving cross member 503, connecting yoke 520, driven cross member 523, driven end yoke 522, and driven shaft 521.

Driving yoke pulley 506 is rigidly mounted to or is integral with driving end yoke 502. First driving pulley 504 and second driving pulley 505 are pivotably mounted on first extended driving trunnion 511 and second extended driving trunnion 512, respectively. Driving yoke pulley 506 is an element of the first transmitting module 50 and first and second driving pulleys 504, 505, and the additional elements mounted thereon as described below are elements of the second transmitting module 51 in this implementation.

Driven yoke pulley 526 is rigidly mounted to or is integral with driven end yoke 522. First driven pulley 524 and second driven pulley 525 are pivotably mounted on first extended driven trunnion 531 and second extended driven trunnion 532, respectively. Driven yoke pulley 526 is an element of the third transmitting module 52 and first and second driven pulleys 524, 525, and the additional elements mounted thereon as described below are elements of the fourth transmitting module 53 in this implementation.

Pairs of flexible elements are used to link the pivoting of adjacent pulleys, by exerting tension in opposite directions.

First outer driving yoke flexible element 507 and first inner driving yoke flexible element 508 are each secured at one end to first driving pulley 504 and at the other end to driving yoke pulley 506 in opposing orientations so that clock-wise pivoting of driving yoke pulley 506 about axis c—c is linked to counter-clock-wise pivoting of first driving pulley 504 about axis e—e.

Second outer driving yoke flexible element 509 and second inner driving yoke flexible element 510 are each secured at one end to second driving pulley 505 and at the other end to driving yoke pulley 506 in opposing orientations so that clock-wise pivoting of driving yoke pulley 506 about axis c—c is linked to clock-wise pivoting of second driving pulley 505 about axis e—e.

First outer driven yoke flexible element 527 and first inner driven yoke flexible element 528 are each secured at one end to first driven pulley 524 and at the other end to driven yoke pulley 526 in opposing orientations so that clock-wise pivoting of driven yoke pulley 526 about axis d—d is linked to counter-clock-wise pivoting of first driven pulley 524 about axis f—f.

Second outer driven yoke flexible element 529 and second inner driven yoke flexible element 530 are each secured at one end to second driven pulley 525 and at the other end to driven yoke pulley 526 in opposing orientations so that clock-wise pivoting of driven yoke pulley 526 about axis d—d is linked to clock-wise pivoting of second driven pulley 525 about axis f—f.

First outer connecting flexible element 515 and first inner connecting flexible element 516 are each secured at one end to first driving pulley 504 and at the other end to first driven pulley 524 in opposing orientations so that clock-wise pivoting of first driving pulley 504 about axis e—e is linked to counter-clock-wise pivoting of first driven pulley 524 about axis f—f.

Second outer connecting flexible element 517 and second inner connecting flexible element 518 are each secured at one end to second driving pulley 505 and at the other end to second driven pulley 525 in opposing orientations so that clock-wise pivoting of second driving pulley 505 about axis e—e is linked to counter-clock-wise pivoting of second driven pulley 525 about axis f—f.

The rotation r—r of the driving shaft 501 occurs about axis a—a. The rotation r'—r' of connecting yoke 520 occurs about axis g—g. The rotation r"—r" of driven shaft 521 occurs about axis b—b.

A first mechanical path comprises driving yoke pulley 506, first driving pulley 504, first driven pulley 524, and driven yoke pulley 526. A second mechanical path comprises driving yoke pulley 506, second driving pulley 505, second driven pulley 525, and driven yoke pulley 526.

Operation—Flexible Element Linkage Embodiment
(Fifth Embodiment)

When driving end yoke 502 pivots together with driving yoke pulley 506 clock-wise about axis e—e, first outer driving yoke flexible element 507 and first inner driving yoke flexible element 508 link that pivoting to identical pivoting of first driving pulley 504 clock-wise about axis e—e. Likewise, second outer driving yoke flexible element 509 and second inner driving yoke flexible element 510 link clock-wise pivoting of driving end yoke 502, together with driving yoke pulley 506, clock-wise about axis e—e to clock-wise pivoting of second driving pulley 505 about axis e—e identical to the pivoting of first driving pulley 504 about axis e—e.

When driven end yoke 522 pivots together with driven yoke pulley 526 clock-wise about axis f—f, first outer driven yoke flexible element 527 and first inner driven yoke flexible element 528 link that pivoting to identical pivoting of first driven pulley 524 clock-wise about axis f—f. Likewise, second outer driven yoke flexible element 529 and second inner driven yoke flexible element 530 link clock-wise pivoting of driven end yoke 522 about axis f—f to pivoting of second driven pulley 525 about axis f—f identical to the pivoting of first driven pulley 524 about axis f—f.

First outer connecting flexible element 515 and first inner connecting flexible element 516 are each secured at one end to first driving pulley 504 and at the other end to first driven pulley 524 in opposing orientations so that clock-wise pivoting of first driving pulley 504 about axis e—e is linked to counter-clock-wise pivoting of first driven pulley 524 about axis f—f. In other words, as first driving pulley 504 pivots clock-wise about axis e—e, first driven pulley 524 pivots equally counter-clock-wise about axis f—f.

Second outer connecting flexible element 517 and second inner connecting flexible element 518 are each secured at one end to second driving pulley 505 and at the other end to second driven pulley 525 in opposing orientations so that clock-wise pivoting of second driving pulley 505 about axis e—e is linked to counter-clock-wise pivoting of second driven pulley 525 about axis f—f. In other words, as second driving pulley 505 pivots clock-wise about axis e—e, second driven pulley 525 pivots equally counter-clock-wise about axis f—f.

Since driving yoke pulley 506 is rigidly mounted on or is integral with driving end yoke 502, pivotal motion of driving end yoke 502 about axis c—c causes a corresponding pivoting of driving yoke pulley 506 about axis c—c. This pivoting as a result of the presence of flexible elements 507, 508, 509, and 510 causes first driving pulley 504 and second driving pulley 505 to pivot equally about axis e—e relative to connecting yoke 520 and in opposite direction of rotation relative to one another. In turn, this pivoting of the first and second driving pulleys 504, 505, in conjunction with the action of flexible elements 515, 516, 517, and 518, causes first driven pulley 524 and second driven pulley 525 to pivot about axis f—f in opposite directions relative to one another. This, in turn, with the flexible elements 527, 528, 529, and 530, causes driven yoke pulley 526 to pivot about axis d—d. Since driven yoke pulley 526 is rigidly mounted on or is integral with driven end yoke 522, this causes driven end yoke 522 to pivot about axis d—d. Counter-clock-wise pivoting of driving yoke pulley 506 together with driving end yoke 502 about axis c—c is exactly matched by clock-wise pivoting of driven yoke pulley 526 about axis d—d together with driven end yoke 522.

Pivoting of driving end yoke 502 and driving yoke pulley 506 together with driving cross member 503 about driving second axis e—e, as a result of the presence of flexible elements 507, 508, 509, and 510, compels first driving pulley 504 and second driving pulley 505 to pivot in the same direction about axis e—e. Since axis c—c, the axis of rotation of the pivotal connection between driving end yoke 502 and driving yoke pulley 506, is substantially perpendicular to axis e—e, pivoting of driving end yoke 502 about axis e—e forces driving cross member 503 to pivot with it. In other words, pivoting of driving end yoke 502 about axis e—e causes driving end yoke 502, driving yoke pulley 506, driving cross member 503, first driving pulley 504, and second driving pulley 505 to pivot about axis e—e as a unit. Due to flexible elements 515, 516, 517, and 518, the pivoting first driving pulley 504 and second driving pulley 505 clock-wise about axis e—e causes first driven pulley 524 and second driven pulley 525 to pivot counter-clock-wise together about axis f—f. The counter-clock-wise pivoting of first driven pulley 524 and second driven pulley 525 together about axis f—f, due to the action of flexible elements 527, 528, 529, and 530, causes driven yoke pulley 526 to pivot counter-clock-wise about axis f—f. Since driven yoke pulley 526 is rigidly mounted on driven end yoke 522, this causes driven end yoke 522 to pivot counter-clock-wise with driven cross member 523 about axis f—f. Since axis d—d, the axis of rotation of the pivotal connection between driven end yoke 522 and driven yoke pulley 526, is substantially perpendicular to axis f—f, if driven end yoke 522 pivots about axis f—f, then driven cross member 523 must pivot with it. In other words, pivoting of first driven pulley 524 and second driven pulley 525 together about axis e—e causes first driven pulley 524, second driven pulley 525, driven yoke pulley 526, driven cross member 523, and driven end yoke 522 to pivot about axis e—e as a unit. Thus, clock-wise pivoting of driving end yoke 502 about axis e—e causes equal counter-clock-wise pivoting of driven end yoke 522 about axis f—f.

In a straight initial configuration, axes a—a, b—b, and g—g are collinear. Since clock-wise pivoting of driving end yoke 502 about axis c—c is exactly matched by counter-clock-wise pivoting of driven end yoke 522 about axis d—d, and clock-wise pivoting of driving end yoke 502 about axis e—e is exactly matched by counter-clock-wise pivoting of driven end yoke 522 about axis f—f, any pivoting of driving end yoke 502 in relation to connecting yoke 520 is exactly matched in magnitude and direction by pivoting of driven end yoke 522 in relation to connecting yoke 520. Consequently, axis a—a, axis b—b, and axis g—g always lie in the same plane and the angles between axis a—a and axis g—g are always equal to the angles between axis b—b and axis g—g. Further, in the plane containing axis a—a, axis b—b, and axis g—g at any moment, axis a—a and axis b—b always lie on the same side axis g—g.

As the double Cardan universal joint 540 rotates, the angles between axis a—a and axis b—b can change. However, as axis a—a and axis b—b deviate away from straight, axis a—a, axis b—b, and axis g—g are all compelled to stay in a coplanar configuration. Further, the angle between axis a—a and axis g—g is compelled to remain equal to the angle between axis b—b and axis g—g. This fulfills the requirements for constant velocity operation of a double Cardan joint according to the article by Johnson and Willems cited above. The ratio r—r:r'—r' is equal to the ratio r"—r":r'—r'. Rotation r—r is therefore always equal to rotation r"—r".

Offset External Embodiment (Sixth Embodiment)

An exemplary implementation of an offset external embodiment 600 comprising a non- rotating mechanism controlling the positioning of a rotating double universal joint is shown in FIGS. 6A, 6B, 6C, 6D, and 6E. This embodiment demonstrates some of the variations which are possible without impairing the function of the apparatus. Normally, axis c—c would be perpendicular to axis e—e, and axis d—d would be perpendicular to axis f—f. This embodiment demonstrates that this is not necessary. Also, an even number of intervening gears between corresponding driving and driven spur gears preserves the properties required for equal angle operation. The two mechanical paths are shown here on the same side of g—g. The pivot points do not lie within the cross members, or at their centers. The double universal joint which the apparatus supports could not function without complete support. I included all of these variations, and still the function of the apparatus and the supported double universal joint is intact.

Driving cross member 603 is pivotably mounted on driving end yoke 602 and is operatively arranged for pivoting about first driving connection axis c—c. Driving cross member 603 is also pivotably mounted to connecting yoke 640 with driving cross member extended pivot 607 extending through connecting yoke 640 and is operatively arranged for pivoting about second driving connection axis e—e. The intersection of axis c—c and axis e—e is the first pivot point 10. The portion of driving cross member extended pivot 607 that extends beyond connecting yoke 640 is splined. First driving connection axis c—c is substantially intersecting and at a 60 degree angle to second driving connection axis e—e.

Driven cross member 623 is pivotably mounted on driven end yoke 622 and is operatively arranged for pivoting about first driven connection axis d—d. Driven cross member 623 is also pivotably mounted to connecting yoke 640 with driven cross member extended pivot 627 extending through connecting yoke 640 and is operatively arranged for pivoting about second driven connection axis f—f. The intersection of axis d—d and axis f—f is the second pivot point 20. The portion of driven cross member extended pivot 627 that extends beyond connecting yoke 640 is splined. First driven connection axis d—d is substantially intersecting and at a 60 degree angle to second driven connection axis f—f. Second driven connection axis f—f is substantially parallel to second driving connection axis e—e.

Driving bevel gear 610 is rigidly mounted to or is integral with driving end yoke 602. Driving bevel gear 610 comprises driving bevel gear teeth 611. First driving gear 604 is rigidly mounted on driving cross member extended pivot 607 of driving cross member 603 and pivots about axis e—e with driving cross member 603. Second driving gear 605 is pivotably mounted to connecting yoke 640 and is operatively arranged to pivot about axis e—e. First driving gear 604 carries first driving gear spur teeth 606. Second driving gear 605 carries second driving gear spur teeth 608 and second driving gear bevel teeth 609. First and second driving intermediate gears 643, 644 are also pivotably mounted on the connecting yoke 640 and carry teeth 647, 648 that mesh with the teeth 606, 608 of the first and second driving gears 604, 605. Driving bevel gear 610 is an element of the first transmitting module 50 in this implementation. First and second driving gears 604, 605 and first and second driving intermediate gears 643, 644 are elements of the second transmitting module 51 in this implementation.

Second driving gear bevel teeth 609 mesh with driving bevel gear teeth 611.

Driven bevel gear 630 is rigidly mounted to or is integral with driven end yoke 622. Driven bevel gear 630 comprises driven bevel gear teeth 631. First driven gear 624 is rigidly mounted on driven cross member extended pivot 627 of driven cross member 623 and pivots about axis f—f with driven cross member 623. Second driven gear 625 is pivotably mounted to connecting yoke 640 and is operatively arranged to pivot about axis f—f. First driven gear 624 carries first driven gear spur teeth 626. Second driven gear 625 carries second driven gear spur teeth 628 and second driven gear bevel teeth 629. First and second driven intermediate gears 645, 646 are also pivotably mounted on the connecting yoke 640 and carry teeth 649, 650 that mesh with the teeth 626, 628 of the first and second driven gears 624, 625. Driven bevel gear 630 is an element of the third transmitting module 52 in this implementation. First and second driven gears 624, 625 and first and second driven intermediate gears 645, 646 are elements of the fourth transmitting module 52 in this implementation.

Second driven gear bevel teeth 629 mesh with driven bevel gear teeth 631.

First driving gear spur teeth 606 mesh with first driving intermediate gear teeth 647. First driving intermediate gear teeth 647 mesh with first driven intermediate gear teeth 649. First driven intermediate gear teeth 649 mesh with first driven gear spur teeth 626.

Second driving gear spur teeth 608 mesh with second driving intermediate gear teeth 648. Second driving intermediate gear teeth 648 mesh with second driven intermediate gear teeth 650. Second driven intermediate gear teeth 650 mesh with second driven gear spur teeth 628.

External guide mechanism 601 includes driving end yoke 602, driving cross member 603, first driving gear 604, second driving gear 605, driving bevel gear 610, connecting yoke 640, driving connecting support 641, first driving intermediate gear 643, second driving intermediate gear 644, driven connecting support 642, first driven intermediate gear 645, second driven intermediate gear 646, driven end yoke 622, driven cross member 623, first driven gear 624, second driven gear 625, and driven bevel gear 630.

Driving shaft 661 is rotatably mounted to driving end yoke 602. Driving rotation axis a—a is the axis of rotation of driving shaft 661. Driving end yoke 602 is operatively configured such that axis a—a substantially intersects the intersection of axis e—e and axis c—c.

Driven shaft 662 is rotatably mounted to driven end yoke 622. Driven rotation axis b—b is the axis of rotation of driven shaft 662. Driven end yoke 622 is operatively configured such that axis b—b substantially intersects the intersection of axis f—f and axis d—d.

Driving connecting support 641 and driven connecting support 642 are joined to connecting yoke 640. Connecting shaft 663 is rotatably mounted on driving connecting support 641 and driven connecting support 642. Connecting rotation axis g—g is the axis of rotation of connecting shaft 663. External guide mechanism 601 is operatively configured such that axis g—g substantially intersects the intersection of axis e—e and axis c—c and also the intersection of axis f—f and axis d—d.

Rudimentary universal joint 660 comprises driving shaft 661, connecting shaft 663, and driven shaft 662. The rotation r—r of the driving shaft 661 occurs about axis a—a. The rotation r'—r' of connecting yoke 640 occurs about axis g—g. The rotation r"—r" of driven shaft 651 occurs about axis b—b.

In this embodiment, a first mechanical path comprises driving cross member 603, first driving gear 604, first driving intermediate gear 643, first driven intermediate gear 645, first driven gear 624, and driven cross member 623. A second mechanical path comprises driving bevel gear 610, second driving gear 605, second driving intermediate gear 644, second driven intermediate gear 646, second driven gear 625, and driven bevel gear 630.

Operation—Offset External Embodiment (Sixth Embodiment)

First driving gear 604 is rigidly mounted on driving cross member extended pivot 607 of driving cross member 603 and pivots about axis e—e with driving cross member 603.

Second driving gear bevel teeth 609 mesh with driving bevel gear teeth 611. This links clock-wise pivoting of driving bevel gear 610 about axis c—c to counter-clock-wise pivoting of second driving gear 605 about axis e—e.

First driven gear 624 is rigidly mounted on driven cross member extended pivot 627 of driven cross member 623 and pivots about axis f—f with driven cross member 623.

Second driven gear bevel teeth 629 mesh with driven bevel gear teeth 631. This links clock-wise pivoting of driven bevel gear 630 about axis d—d to counter-clock-wise pivoting of second driven gear 625 about axis f—f.

When driving end yoke 602 pivots together with driving bevel gear 610 clock-wise about axis e—e, the rigid mounting of first driving gear 604 on driving cross member extended pivot 607 links that pivoting to identical pivoting of first driving gear 604 clock-wise about axis e—e. Also, the meshing of second driving gear bevel teeth 609 with driving bevel gear teeth 611 links clock-wise pivoting of driving end yoke 602, together with driving bevel gear 610, about axis e—e to pivoting of second driving gear 605 about axis e—e identical to the pivoting of first driving gear 604 about axis e—e. In other words, clock-wise rotation of driving end yoke 602 about axis e—e is linked to driving end yoke 602, driving bevel gear 610, driving cross member 603, first driving gear 604, and second driving gear 605 pivoting about axis e—e as a unit.

When driven end yoke 622 pivots together with driven bevel gear 630 clock-wise about axis f—f, the rigid mounting of first driven gear 624 on driven cross member extended pivot 627 links that pivoting to identical pivoting of first driven gear 624 clock-wise about axis f—f. Also, the meshing of second driven gear bevel teeth 629 with driven bevel gear teeth 631 links clock-wise pivoting of driven end yoke 622 about axis f—f to pivoting of second driven gear 625 about axis f—f identical to the pivoting of first driven gear 624 about axis f—f. In other words, clock-wise rotation of driven end yoke 622 about axis f—f is linked to driven end yoke 622, driven bevel gear 630, driven cross member 623, first driven gear 624, and second driven gear 625 pivoting about axis f—f as a unit.

First driving gear spur teeth 606 mesh with first driving intermediate gear teeth 647, linking clock-wise pivoting of first driving gear 604 about axis e—e to equal counter-clock-wise pivoting of first driving intermediate gear 643. First driving intermediate gear teeth 647 mesh with first driven intermediate gear teeth 649, linking counter-clock-wise pivoting of first driving intermediate gear 643 to clock-wise pivoting of first driven intermediate gear 645. First driven intermediate gear teeth 649 mesh with first driven gear spur teeth 626, linking clock-wise pivoting of first driven intermediate gear 645 to counter-clock-wise pivoting of first driven gear 624 about axis f—f. The net result is that as first driving gear 604 pivots clock-wise about axis e—e, first driven gear 624 pivots equally counter-clock-wise about axis f—f.

Second driving gear spur teeth 608 mesh with second driving intermediate gear teeth 648, linking clock-wise pivoting of second driving gear 605 about axis e—e to equal counter-clock-wise pivoting of second driving intermediate gear 644. Second driving intermediate gear teeth 648 mesh with second driven intermediate gear teeth 650, linking counter-clock-wise pivoting of second driving intermediate gear 644 to clock-wise pivoting of second driven intermediate gear 646. Second driven intermediate gear teeth 650 mesh with second driven gear spur teeth 628, linking clock-wise pivoting of second driven intermediate gear 646 to counter-clock-wise pivoting of second driven gear 625 about axis f—f. The net result is that as second driving gear 605 pivots clock-wise about axis e—e, second driven gear 625 pivots equally counter-clock-wise about axis f—f.

Since driving bevel gear 610 is rigidly mounted on or is integral with driving end yoke 602, clock-wise pivotal motion of driving end yoke 602 about axis c—c causes a corresponding pivoting of driving bevel gear 610 about axis c—c. This, due to the meshing of second driving gear bevel teeth 609 with driving bevel gear teeth 611, causes second driving gear 605 to pivot counter-clock-wise about axis e—e. Since second driving gear 605 pivots counter-clock-wise about axis e—e, second driven gear 625 pivots clock-wise about axis f—f. Pivoting of driving bevel gear 610 about axis c—c is not linked to pivoting of driving cross member 603 about axis e—e, so first driving gear 604 does not pivot about axis e—e. Since pivoting of first driving gear 604 is linked to pivoting of first driven gear 624, first driven gear 624 also does not pivot. Since first driven gear 624 does not pivot, driven cross member 623 also does not pivot about axis f—f. This, with the clock-wise pivoting of second driven gear 625 about axis f—f, causes driven bevel gear 630 to pivot counter-clock-wise about axis d—d. Since driven bevel gear 630 is rigidly mounted on or is integral with driven end yoke 622, this causes driven end yoke 622 to pivot counter-clock-wise about axis d—d. In summary, clock-wise rotation of driving bevel gear 610, together with driving end yoke 602, relative to connecting yoke 640 about axis c—c is exactly matched by counter-clock-wise pivoting of driven bevel gear 630 about axis d—d, together with driven end yoke 622.

Because the second driving gear bevel teeth 609 mesh with the driving bevel gear teeth 611, clock-wise pivoting of driving end yoke 602 and driving bevel gear 610 together with driving cross member 603 about driving second axis e—e compels second driving gear 605 to pivot clock-wise about axis e—e. The clock-wise pivoting of driving end yoke 602 and driving bevel gear 610 together with driving cross member 603 about driving second axis e—e also compels first driving gear 604 to pivot clock-wise about axis e—e. Since both first driving gear 604 and second driving gear 605 pivot equally clock-wise about axis e—e, and since the equal clock-wise pivoting of first driving gear 604 and second driving gear 605 are linked to equal counter-clock-wise pivoting of first driven gear 624 and second driven gear 625, respectively, first driven gear 624 and second driven gear 625 are both compelled to pivot equally counter-clock-wise. Because the first driven gear 624 is rigidly mounted on driven cross member extended pivot 627 and the second driving gear bevel teeth 609 mesh with the driving bevel gear teeth 611, the equal counter-clockwise pivoting of the first driven gear 624 and second driven gear 625 compels first driven gear 624 and second driven gear 625, driven bevel gear 630, driven cross member 623, and driven end yoke 622 to pivot about axis e—e as a unit. Thus, clock-wise pivoting of driving end yoke 602 about axis e—e causes equal counter-clock-wise pivoting of driven end yoke 622 about axis f—f.

In a straight initial configuration, axes a—a, b—b, and g—g are collinear. Since clock-wise pivoting of driving end yoke 602 about axis c—c is exactly matched by counter-clock-wise pivoting of driven end yoke 622 about axis d—d, and since clock-wise pivoting of driving end yoke 602 about axis e—e is exactly matched by counter-clock-wise pivoting of driven end yoke 622 about axis f—f, any pivoting of driving end yoke 602 in relation to connecting yoke 640 is exactly matched in magnitude and direction by pivoting of driven end yoke 622 in relation to connecting yoke 640. Consequently, axis a—a, axis b—b, and axis g—g always lie in the same plane and the angles between axis a—a and axis g—g are always equal to the angles between axis b—b and axis g—g. Further, in the plane containing axis a—a, axis b—b, and axis g—g at any moment, axis a—a and axis b—b always lie on the same side axis g—g.

As rudimentary universal joint 660 rotates, the angles between axis a—a and axis b—b can change. However, as axis a—a and axis b—b deviate away from straight, axis a—a, axis b—b, and axis g—g are all compelled to stay in a coplanar configuration. Further, the angle between axis a—a and axis g—g is compelled to remain equal to the angle between axis b—b and axis g—g.

In all of the exemplary implementations and in all other forms of my invention, the first driving gear or pulley 104, 204, 304, 404, 504, 604 can also be referred to generally as a first driving alpha wheel; the second driving gear or pulley 105, 205, 305, 405, 505, 605 can also be referred to generally as a second driving alpha wheel; the driving bevel gear or yoke pulley 110, 210, 310, 410, 506, 610 can also be referred to generally as a driving beta wheel; the first driven gear or pulley 124, 224, 324, 434, 524, 624 can also be referred to generally as a first driven alpha wheel; the second driven gear or pulley 125, 225, 325, 435, 525, 625 can also be referred to generally as a second driven alpha wheel; and the driven bevel gear or yoke pulley 130, 230, 330, 440, 526, 630 can also be referred to generally as a driven beta wheel.

For arrangements of my invention such as those described in the first, third, fourth, and fifth exemplary implementations above, the pivoting of the end yokes relative to their respective cross members is associated with equal and opposite pivoting of parallel elements of the first and second mechanical paths. That is, the first and second driving alpha wheels pivot equal and opposite amounts as do the first and second driven alpha wheels. However, a person skilled in the art would be aware that, though opposite pivoting is inherent to these particular arrangements, the motion need not be equal in both paths. The only requirement for proper operation of such arrangements is that the ratio between the first driving alpha wheel and the driving beta wheel should be equal to the ratio between the first driven alpha wheel and the driven beta wheel, and the ratio between the second driving alpha wheel and the driving beta wheel should be equal to the ratio between the second driven alpha wheel and the driven beta wheel. As long as the first driving and first driven alpha wheels pivot by equal amounts and the second driving and second driven alpha wheels pivot by equal amounts, this type of arrangement functions properly.

| List of Reference Numerals and Corresponding Elements | |
|---|---|
| 10 | First pivot point |
| 20 | Second pivot point |
| 30 | Input/Driving shaft |
| 40 | Output/Driven shaft |
| 50 | First transmitting module |
| 51 | Second transmitting module |
| 52 | Third transmitting module |
| 53 | Fourth transmitting module |
| 100 | direct symmetrical embodiment |
| 101 | driving shaft |
| 102 | driving end yoke |
| 103 | driving cross member |
| 104 | first driving gear; first driving alpha wheel |
| 105 | second driving gear; second driving alpha wheel |
| 106 | first driving gear spur teeth |
| 107 | first driving gear bevel teeth |
| 108 | second driving gear spur teeth |
| 109 | second driving gear bevel teeth |
| 110 | driving bevel gear; driving beta wheel |
| 111 | driving bevel gear first teeth |
| 112 | driving bevel gear second teeth |
| 113 | first extended driving trunnion |
| 114 | second extended driving trunnion |
| 120 | connecting yoke |
| 121 | driven shaft |
| 122 | driven end yoke |
| 123 | driven cross member |
| 124 | first driven gear; first driven alpha wheel |
| 125 | second driven gear; second driven alpha wheel |
| 126 | first driven gear spur teeth |
| 127 | first driven gear bevel teeth |
| 128 | second driven gear spur teeth |
| 129 | second driven gear bevel teeth |
| 130 | driven bevel gear; driven beta wheel |
| 131 | driven bevel gear first teeth |
| 132 | driven bevel gear second teeth |
| 133 | first extended driven trunnion |
| 134 | second extended driven trunnion |
| 200 | direct asymmetrical embodiment |
| 201 | driving shaft |
| 202 | driving end yoke |
| 203 | driving cross member |
| 204 | first driving gear; first driving alpha wheel |
| 205 | second driving gear; second driving alpha wheel |
| 206 | first driving gear spur teeth |
| 208 | second driving gear spur teeth |
| 209 | second driving gear bevel teeth |
| 210 | driving bevel gear; driving beta wheel |
| 211 | driving bevel gear teeth |
| 213 | first extended driving trunnion |
| 214 | second extended driving trunnion |
| 220 | connecting yoke |
| 221 | driven shaft |
| 222 | driven end yoke |

-continued

List of Reference Numerals and Corresponding Elements

| | |
|---|---|
| 223 | driven cross member |
| 224 | first driven gear; first driven alpha wheel |
| 225 | second driven gear; second driven alpha wheel |
| 226 | first driven gear spur teeth |
| 228 | second driven gear spur teeth |
| 229 | second driven gear bevel teeth |
| 230 | driven bevel gear; driven beta wheel |
| 231 | driven bevel gear teeth |
| 233 | first extended driven trunnion |
| 234 | second extended driven trunnion |
| 300 | indirect symmetrical embodiment |
| 301 | external guide mechanism |
| 302 | outer driving end yoke |
| 303 | outer driving cross member |
| 304 | first driving gear; first driving alpha wheel |
| 305 | second driving gear; second driving alpha wheel |
| 306 | first driving gear spur teeth |
| 307 | first driving gear bevel teeth |
| 308 | second driving gear spur teeth |
| 309 | second driving gear bevel teeth |
| 310 | driving bevel gear; driving beta wheel |
| 311 | driving bevel gear first teeth |
| 312 | driving bevel gear second teeth |
| 318 | connecting yoke first half |
| 319 | connecting yoke second halt |
| 320 | connecting yoke |
| 321 | optional center support |
| 322 | outer driven end yoke |
| 323 | outer driven cross member |
| 324 | first driven gear; first driven alpha wheel |
| 325 | second driven gear; second driven alpha wheel |
| 326 | first driven gear spur teeth |
| 327 | first driven gear bevel teeth |
| 328 | second driven gear spur teeth |
| 329 | second driven gear bevel teeth |
| 330 | driven bevel gear; driven beta wheel |
| 331 | driven bevel gear first teeth |
| 332 | driven bevel gear second teeth |
| 341 | driving shaft |
| 342 | inner driving end yoke |
| 343 | inner driving cross member |
| 345 | inner connecting yoke |
| 351 | driven shaft |
| 352 | inner driven end yoke |
| 353 | inner driven cross member |
| 400 | parallel axis embodiment |
| 401 | driving shaft |
| 402 | driving end yoke |
| 403 | driving cross member |
| 404 | first driving gear; first driving alpha wheel |
| 405 | second driving gear; second driving alpha wheel |
| 406 | first driving gear spur teeth |
| 407 | first driving gear bevel teeth |
| 408 | second driving gear spur teeth |
| 409 | second driving gear bevel teeth |
| 410 | driving bevel gear; driving beta wheel |
| 411 | driving bevel gear first teeth |
| 412 | driving bevel gear second teeth |
| 420 | connecting yoke |
| 421 | first connecting gear |
| 422 | second connecting gear |
| 423 | first connecting gear spur teeth |
| 424 | second connecting gear spur teeth |
| 431 | driven shaft |
| 432 | driven end yoke |
| 433 | driven cross member |
| 434 | first driven gear: first driven alpha wheel |
| 435 | second driven gear; second driven alpha wheel |
| 436 | first driven gear spur teeth |
| 437 | first driven gear bevel teeth |
| 438 | second driven gear spur teeth |
| 439 | second driven gear bevel teeth |

-continued

List of Reference Numerals and Corresponding Elements

| | |
|---|---|
| 440 | driven bevel gear; driven beta wheel |
| 441 | driven bevel gear first teeth |
| 442 | driven bevel gear second teeth |
| 500 | flexible element linkage embodiment |
| 501 | driving shaft |
| 502 | driving end yoke |
| 503 | driving cross member |
| 504 | first driving pulley; first driving alpha wheel |
| 505 | second driving pulley; second driving alpha wheel |
| 506 | driving yoke pulley; driving beta wheel |
| 507 | first outer driving yoke flexible element |
| 508 | first inner driving yoke flexible element |
| 509 | second outer driving yoke flexible element |
| 510 | second inner driving yoke flexible element |
| 511 | first extended driving trunnion |
| 512 | second extended driving trunnion |
| 515 | first outer connecting flexible element |
| 516 | first inner connecting flexible element |
| 517 | second outer connecting flexible element |
| 518 | second inner connecting flexible element |
| 520 | connecting yoke |
| 521 | driven shaft |
| 522 | driven end yoke |
| 523 | driven cross member |
| 524 | first driven pulley; first driven alpha wheel |
| 525 | second driven pulley; second driven alpha wheel |
| 526 | driven yoke pulley; driven beta wheel |
| 527 | first outer driven yoke flexible element |
| 528 | first inner driven yoke flexible element |
| 529 | second outer driven yoke flexible element |
| 530 | second inner driven yoke flexible element |
| 531 | first extended driven trunnion |
| 532 | second extended driven trunnion |
| 600 | offset external embodiment |
| 601 | external guide mechanism |
| 602 | driving end yoke |
| 603 | driving cross member |
| 604 | first driving gear; first driving alpha wheel |
| 605 | second driving gear; second driving alpha wheel |
| 606 | first driving gear spur teeth |
| 607 | driving cross member extended pivot |
| 608 | second driving gear spur teeth |
| 609 | second driving gear bevel teeth |
| 610 | driving bevel gear; driving beta wheel |
| 611 | driving bevel gear teeth |
| 622 | driven end yoke |
| 623 | driven cross member |
| 624 | first driven gear; first driven alpha wheel |
| 625 | second driven gear; second driven alpha wheel |
| 626 | first driven gear spur teeth |
| 627 | driven cross member extended pivot |
| 628 | second driven gear spur teeth |
| 629 | second driven gear bevel teeth |
| 630 | driven bevel gear; driven beta wheel |
| 631 | driven bevel gear teeth |
| 640 | connecting yoke |
| 641 | driving connecting support |
| 642 | driven connecting support |
| 643 | first driving intermediate gear |
| 644 | second driving intermediate gear |
| 645 | first driven intermediate gear |
| 646 | second driven intermediate gear |
| 647 | first driving intermediate gear teeth |
| 648 | second driving intermediate gear teeth |
| 649 | first driven intermediate gear teeth |
| 650 | second driven intermediate gear teeth |
| 660 | rudimentary universal joint |
| 661 | driving shaft |
| 662 | driven shaft |
| 663 | connecting shaft |
| a–a | driving rotation axis |
| b–b | driven rotation axis |
| c–c | first driving connection axis |

-continued

List of Reference Numerals and Corresponding Elements

| | |
|---|---|
| d–d | first driven connection axis |
| e–e | second driving connection axis |
| f–f | second driven connection axis |
| g–g | connecting rotation axis |
| r"–r" | driven rotation |
| r'–r' | connecting rotation |
| r–r | driving rotation |

I Claim:

1. A double universal joint angle equalizing apparatus including:

first and second mechanical linkages arranged to link swiveling of a driving axis about first and second axes intersecting at a first pivot point to equivalent swiveling of a driven axis about third and fourth axes intersecting at a second pivot point, the driving and driven axes being rotational axes of driving and driven shafts, respectively, a connector being arranged between driving and driven end yokes;

the first and second mechanical linkages being arranged to move in concert to couple swivel of the driving shaft about the second axis to equal swivel of the driven shaft about the fourth axis, and also being arranged for contrasting movement to couple swivel of the driving shaft about the first axis to equal swivel of the driven shaft about the third axis;

a connecting axis extending through the first and second pivot points;

the driving shaft being mounted to a driving universal joint, the driving axis substantially passing through the first pivot point and being arranged to swivel relative to the connecting axis about the first pivot point;

the driven shaft being mounted to a driven universal joint, the driven axis substantially passing through the second pivot point and being arranged to swivel relative to the connecting axis about the second pivot point;

driving and driven cross members supported in the connector and also in the driving and driven end yokes, respectively, the first and second axes both being axes of the driving cross member and passing through the first pivot point, the first and second axes being separated by a driving separation angle, and the third and fourth axes both being axes of the driven cross member and passing through the second pivot point, the third and fourth axes being separated by a driven separation angle, the driving separation angle being substantially equal to the driven separation angle; and the first axis being an axis of rotation of a connection between the driving end yoke and the driving cross member, the second axis being an axis of rotation of a connection between the connector and the driving cross member, the third axis being an axis of rotation of a connection between the driven end yoke and the driven cross member, and the fourth axis being an axis of rotation of a connection between the connector and the driven cross member.

2. The apparatus of claim 1 wherein the driving and driven end yokes are rigidly connected to the driving and driven shafts, respectively, so that the end yokes and the connector rotate with the shafts.

3. The apparatus of claim 1 wherein the driving and driven end yokes are rotatably connected to the driving and driven shafts, respectively, so that the shafts rotate within the end yokes and relative to the connector.

4. The apparatus of claim 1 wherein the first mechanical linkage includes a first driving alpha wheel and a first driven alpha wheel and the second mechanical linkage includes a second driving alpha wheel and a second driven alpha wheel, the driving alpha wheels being arranged to pivot about the second axis and the driven alpha wheels being arranged to pivot about the fourth axis, the pivoting of the first driving alpha wheel being coupled to pivoting of the first driven alpha wheel, and the pivoting of the second driving alpha wheel being coupled to pivoting of the second driven alpha wheel.

5. The apparatus of claim 4 further including a driving beta wheel and a driven beta wheel arranged to pivot about the first and third axes, respectively, the driving beta wheel and the driven beta wheel being coupled to respective pivoting of the driving shaft about the first axis and the driven shaft about the third axis.

6. The apparatus of claim 5 wherein the first mechanical linkage includes alpha wheels and the second mechanical linkage includes both alpha wheels and beta wheels, the first driving alpha wheel being coupled to pivoting of the driving shaft about only the second axis, the first driven alpha wheel being coupled to pivoting of the driven shaft about only the fourth axis, the second driving alpha wheel being coupled by the driving beta wheel to pivoting of the driving shaft about both the first and second axes, and the second driven alpha wheel being coupled by the driven beta wheel to pivoting of the driven shaft about both the third and fourth axes.

7. The apparatus of claim 5 wherein the first mechanical linkage includes both alpha and beta wheels and the second mechanical path includes both alpha and beta wheels, the first driving alpha wheel being coupled by the driving beta wheel to pivoting of the driving shaft about both the first and second axes, the first driven alpha wheel being coupled by the driven beta wheel to pivoting of the driven shaft about both the third and fourth axes.

8. The apparatus of claim 7 wherein the wheels of each pair of alpha wheels are coupled to their respective beta wheel so that the wheels of each pair of alpha wheels rotate in equal and opposite amounts when their beta wheel rotates about its rotational axis.

9. The apparatus of claim 1 wherein the first and second mechanical linkages include flexible elements.

10. The apparatus of claim 1 wherein the first and second mechanical linkages include gear teeth.

11. A double universal joint angle equalizing apparatus including:

position couplers arranged between input and output shafts of the double universal joint, the input and output shafts rotating about respective input and output axes and being connected to input and output universal joints, respectively;

the position couplers being arranged so that a change of position of one of the input and output axes relative to a connecting axis about first, second, third, and fourth axes is transmitted via first and second mechanical paths through the position couplers to the other of the input and output axes, the first and second mechanical paths being arranged to move in concert to couple swivel of the input shaft about the second axis to equal swivel of the output shaft about the fourth axis, and also being arranged for contrasting movement to couple swivel of the input shaft about the first axis to equal swivel of the output shaft about the third axis;

the connecting axis being an axis of a connector and intersecting the input and output axes at input and output pivot points, respectively, the connector being pivotably attached at one end to an input end yoke and at another end to an output end yoke, the input and output end yokes being attached to the input and output shafts, respectively, and also being attached to the connecting yoke via input and output cross members;

the first and second axes being axes of the input cross member and intersecting at the input pivot point and the third and fourth axes being axes of the output cross member and intersecting at the output pivot point, the first and second axes being separated by a first separation angle, and the second and fourth axes being separated by a second separation angle, the first separation angle being arranged to be equal to the second separation angle;

the input cross member being arranged to pivot with respect to the input yoke about the first axis, and also being arranged to pivot with respect to the connector about the second axis; and the output cross member being arranged to pivot with respect to the output yoke about the third axis, and also being arranged to pivot with respect to the connector about the fourth axis.

12. The apparatus of claim 11 wherein:

the input side position couplers include a first transmitting module, the first transmitting module being responsive to pivoting of the input axis about the first axis;

the input side position couplers further include a second transmitting module, the second transmitting module being responsive to pivoting of the input axis about the second axis, the second transmitting module also being responsive to the first transmitting module;

the output side position couplers include a third transmitting module, the third transmitting module being responsive to pivoting of the output axis about the third axis;

the output side position couplers further include a fourth transmitting module, the fourth transmitting module being responsive to pivoting of the output axis about the fourth axis, the fourth transmitting module also being responsive to the third transmitting module; and the first transmitting module is also responsive to the second transmitting module, the third transmitting module is also responsive to the fourth transmitting module, and the second and fourth transmitting modules is responsive to each other so that pivoting of the input axis about the first and second axes results in an equivalent amount of pivoting of the output axis about the third and fourth axes, and pivoting of the output axis about the third and fourth axes results in an equivalent amount of pivoting of the input axis about the first and second axes.

13. The apparatus of claim 12 wherein:

the first transmitting module is fixed on the input end yoke;

the second transmitting module is mounted for pivoting about the second axis;

the third transmitting module is fixed on the output end yoke;

the fourth transmitting module is mounted for pivoting about the fourth axis; and the second mechanical path includes the first, second, third, and fourth transmitting modules.

14. The apparatus of claim 13 wherein:

the first and third transmitting modules include bevel gear teeth; and the second and fourth transmitting modules include meshed partial spur gears including bevel teeth on respective sides facing respective first and third transmitting modules and spur teeth on respective facing edges of the second and fourth transmitting modules on which the spur teeth mesh.

15. The apparatus of claim 14 wherein:

the first mechanical path includes the first, second, third, and fourth transmitting modules;

the second and fourth transmitting modules include two opposed pairs of partial spur gears, each of the opposed pairs having one partial spur gear mounted about each of the second and fourth axes, so that they can pivot relative to the respective cross members and also pivot relative to the connector;

the opposed pairs of partial spur gears are arranged so that the bevel teeth of the opposed pairs of the second and fourth transmitting modules mesh with the bevel teeth of the first and third transmitting modules, respectively;

a displacement of the input axis about the first axis is transmitted through the first and second mechanical paths as the displacement causes pivoting of the first transmitting module about the first axis, which causes opposite pivoting of the two partial spur gears of the second transmitting module about the second axis, which causes opposite pivoting of the two partial spur gears of the fourth transmitting module about the fourth axis, which causes pivoting of the third transmitting module about the third axis in an a mount equal to and a sense opposite to an amount and sense of pivoting of the first transmitting module about the first axis, yielding displacement of the output axis in an amount equal and opposite to the displacement of the input axis; and a displacement of the input axis about the second axis is transmitted through the first and second mechanical paths as the displacement causes pivoting of the first and second transmitting modules about the second axis as a unit, which causes equal and opposite pivoting of the third and fourth modules about the fourth axis as a unit, yielding a displacement of the output axis about the fourth axis equal and opposite to that of the input axis about the first axis.

16. The apparatus of claim 15 wherein:

the input and output end yokes are rigidly attached to their respective input and output shafts;

the input and output universal joints are Cardan joints that are part of a double Cardan universal joint;

the input and output end yokes and the input and output cross members are respective components of the input and output universal joints;

the connector is a connecting yoke of the double Cardan joint; and the entire apparatus rotates as the input and output shafts rotate.

17. The apparatus of claim 15 wherein:

the input and output end yokes are rotatably attached to their respective input and output shafts;

the apparatus supports a double universal joint in an equal angle configuration; and the double universal joint rotates freely with respect to the apparatus.

18. The apparatus of claim 14 wherein:

the first mechanical path includes the second and fourth transmitting modules;

the second and fourth transmitting modules include two opposed pairs of partial spur gears, the first opposed pair having one partial spur gear including bevel teeth mounted about each of the second and fourth axes so that they can pivot relative to the respective cross members and also pivot relative to the connector;

the second opposed pair has one partial spur gear mounted about each of the second and fourth axes such that they pivot with their respective cross members relative to the connector;

the first opposed pair of partial spur gears is arranged so that the bevel teeth of the second and fourth transmitting modules mesh with the bevel teeth of the first and third transmitting modules, respectively;

a displacement of the input axis about the first axis is transmitted through the second mechanical path as the displacement causes pivoting of the first transmitting module about the first axis, which causes pivoting of the two partial spur gears of the first opposed pair of partial spur gears about their respective second and fourth axes, which causes pivoting of the third transmitting module about the third axis in an amount equal to and a sense opposite to an amount and sense of pivoting of the first transmitting module about the first axis, yielding displacement of the output axis in an amount equal and opposite to the displacement of the input axis; and a displacement of the input axis about the second axis is transmitted through the first and second mechanical paths as the displacement causes pivoting of the first and second transmitting modules about the second axis as a unit, which causes equal and opposite pivoting of the third and fourth modules about the fourth axis as a unit, yielding a displacement of the output axis about the fourth axis equal and opposite to that of the input axis about the first axis.

19. The apparatus of claim 18 wherein:

the input and output end yokes are rigidly attached to their respective input and output shafts;

the input and output universal joints are Cardan joints that are part of a double Cardan universal joint;

the input and output end yokes and the input and output cross members are respective components of input and output universal joints;

the connector is the connecting yoke of the double Cardan joint; and the entire apparatus rotates as the input and output shafts rotate.

20. The apparatus of claim 18 wherein:

the input and output end yokes are rotatably attached to their respective input and output shafts;

the apparatus supports a double universal joint in an equal angle configuration; and the double universal joint rotates freely with respect to the apparatus.

21. The apparatus of claim 14 further including a reversing module interposed between the second and fourth transmitting modules so that a pivoting of the second transmitting module in a direction results in equal pivoting of the fourth transmitting module in the direction, thereby resulting in maintenance of the input and output axes in a coplanar parallel relationship.

22. The apparatus of claim 14 further including a reversing module interposed between the second and fourth transmitting modules so that a pivoting of the second transmitting module in a direction results in equal pivoting of the fourth transmitting module in an opposite direction, thereby resulting in maintenance of the input and output axes in an equal angle relationship.

23. The apparatus of claim 14 further including a module interposed between the second and fourth transmitting modules permitting the second axis to be non-parallel with the fourth axis so that a pivoting of the second transmitting module in a direction results in equal pivoting of the fourth transmitting module in a corresponding direction, thereby resulting in maintenance of the input and output axes in an equal angle relationship.

24. The apparatus of claim 12 wherein the mechanical communication between at least two transmitting modules is achieved using flexible elements.

25. The apparatus of claim 24 wherein at least one of the flexible elements is a belt, and the respective transmitting modules include pulley elements.

26. The apparatus of claim 24 wherein at least one of the flexible elements is a cable, and the respective transmitting modules include pulley elements.

27. The apparatus of claim 24 wherein at least one of the flexible elements is a chain, and the respective transmitting modules include pulley elements.

28. The apparatus of claim 24 wherein at least one of the flexible elements is a chain, and the respective transmitting modules include sprocket elements.

* * * * *